(12) United States Patent
Shimoda et al.

(10) Patent No.: US 11,792,713 B2
(45) Date of Patent: Oct. 17, 2023

(54) COMMUNICATION SYSTEM

(71) Applicant: Mitsubishi Electric Corporation, Chiyoda-ku (JP)

(72) Inventors: Tadahiro Shimoda, Tokyo (JP); Mitsuru Mochizuki, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/466,918

(22) PCT Filed: Dec. 28, 2017

(86) PCT No.: PCT/JP2017/047155
§ 371 (c)(1),
(2) Date: Jun. 5, 2019

(87) PCT Pub. No.: WO2018/124259
PCT Pub. Date: Jul. 5, 2018

(65) Prior Publication Data
US 2020/0077320 A1    Mar. 5, 2020

(30) Foreign Application Priority Data

Dec. 28, 2016    (JP) ................................. 2016-255832

(51) Int. Cl.
*H04W 36/38*      (2009.01)
*H04L 5/00*      (2006.01)
(Continued)

(52) U.S. Cl.
CPC ............ *H04W 36/38* (2013.01); *H04L 5/001* (2013.01); *H04W 16/28* (2013.01);
(Continued)

(58) Field of Classification Search
CPC ............ H04W 36/38; H04W 36/0016; H04W 36/0044; H04W 36/06; H04W 80/02;
(Continued)

(56) References Cited

U.S. PATENT DOCUMENTS

2002/0021684 A1    2/2002   Toshimitsu et al.
2007/0249402 A1*   10/2007   Dong .................... H04W 16/28
                                                  455/562.1

(Continued)

FOREIGN PATENT DOCUMENTS

EP         2 991 242 A1    3/2016
JP         2001-309424 A    11/2001
(Continued)

OTHER PUBLICATIONS

Extended European Search Report dated Jul. 9, 2020 in Patent Application No. 17887656.1, 8 pages.

(Continued)

*Primary Examiner* — Jianye Wu
(74) *Attorney, Agent, or Firm* — Oblon, McClelland, Maier & Neustadt, L.L.P.

(57) ABSTRACT

Radio resource management is simplified when a cell is spatially separated by a plurality of radio beams. A cell configured by a base station device is spatially separated by a plurality of radio beams being served by the base station device. The base station device shares, between two or more of the plurality of radio beams, a radio resource control (RRC) parameter to be applied to a communication terminal device.

6 Claims, 31 Drawing Sheets

(51) Int. Cl.
*H04W 36/00* (2009.01)
*H04W 36/06* (2009.01)
*H04W 16/28* (2009.01)
*H04W 80/02* (2009.01)
*H04W 88/08* (2009.01)

(52) U.S. Cl.
CPC ... *H04W 36/0016* (2013.01); *H04W 36/0044* (2013.01); *H04W 36/06* (2013.01); *H04W 80/02* (2013.01); *H04W 88/085* (2013.01)

(58) Field of Classification Search
CPC . H04W 88/085; H04W 72/042; H04W 16/28; H04W 28/24; H04W 72/23; H04L 5/001
See application file for complete search history.

(56) References Cited

U.S. PATENT DOCUMENTS

| | | | |
|---|---|---|---|
| 2013/0029711 | A1 | 1/2013 | Kang et al. |
| 2013/0163535 | A1 | 6/2013 | Anderson et al. |
| 2014/0120926 | A1* | 5/2014 | Shin ................. H04W 56/00 455/450 |
| 2015/0004992 | A1 | 1/2015 | Tanaka |
| 2015/0223220 | A1 | 8/2015 | Zhao et al. |
| 2015/0245402 | A1 | 8/2015 | Mochizuki et al. |
| 2016/0212661 | A1 | 7/2016 | Basu Mallick et al. |
| 2016/0338073 | A1 | 11/2016 | Nuggehalli et al. |
| 2017/0013565 | A1 | 1/2017 | Pelletier et al. |
| 2017/0163333 | A1 | 6/2017 | Breiling et al. |
| 2017/0250747 | A1* | 8/2017 | Reinhardt ................. H04L 1/00 |
| 2017/0347270 | A1 | 11/2017 | Louchi et al. |
| 2018/0083688 | A1* | 3/2018 | Agiwal ................. H04W 76/19 |
| 2019/0021085 | A1* | 1/2019 | Mochizuki ............ H04W 72/04 |
| 2020/0045684 | A1* | 2/2020 | Futaki .................. H04B 7/0408 |

FOREIGN PATENT DOCUMENTS

| | | |
|---|---|---|
| JP | 2009-534954 A | 9/2009 |
| JP | 2013-524612 A | 6/2013 |
| WO | WO 2007/124460 A1 | 11/2007 |
| WO | WO 2016/152315 A1 | 9/2016 |
| WO | WO 2016/189990 A1 | 12/2016 |

OTHER PUBLICATIONS

International Search Report dated Mar. 20, 2018 in PCT/JP2017/047155 filed Dec. 28, 2017.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.0.0, Sep. 2016, 314 Pages.
"LS on HNB/HeNB Open Access Mode," 3GPP TSG-SA1 #42 S1-083461, Oct. 2008, 2 Pages.
"3rd Generation Partnership Project; Technical Specification Group Radio Access Network; Evolved Universal Terrestrial Radio Access (E-UTRA); Further advancements for E-UTRA physical layer aspects (Release 9)," 3GPP TR 36.814 V9.0.0, Mar. 2010, 104 Pages.
"3rd Generation Partnership Project; Technical Specification Group Radio Access Network; Feasibility study for Further Advancements for E-UTRA (LTE-Advanced) (Release 13)," 3GPP TR 36.912 V13.0.0, Dec. 2015, 252 Pages.
Petar Popovski, et al., "Scenarios, requirementsand KPIs for 5G mobile and wireless system," METIS, ICT-317669-METIS/D1.1, [URL: https://www.metis2020.com/documents/deliverables/], Apr. 29, 2013, 84 Pages.
"3rd Generation Partnership Project; Technical Specification Group Services and System Aspects; Study on Architecture for Next Generation System (Release 14)," 3GPP TR 23.799 V1.1.0, Oct. 2016, 501 Pages.
"3rd Generation Partnership Project; Technical Specification Group Radio Access Network; Study on New Radio Access Technology; Radio Access Architecture and Interfaces (Release 14)," 3GPP TR 38.801 V0.4.0, Aug. 2016, 36 Pages.
"3rd Generation Partnership Project; Technical Specification Group Radio Access Network; Study on New Radio (NR) Access Technology Physical Layer Aspects (Release 14)," 3GPP TR 38.802 V1.0.0, Nov. 2016, 64 Pages.
"3rd Generation Partnership Project; Technical Specification Group Radio Access Network; Study on New Radio Access Technology; Radio Interface Protocol Aspects (Release 14)," 3GPP TR 38.804 V0.4.0, Nov. 2016, 30 Pages.
"3rd Generation Partnership Project; Technical Specification Group Radio Access Network; Study on New Radio Access Technology (Release 14)," 3GPP TR 38.912 V0.0.2, Sep. 2016, 11 Pages.
ETSI MCC, "Report of 3GPP TSG RAN WG2 meeting #94," 3GPP TSG-RAN Working Group 2 meeting #95 R2-164670, Aug. 2016, 267 Pages.
"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.0.0, Sep. 2016, 643 Pages.
Nokia, et al., "Support for Beam Based Common Control Plane," 3GPP TSG-RAN WG1#85 R1-165364, May 2016, 5 Pages.
Ericsson, "RAN support for network slicing," 3GPP TSG-RAN WG2 #95 Tdoc R2-165542, Aug. 2016, 4 Pages.
Office Action dated Dec. 8, 2021 in European Application No. 17887656.1.
Office Action dated Dec. 14, 2021 in Indian Application No. 201947022649 (English translated).
Office Action dated Nov. 30, 2021 in Chinese Application No. 201780079241.1 (w/English translation).
Notice of Reasons for Refusal dated Feb. 8, 2022 in Japanese Patent Application No. 2018-559625 (with English language translation), 6 pages.
Indian Office Action dated Jan. 10, 2023, issued in Indian Patent Application No. 202248052624 (with English translation).
Indian Office Action dated Dec. 27, 2022, issued in Indian Patent Application No. 202248052421 (with English translation).
Indian Office Action dated Dec. 27, 2022, issued in Indian Patent Application No. 202248052448 (with English translation).
Indian Office Action dated Jan. 10, 2023, issued in Indian Patent Application No. 202248052553 (with English translation).
Office Action dated Jun. 6, 2022 in Chinese Application No. 201780079241.1 (w/computer-generated English translation).
Japanese Office Action dated Aug. 16, 2022, issued in Japanese Patent Application No. 2018-559625 (with English translation).
European Office Action dated Jul. 20, 2023, issued in European Application No. 17 887 656.1.

* cited by examiner

F I G . 1
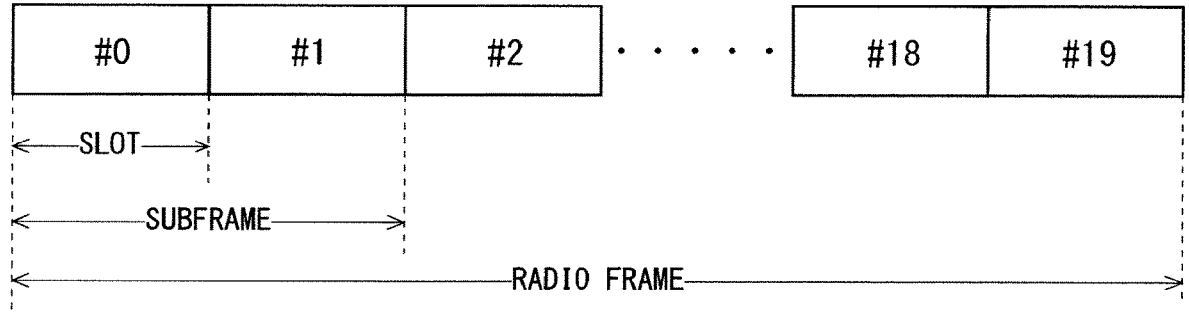

F I G. 5
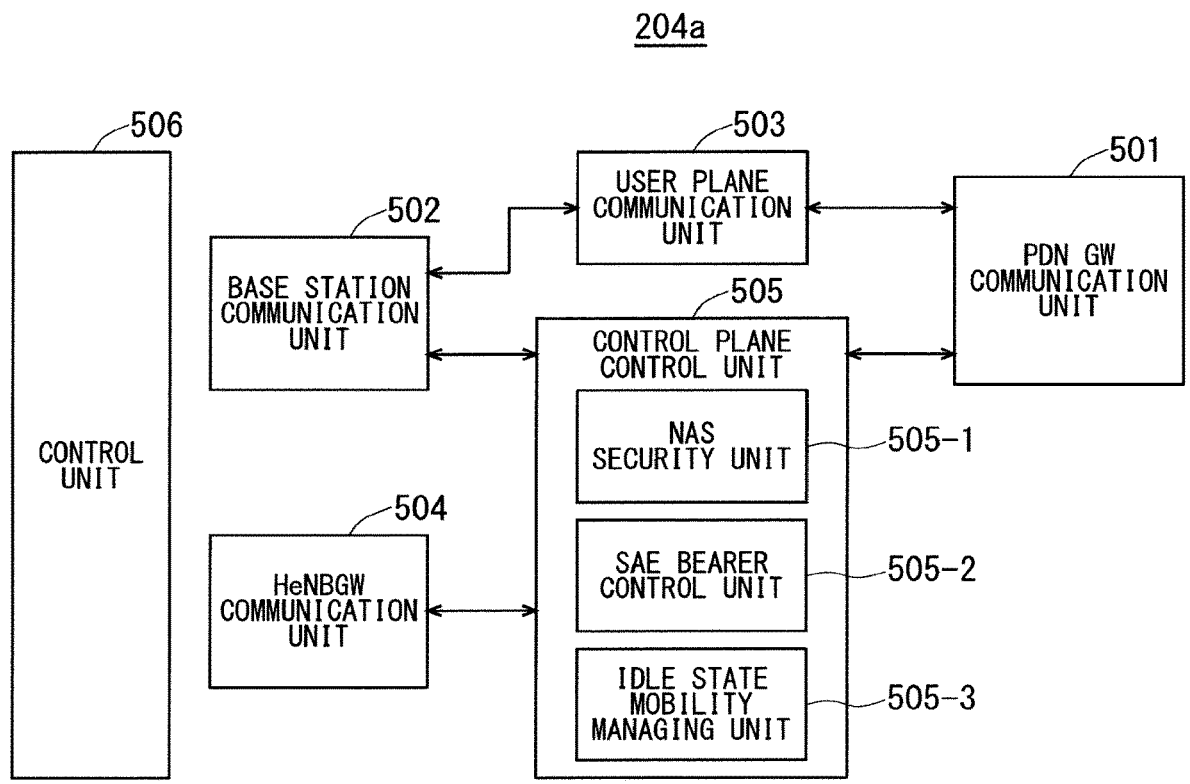

F I G . 8
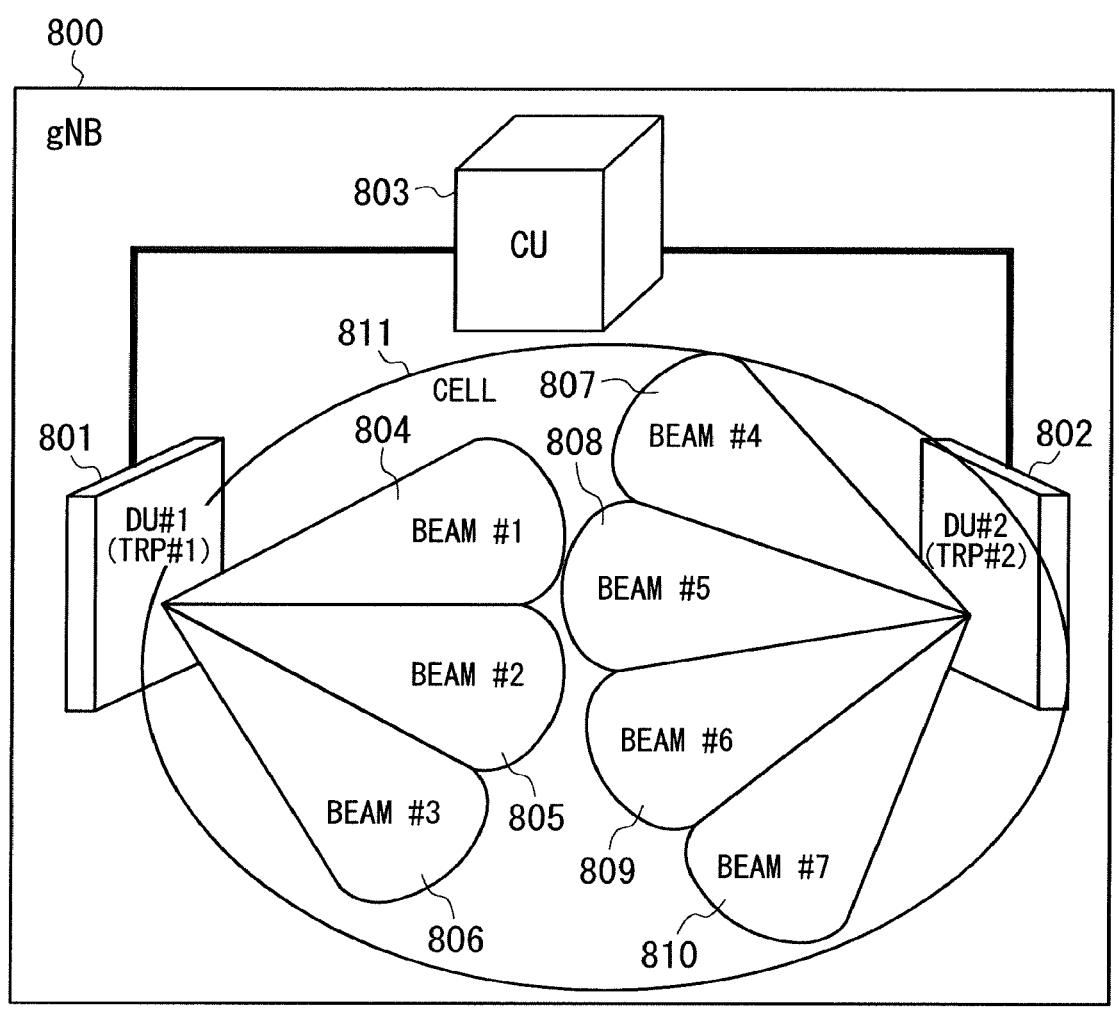

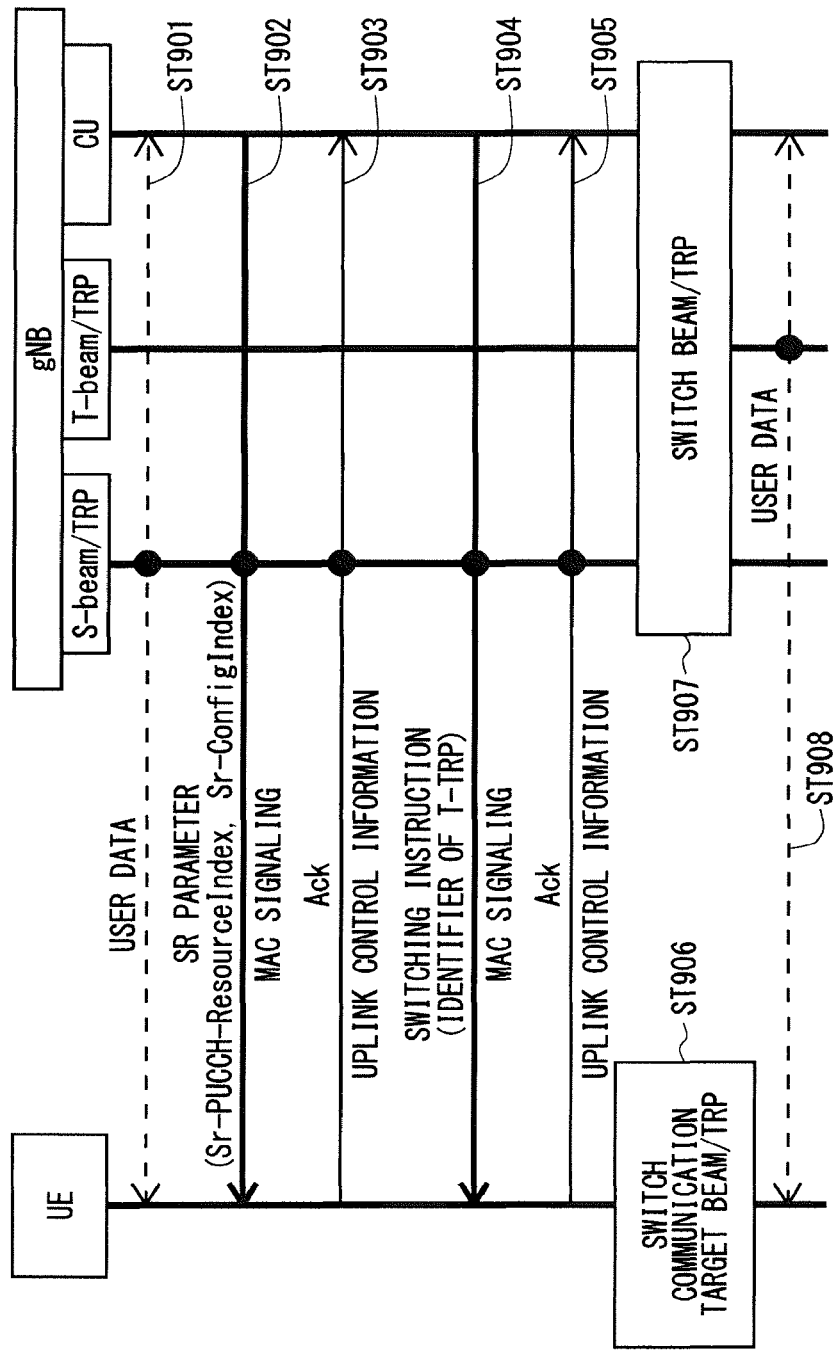

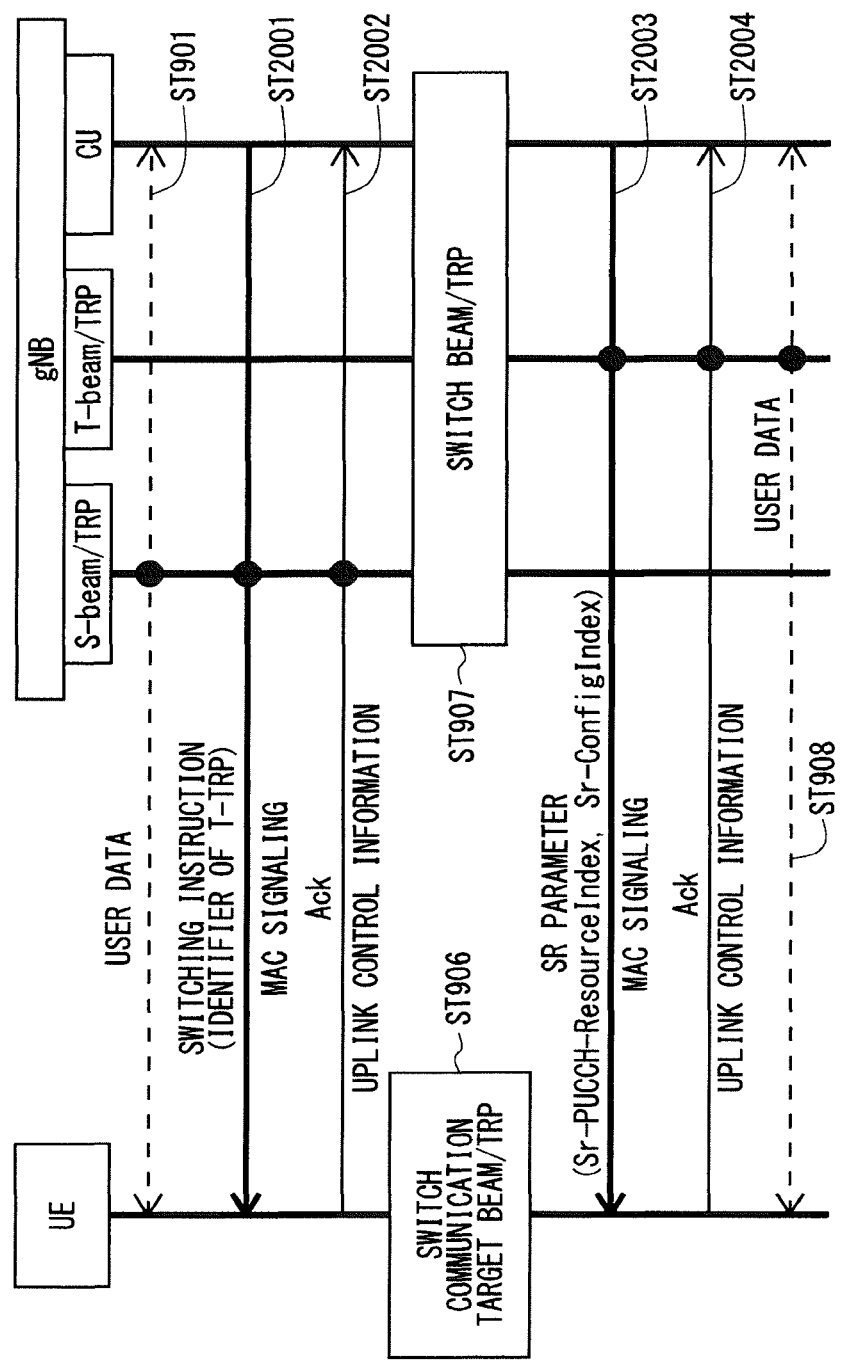

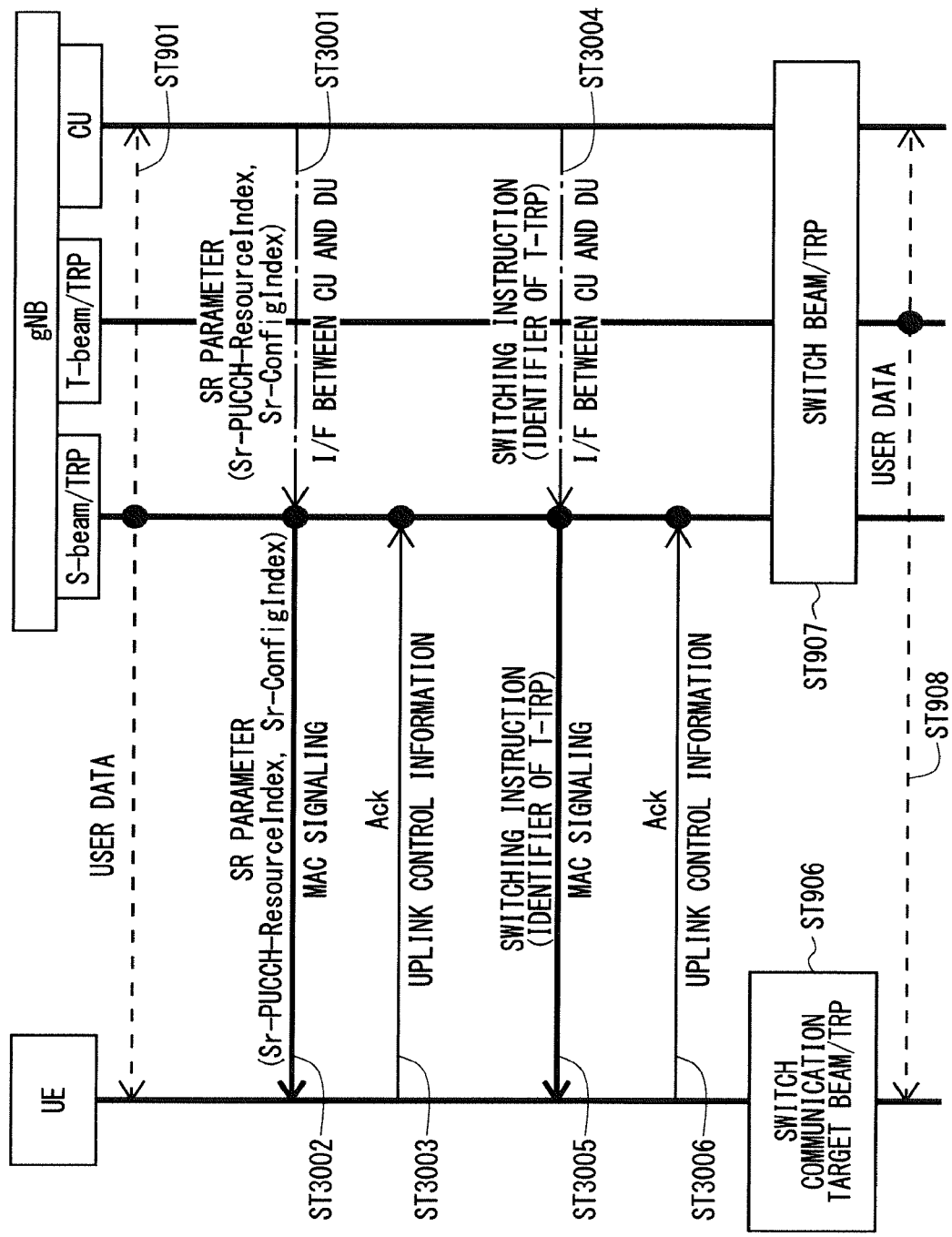

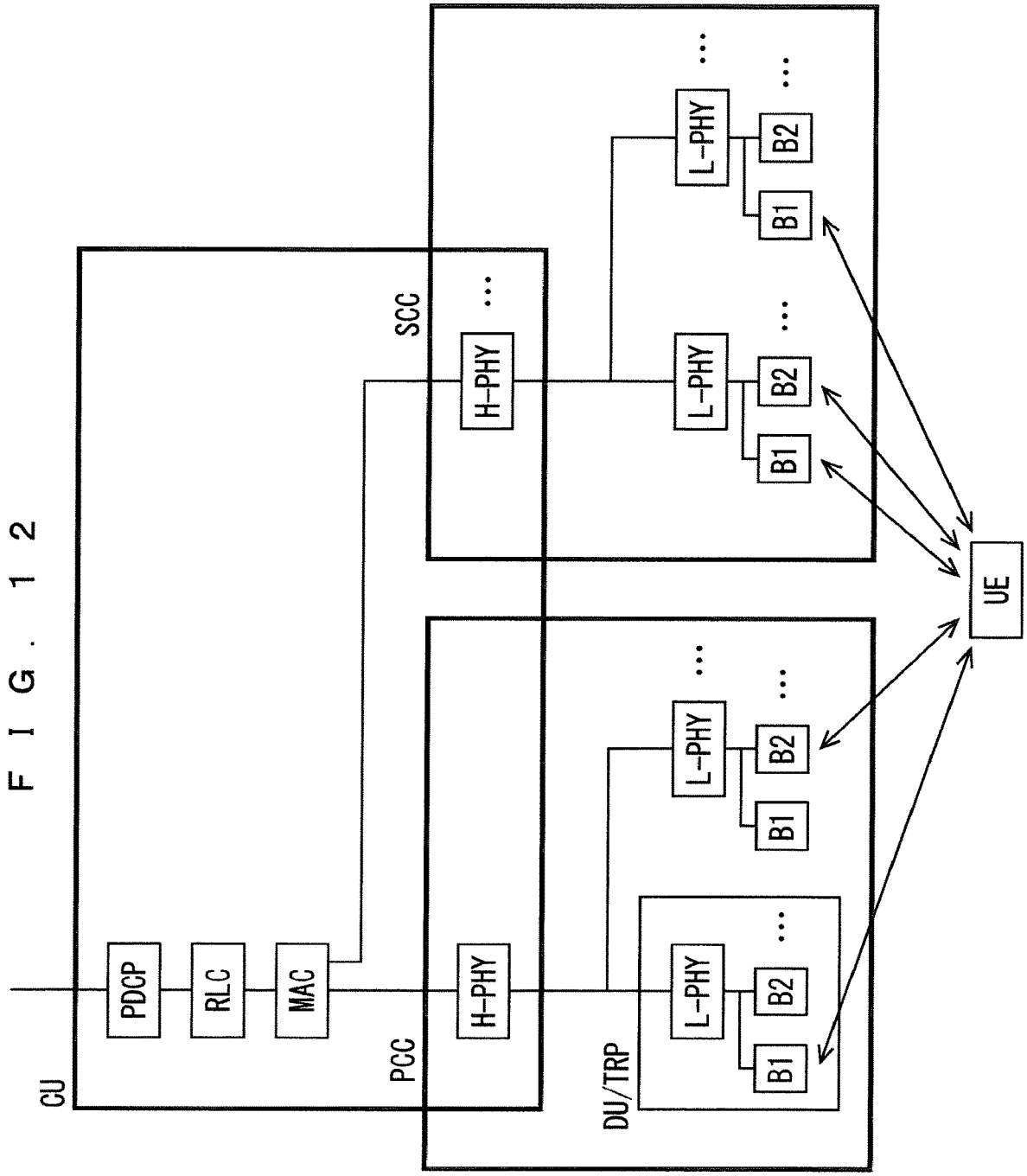

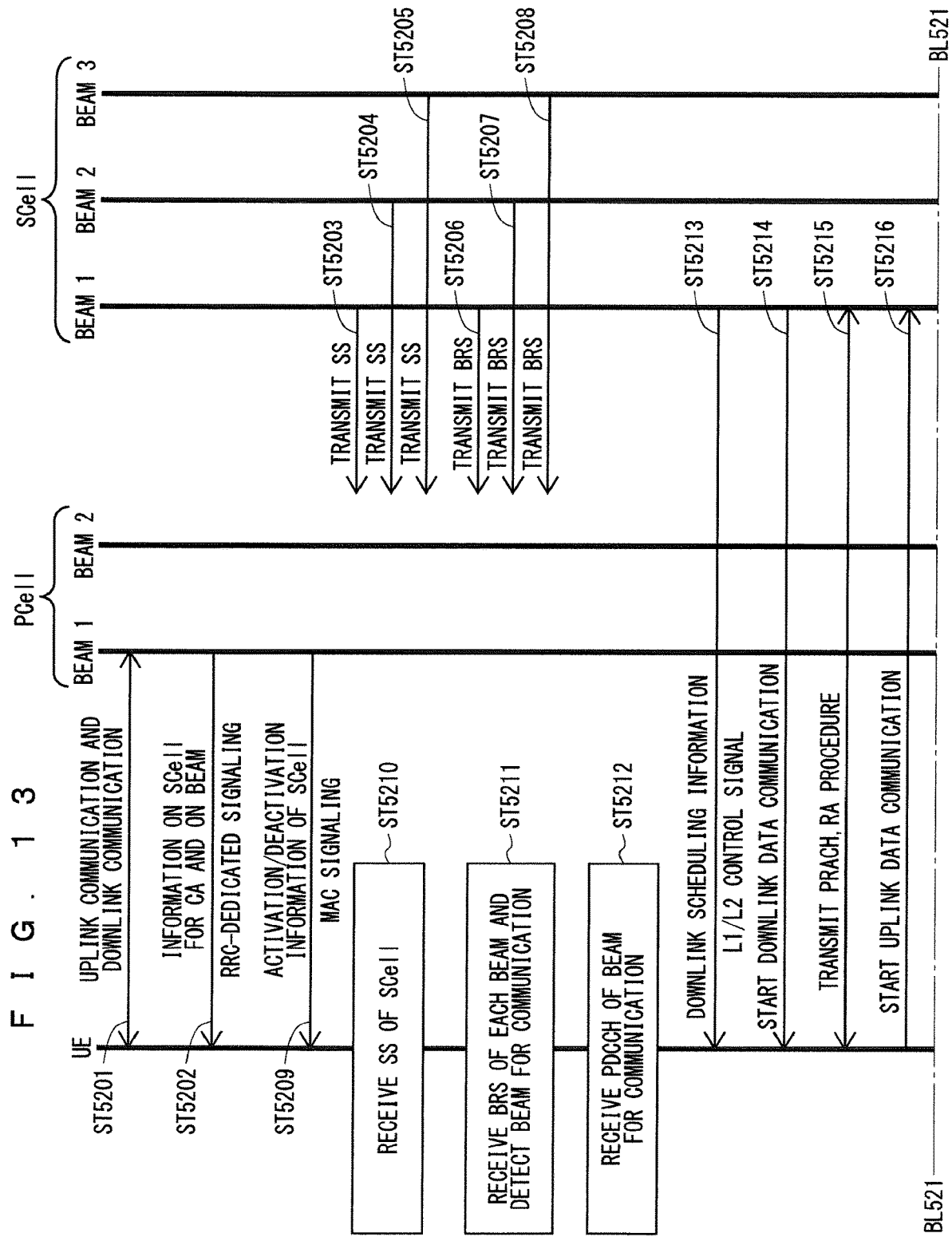

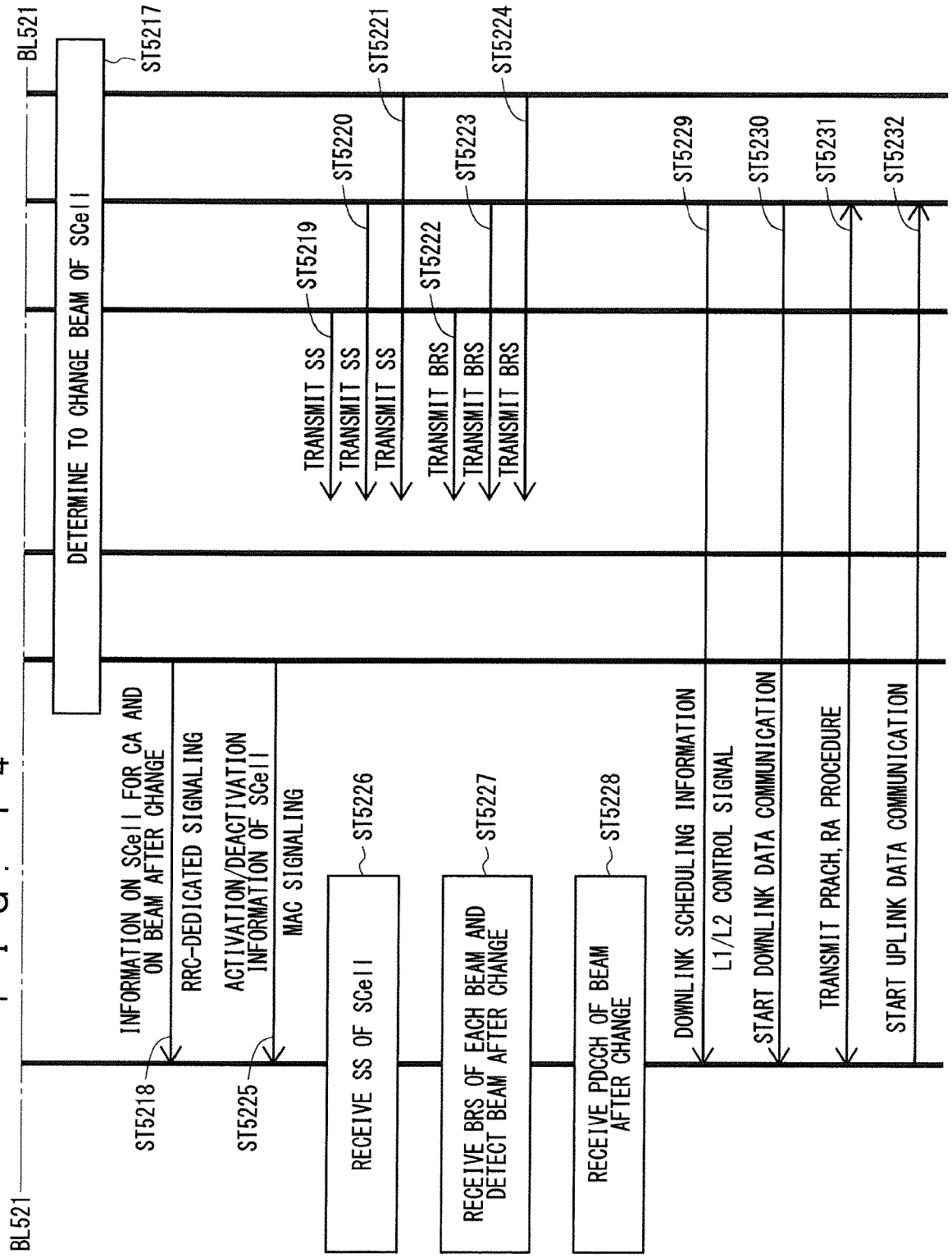

F I G . 1 5

| B6 | B5 | B4 | B3 | B2 | B1 | B0 | R |

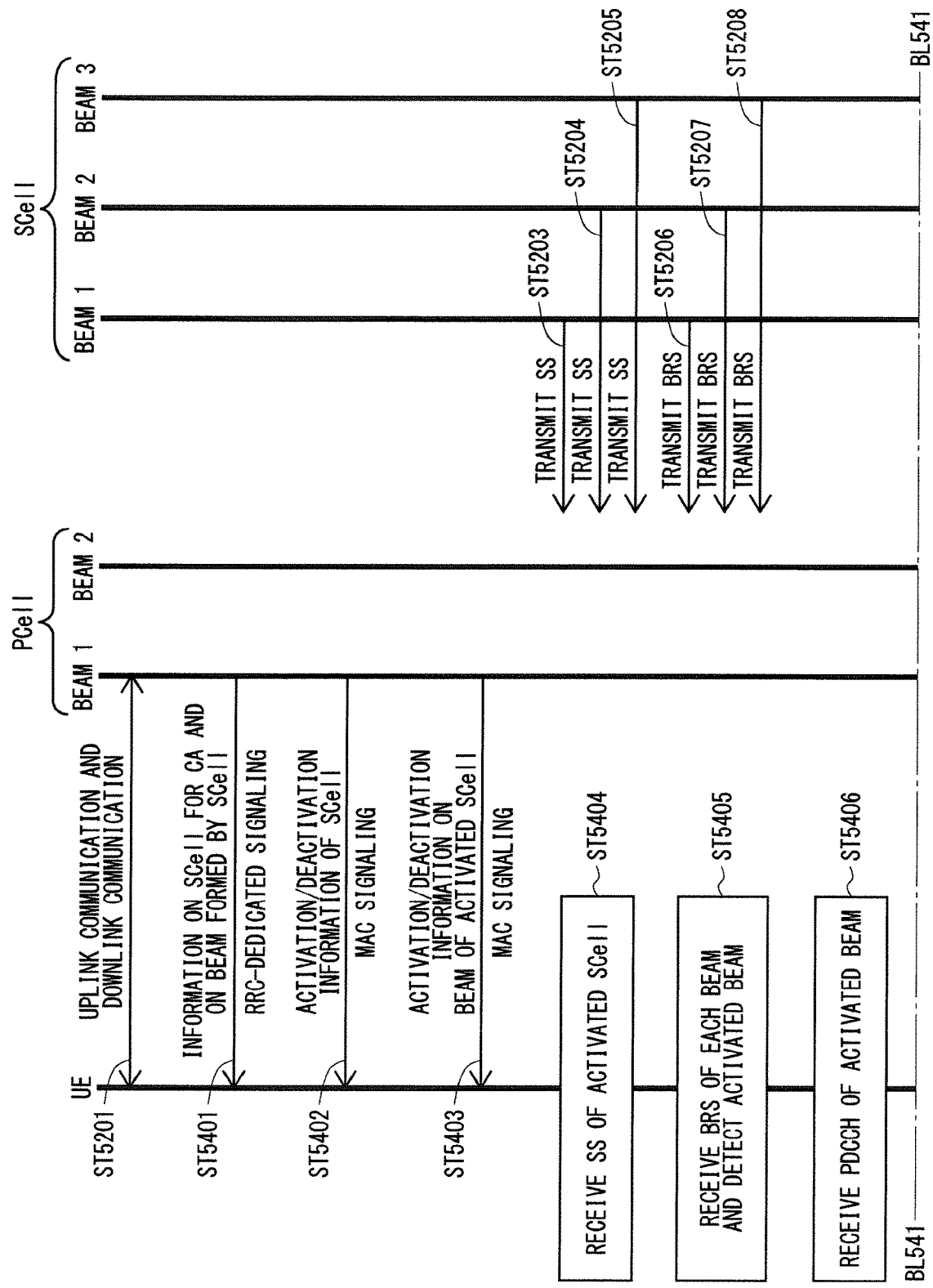
F I G. 1 6

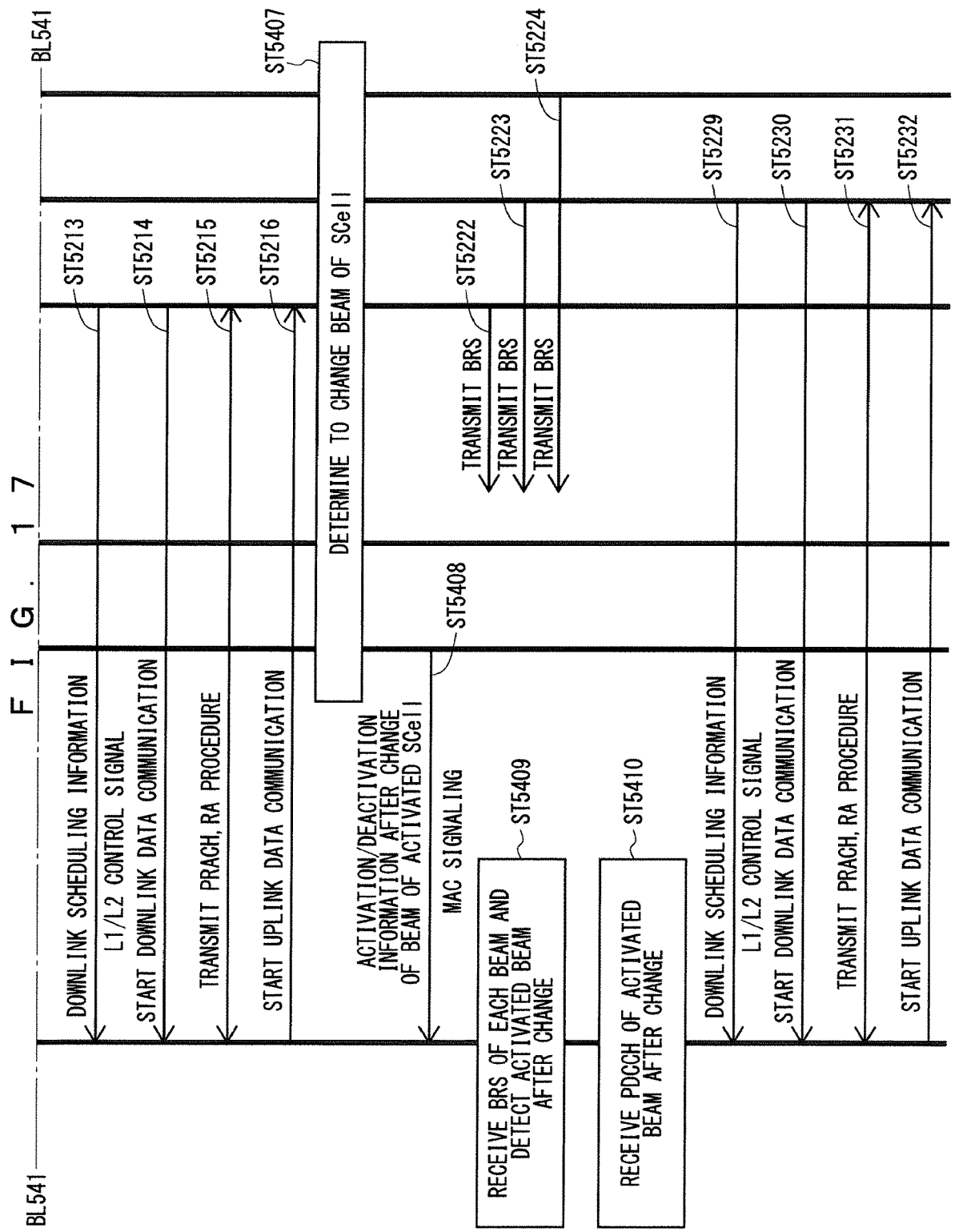

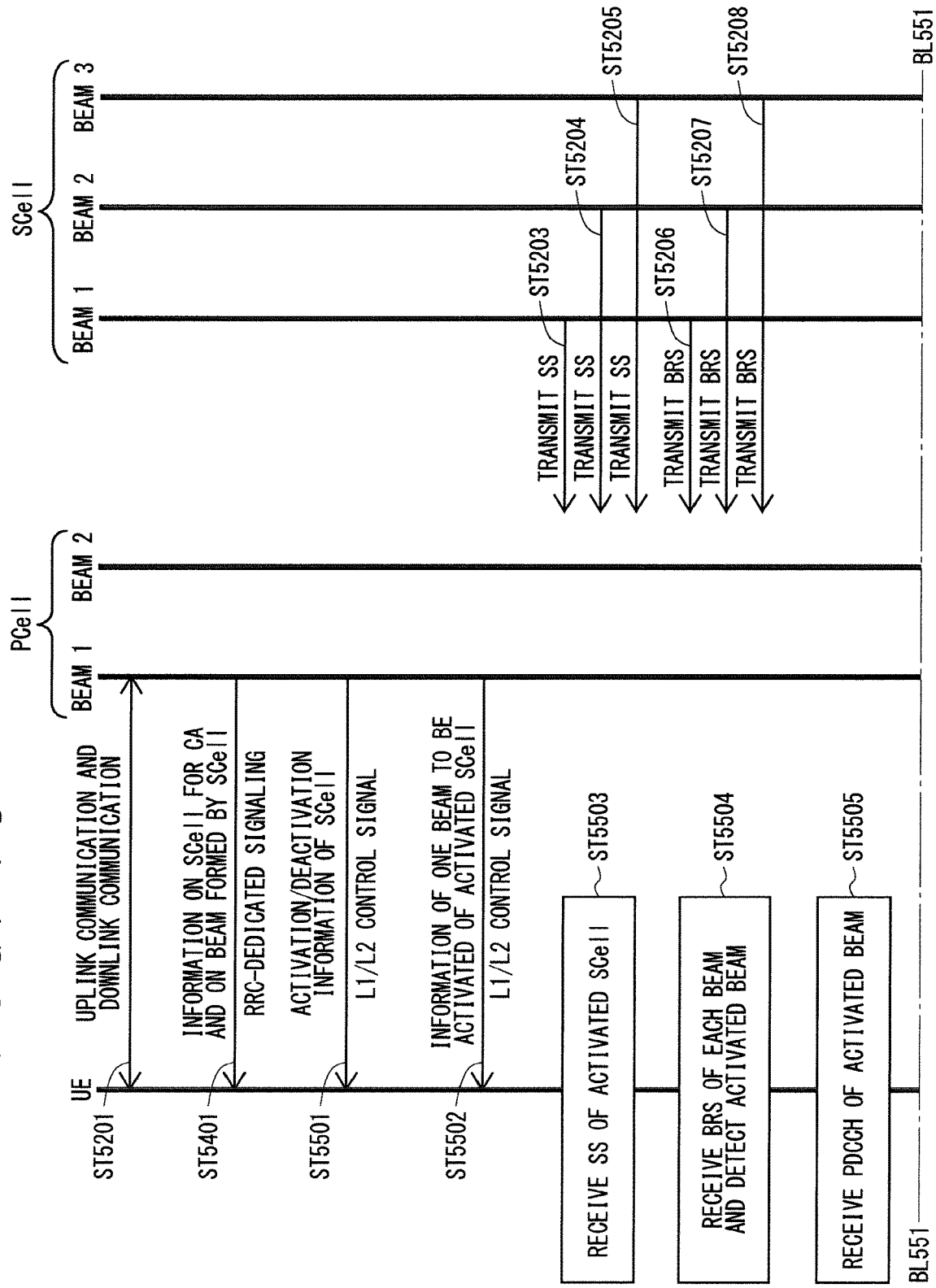

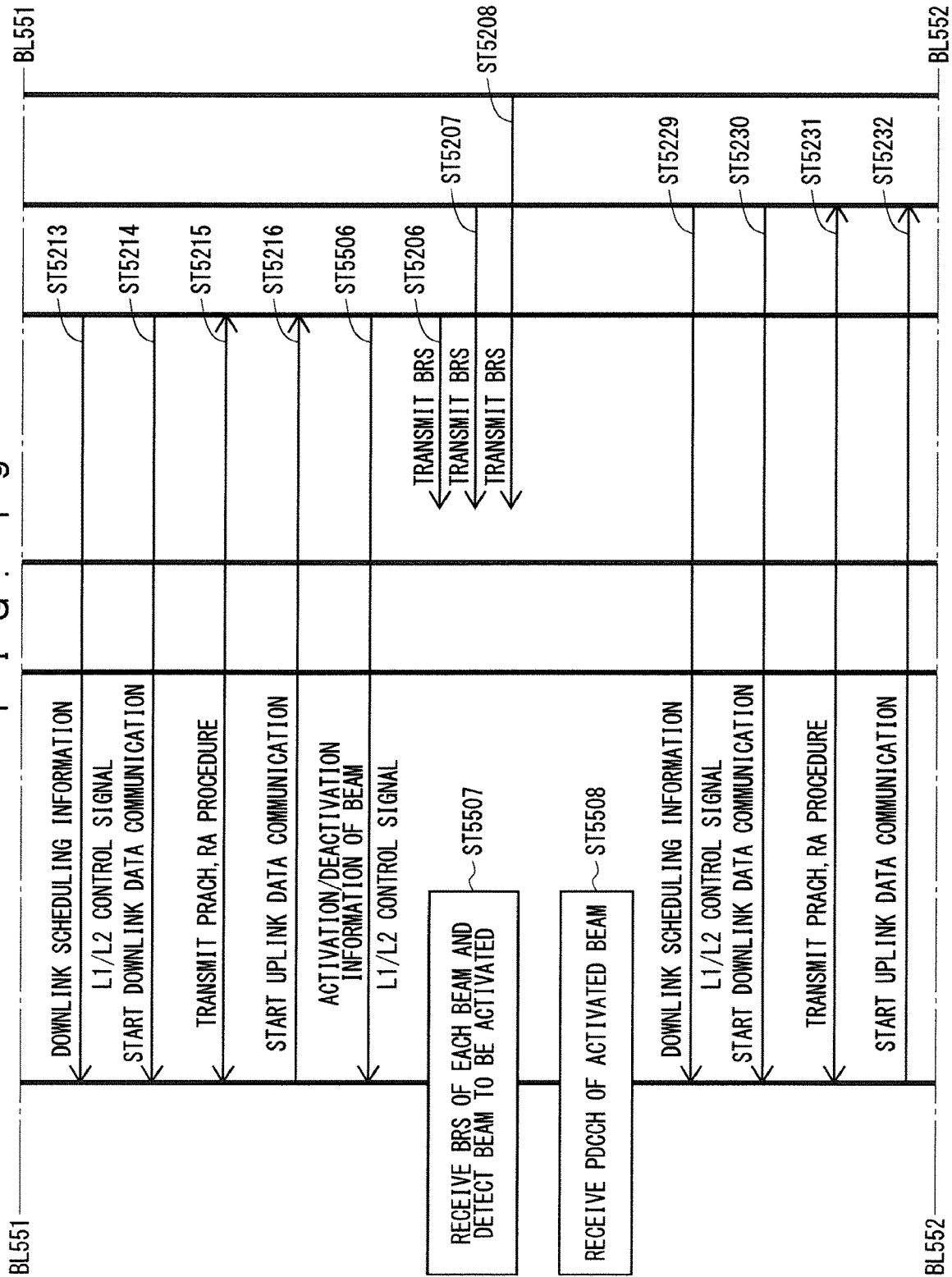

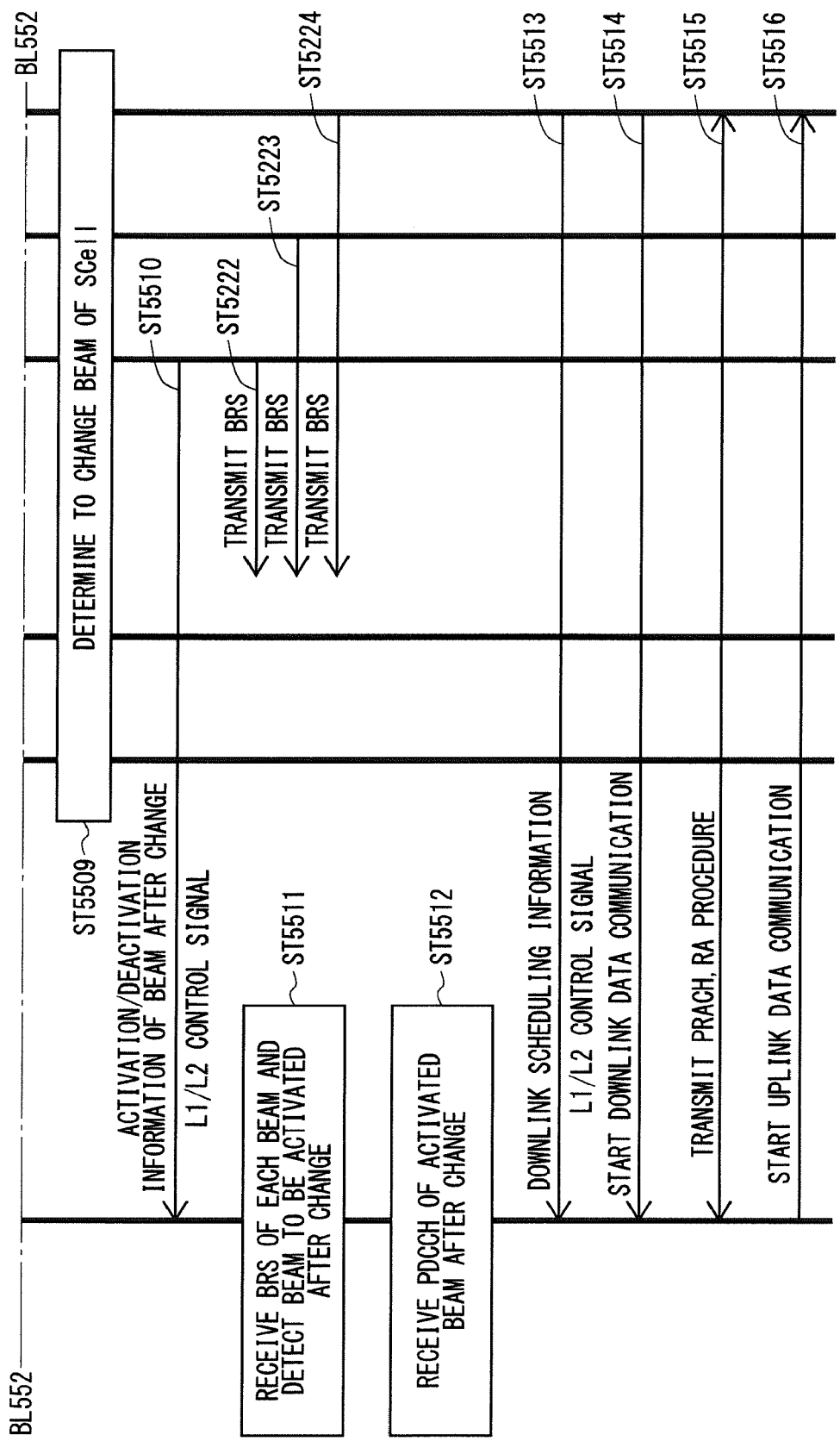

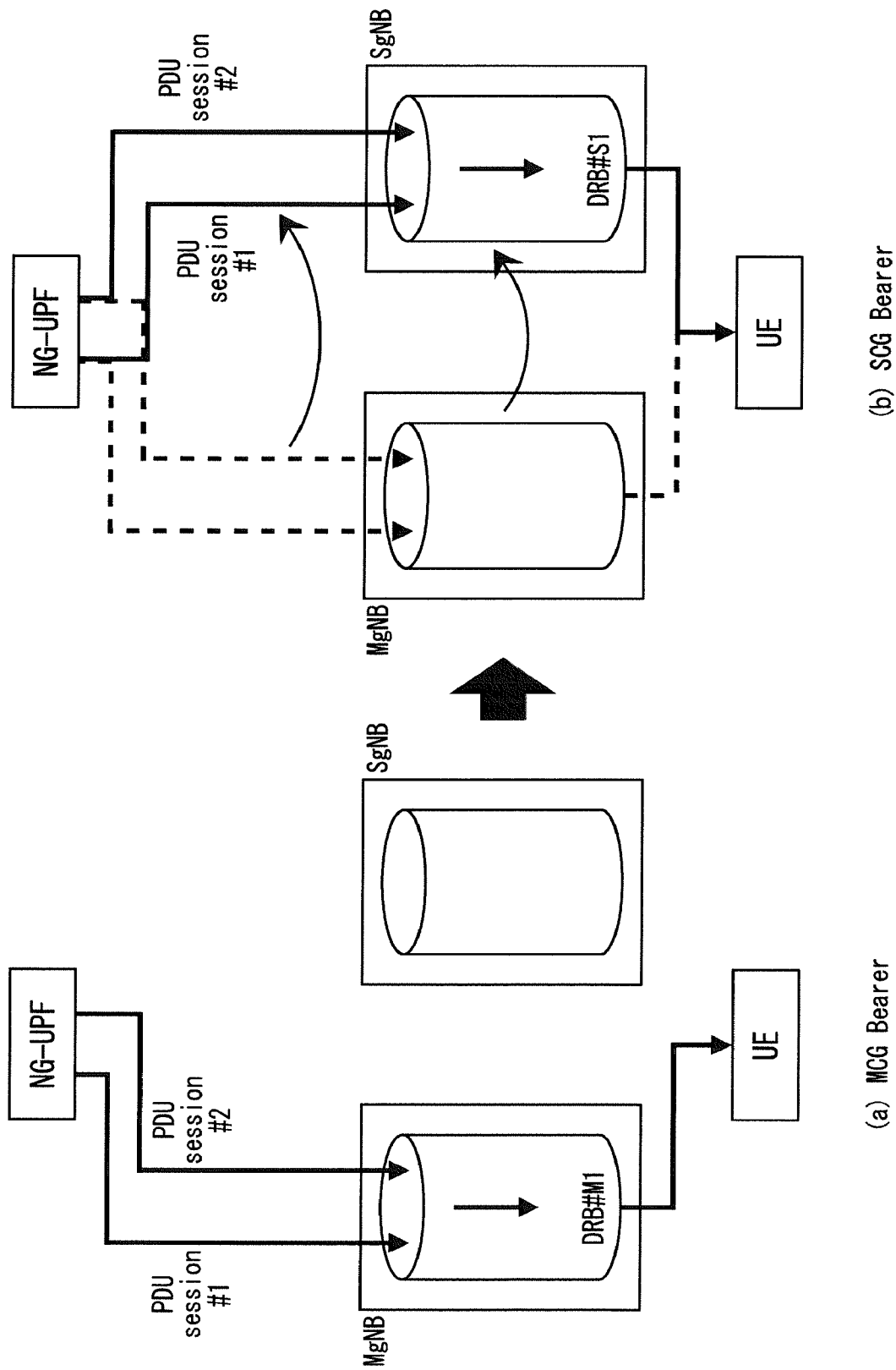

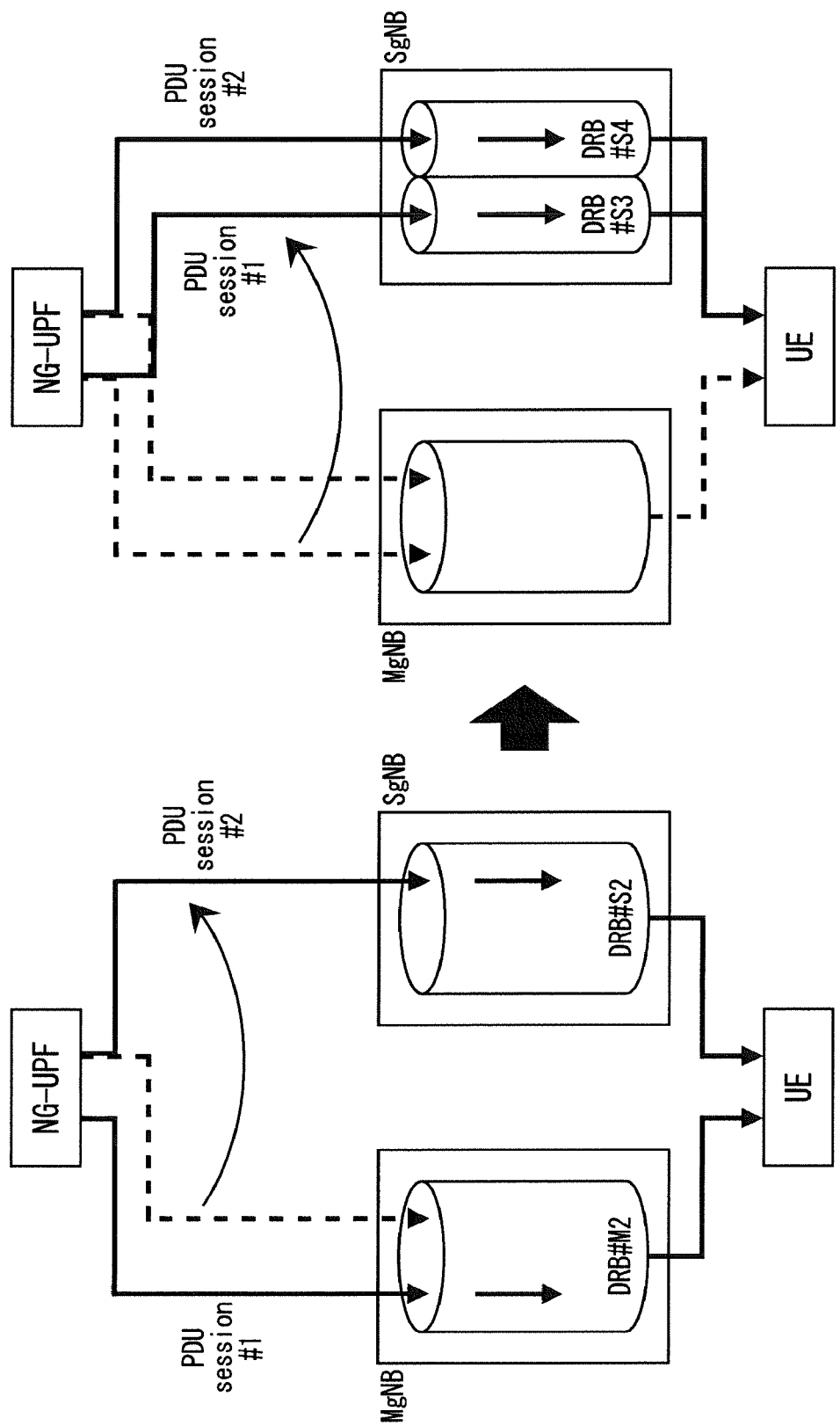

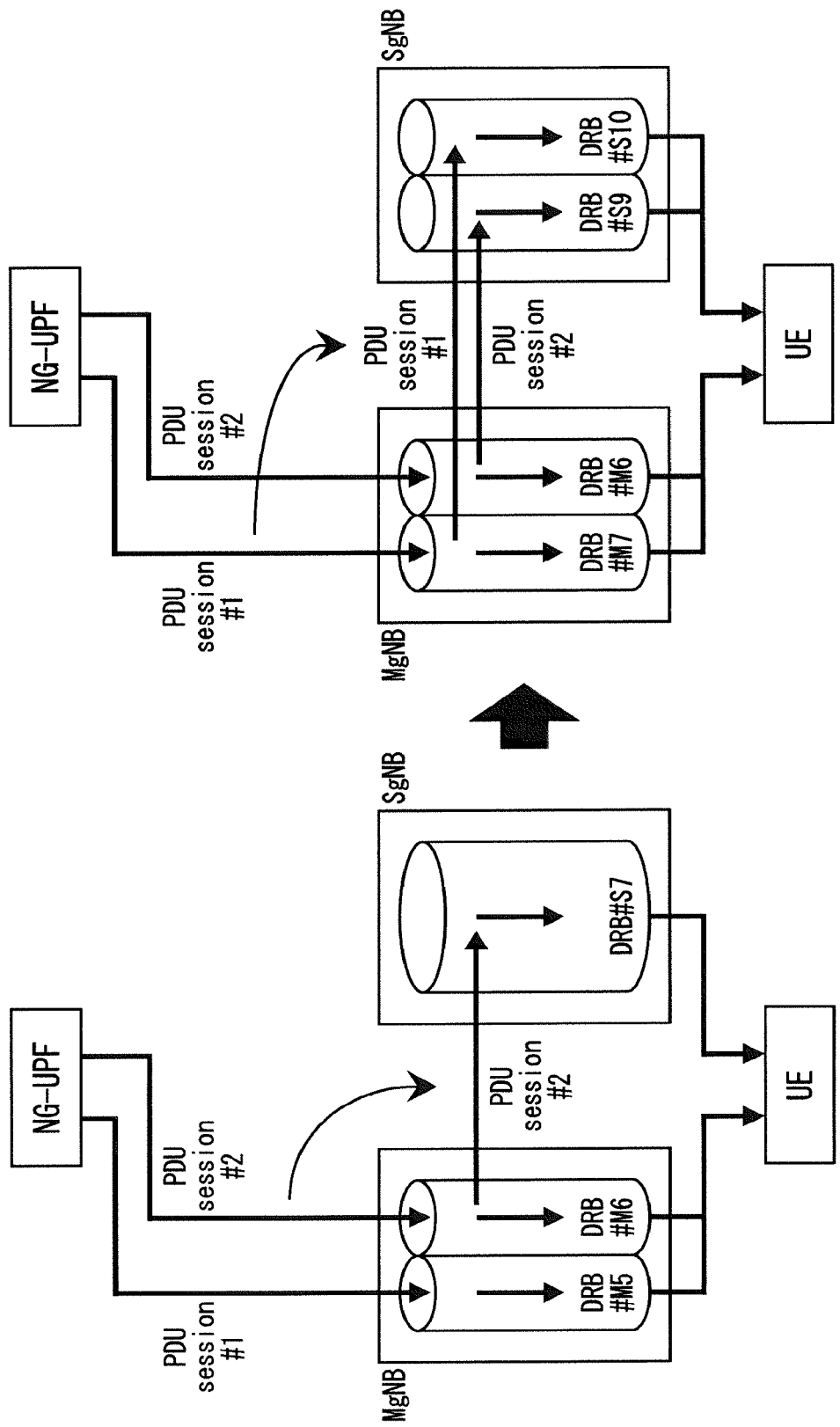

COMMUNICATION SYSTEM

TECHNICAL FIELD

The present invention relates to a communication system in which radio communication is performed between a communication terminal device such as a user equipment device and a base station device.

BACKGROUND ART

The 3rd generation partnership project (3GPP), the standard organization regarding the mobile communication system, is studying communication systems referred to as long term evolution (LTE) regarding radio sections and system architecture evolution (SAE) regarding the overall system configuration including a core network and a radio access network which is hereinafter collectively referred to as a network as well (for example, see Non-Patent Documents 1 to 5). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication system is only provided in the LTE.

The decisions taken in 3GPP regarding the frame configuration in the LTE system described in Non-Patent Document 1 (Chapter 5) are described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal per radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in the LTE system. It is assumed that the same channel configuration is used in a closed subscriber group (CSG) cell as that of a non-CSG cell.

A physical broadcast channel (PBCH) is a channel for downlink transmission from a base station device (hereinafter may be simply referred to as a "base station") to a communication terminal device (hereinafter may be simply referred to as a "communication terminal") such as a user equipment device (hereinafter may be simply referred to as a "user equipment"). A BCH transport block is mapped to four subframes within a 40 ms interval. There is no explicit signaling indicating 40 ms timing.

A physical control format indicator channel (PCFICH) is a channel for downlink transmission from a base station to a communication terminal. The PCFICH notifies the number of orthogonal frequency division multiplexing (OFDM) symbols used for PDCCHs from the base station to the communication terminal. The PCFICH is transmitted per subframe.

A physical downlink control channel (PDCCH) is a channel for downlink transmission from a base station to a communication terminal. The PDCCH notifies the resource allocation information for downlink shared channel (DL-SCH) being one of the transport channels described below, resource allocation information for a paging channel (PCH) being one of the transport channels described below, and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) is a channel for downlink transmission from a base station to a communication terminal. A downlink shared channel (DL-SCH) that is a transport channel and a PCH that is a transport channel are mapped to the PDSCH.

A physical multicast channel (PMCH) is a channel for downlink transmission from a base station to a communication terminal. A multicast channel (MCH) that is a transport channel is mapped to the PMCH.

A physical uplink control channel (PUCCH) is a channel for uplink transmission from a communication terminal to a base station. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) is a channel for uplink transmission from a communication terminal to a base station. An uplink shared channel (UL-SCH) that is one of the transport channels is mapped to the PUSCH.

A physical hybrid ARQ indicator channel (PHICH) is a channel for downlink transmission from a base station to a communication terminal. The PHICH carries Ack/Nack that is a response signal to uplink transmission. A physical random access channel (PRACH) is a channel for uplink transmission from the communication terminal to the base station. The PRACH carries a random access preamble.

A downlink reference signal (RS) is a known symbol in the LTE communication system. The following five types of downlink reference signals are defined as: a cell-specific reference signal (CRS), an MBSFN reference signal, a data demodulation reference signal (DM-RS) being a UE-specific reference signal, a positioning reference signal (PRS), and a channel state information reference signal (CSI-RS). The physical layer measurement objects of a communication terminal include reference signal received powers (RSRPs).

The transport channels described in Non-Patent Document 1 (Chapter 5) are described. A broadcast channel (BCH) among the downlink transport channels is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a communication terminal for enabling the communication terminal to save power. The DL-SCH is mapped to the physical downlink shared channel (PDSCH).

The paging channel (PCH) supports DRX of the communication terminal for enabling the communication terminal to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcasting the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ is described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method is described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "AcK" to the transmitter. The transmitter that has received "Ack" transmits the next data.

The logical channels described in Non-Patent Document 1 (Chapter 6) are described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a communication terminal. The PCCH that is a logical channel is mapped to the paging channel (PCH) that is a transport channel.

A common control channel (CCCH) is a channel for transmission control information between communication terminals and a base station. The CCCH is used in a case where the communication terminals have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a communication terminal. The MCCH is used only by a communication terminal during reception of the MBMS. The MCCH is mapped to the multicast channel (MCH) that is a transport channel.

A dedicated control channel (DCCH) is a channel that transmits dedicated control information between a communication terminal and a network on a point-to-point basis. The DCCH is used when the communication terminal has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated communication terminal. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a communication terminal. The MTCH is a channel used only by a communication terminal during reception of the MBMS. The MTCH is mapped to the multicast channel (MCH).

CGI represents a cell global identifier. ECGI represents an E-UTRAN cell global identifier. A closed subscriber group (CSG) cell is introduced into the LTE, and the long term evolution advanced (LTE-A) and universal mobile telecommunication system (UNITS) described below.

The closed subscriber group (CSG) cell is a cell in which subscribers who are allowed to use are specified by an operator (hereinafter, also referred to as a "cell for specific subscribers"). The specified subscribers are allowed to access one or more cells of a public land mobile network (PLMN). One or more cells to which the specified subscribers are allowed access are referred to as "CSG cell(s)". Note that access is limited in the PLMN.

The CSG cell is part of the PLMN that broadcasts a specific CSG identity (CSG ID) and broadcasts "TRUE" in a CSG indication. The authorized members of the subscriber group who have registered in advance access the CSG cells using the CSG ID that is the access permission information.

The CSG ID is broadcast by the CSG cell or cells. A plurality of CSG IDs exist in the LTE communication system. The CSG IDs are used by communication terminals (UEs) for making access from CSG-related members easier.

The locations of communication terminals are tracked based on an area composed of one or more cells. The locations are tracked for enabling tracking the locations of communication terminals and calling communication terminals, in other words, incoming calling to communication terminals even in an idle state. An area for tracking locations of communication terminals is referred to as a tracking area.

In 3GPP, base stations referred to as Home-NodeB (Home-NB; HNB) and Home-eNodeB (Home-eNB; HeNB) are studied. HNB/HeNB is a base station for, for example, household, corporation, or commercial access service in UTRAN/E-UTRAN. Non-Patent Document 2 discloses three different modes of the access to the HeNB and HNB. Specifically, an open access mode, a closed access mode, and a hybrid access mode are disclosed.

Further, specifications of long term evolution advanced (LTE-A) are pursed as Release 10 in 3GPP (see Non-Patent Documents 3 and 4). The LTE-A is based on the LTE radio communication system and is configured by adding several new techniques to the system.

Carrier aggregation (CA) is studied for the LTE-A system in which two or more component carriers (CCs) are aggregated to support wider transmission bandwidths up to 100 MHz. Non-Patent Document 1 describes the CA.

In a case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one UE.

The new techniques in the LTE-A include the technique of supporting wider bands (wider bandwidth extension) and the coordinated multiple point transmission and reception (CoMP) technique. The CoMP studied for LTE-A in 3GPP is described in Non-Patent Document 1.

Furthermore, the use of small eNBs (hereinafter also referred to as "small-scale base station devices") configuring small cells is studied in 3GPP to satisfy tremendous traffic in the future. In an example technique under study, a large number of small eNBs is installed to configure a large number of small cells, which increases spectral efficiency and communication capacity. The specific techniques include dual connectivity (abbreviated as DC) with which a UE communicates with two eNBs through connection thereto. Non-Patent Document 1 describes the DC.

For eNBs that perform dual connectivity (DC), one may be referred to as a master eNB (abbreviated as MeNB), and the other may be referred to as a secondary eNB (abbreviated as SeNB).

The traffic flow of a mobile network is on the rise, and the communication rate is also increasing. It is expected that the communication rate is further increased when the operations of the LTE and the LTE-A are fully initiated.

For increasingly enhanced mobile communications, the fifth generation (hereinafter also referred to as "5G") radio access system is studied whose service is aimed to be launched in 2020 and afterward. For example, in the Europe, an organization named METIS summarizes the requirements for 5G (see Non-Patent Document 5).

The requirements in the 5G radio access system show that a system capacity shall be 1000 times as high as, a data transmission rate shall be 100 times as high as, a data latency shall be one tenth (1/10) as low as, and simultaneously connected communication terminals 100 times as many as those of the LTE system, to further reduce the power consumption and device cost.

To satisfy such requirements, the study of 5G standards is pursued as Release 14 in 3GPP (see Non-Patent Documents 6 to 10). The techniques on 5G radio sections are referred to as "New Radio (abbreviated as NR) Access Technology", and the several new techniques are being studied (see Non-Patent Documents 11 to 14). For example, those studies include mobility without involving the RRC, multi-beamforming (MBF) through analog beamforming or hybrid beamforming, and network slicing.

PRIOR-ART DOCUMENTS

Non-Patent Documents

Non-Patent Document 1: 3GPP TS36.300 V14.0.0
Non-Patent Document 2: 3GPP S1-083461
Non-Patent Document 3: 3GPP TR 36.814 V9.0.0
Non-Patent Document 4: 3GPP TR 36.912 V13.0.0
Non-Patent Document 5: "Scenarios, requirements and KPIs for 5G mobile and wireless system", [online], Apr. 30, 2013, ICT-317669-METIS/D1.1, [Searched on Dec. 8, 2016], Internet <https://www.metis2020.com/documents/deliverables/>
Non-Patent Document 6: 3GPP TR 23.799 V1.1.0
Non-Patent Document 7: 3GPP TR 38.801 V0.4.0
Non-Patent Document 8: 3GPP TR 38.802 V1.0.0
Non-Patent Document 9: 3GPP TR 38.804 V0.4.0
Non-Patent Document 10: 3GPP TR 38.912 V0.0.2
Non-Patent Document 11: 3GPP R2-164670
Non-Patent Document 12: 3GPP TS 36.331 V14.0.0
Non-Patent Document 13: 3GPP R1-165364
Non-Patent Document 14: 3GPP R2-165542

SUMMARY

Problems to be Solved by the Invention

Under the NR, the mobility without involving the RRC is being studied. In the NR applying frequencies higher than those of the LTE, a necessary coverage is covered by concentrating the power in a narrow area through forming beams and using one or more of the beams. Since the movement of the UE involves frequent mobility of beams, the mobility without involving the RRC reduces signaling involving the mobility between beams.

In the communication via a plurality of beams or a plurality of transmission/reception points (TRPs) under the NR, a communicable space is separated by the beams or the TRPs. How to handle an RRC parameter in such cases has not yet been disclosed. Thus, even when the communicable space is separated in a cell, the number of UEs to be accommodated in the cell cannot be increased.

If the carrier aggregation (CA) for aggregating and using a plurality of carriers as radio resources for communication is applied to the NR, it is unclear that which beams in the cell should be aggregated. Thus, a gNB cannot set the CA to the UE. Consequently, many radio resources cannot be used, and a high-speed and large-capacity communication service cannot be provided for the UE.

In addition, the dual connectivity (DC) used as a technique for providing the high-speed and large-capacity communication service under the LTE has required the bearer settings from the master eNB (MeNB) to the secondary eNB (SeNB). An E-RAB parameter has been used for making this bearer setting request. Since the network slicing is used in the 5G, application of flow-based control between the CN and the RAN and bearer-based control in the RAN is under discussion. This eliminates the E-RAB, thus making unclear a method for requesting the bearer settings from a master gNB (MgNB) to a secondary gNB (SgNB). Consequently, the DC is not available in the 5G, and the use efficiency of the radio resources substantially decreases.

The object of the present invention is to provide, under the NR, a communication system which enables increasing the number of accommodated UEs and high-speed and large-capacity communication in the UE.

Means to Solve the Problems

A first communication system according to the present invention includes: a communication terminal device; and a base station device that performs radio communication with the communication terminal device via a radio beam, wherein a cell configured by the base station device is spatially separated by a plurality of radio beams being served by the base station device, and the base station device shares, between two or more of the plurality of radio beams, a radio resource control (RRC) parameter to be applied to the communication terminal device.

A second communication system according to the present invention includes: a communication terminal device; and a base station device that performs radio communication with the communication terminal device via a radio beam, wherein a cell configured by the base station device is spatially separated by a plurality of radio beams being served by the base station device, and the base station device changes a radio resource control (RRC) parameter to be applied to the communication terminal device from a first RRC parameter for a first radio beam to a second RRC parameter for a second radio beam when the communication terminal device moves from a range of the first radio beam to a range of the second radio beam.

A third communication system according to the present invention includes: a communication terminal device; and a base station device that performs radio communication with the communication terminal device via a radio beam, wherein a cell configured by the base station device is spatially separated by a plurality of radio beams being served by the base station device, and the base station device sets carrier aggregation per radio beam.

A fourth communication system according to the present invention includes: a communication terminal device; a plurality of base station devices to be radio communicatively connected to the communication terminal device; and a core network that manages communication between the communication terminal device and each of the plurality of base station devices, wherein when a first base station device connected to the communication terminal device requests a second base station device to set a bearer for the communication terminal device, the first base station device notifies the second base station device of information on Quality of Service (QoS) obtained from the core network on a PDU session, and the second base station device sets the bearer for the communication terminal device based on the notified information on the QoS.

A fifth communication system according to the present invention includes: a communication terminal device; a plurality of base station devices to be radio communicatively connected to the communication terminal device; and a core network that manages communication between the communication terminal device and each of the plurality of base station devices, wherein when a first base station device connected to the communication terminal device requests a second base station device to set a bearer for the communication terminal device, the first base station device sets the bearer for the communication terminal device based on Quality of Service (QoS) obtained from the core network on a PDU session, and notifies the second base station device of information on the set bearer.

Effects of the Invention

In the first communication system according to the present invention, the RRC parameter to be applied to the communication terminal device is shared between two or more of the plurality of radio beams that spatially separate the cell configured by the base station device. Thus, the radio resource management can be simplified.

In the second communication system according to the present invention, the RRC parameter to be applied to the communication terminal device is changed according to change in the radio beam to be applied to the communication terminal device. Thus, the number of the communication terminal devices to be accommodated can be increased.

In the third communication system according to the present invention, the carrier aggregation is set per radio beam. Thus, a cell in which the beamforming is supported can be used for the carrier aggregation, and then the radio resources to be used can be increased. Consequently, the high-speed and large-capacity communication service can be provided.

In the fourth communication system according to the present invention, the first base station device notifies the second base station device of information on Quality of Service (QoS) obtained from the core network on a PDU session, and the second base station device sets the bearer for the communication terminal device based on the notified information on the QoS. Thus, the dual connectivity (DC) can be set in the fifth generation (5G) radio access system.

In the fifth communication system according to the present invention, the first base station device sets the bearer for the communication terminal device based on Quality of Service (QoS) obtained from the core network on a PDU session, and notifies the second base station device of information on the set bearer. Thus, the dual connectivity (DC) can be set in the fifth generation (5G) radio access system.

These and other objects, features, aspects and advantages of the present invention are more clarified from the following detailed description of the present invention when taken in conjunction with the accompanying drawings.

BRIEF DESCRIPTION OF DRAWINGS

Figure 1:
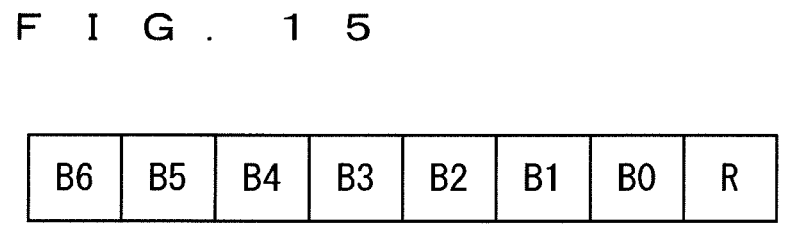

FIG. 1 is a diagram illustrating the configuration of a radio frame for use in an LTE communication system.

FIG. 5 is a block diagram showing the configuration of an MME according to the present invention.

FIG. 8 illustrates separation of a communicable space by a plurality of beams or TRPs according to the first embodiment.

FIG. 9 is a sequence diagram illustrating switching of a beam/TRP with a MAC signaling according to the second embodiment.

FIG. 10 is a sequence diagram illustrating switching of a beam/TRP with the MAC signaling according to the third embodiment.

FIG. 11 is a sequence diagram illustrating switching of a beam/TRP with the MAC signaling according to the fourth embodiment.

FIG. 12 illustrates the architecture for the CA that the gNB sets per beam according to the sixth embodiment.

FIG. 13 illustrates an example sequence for setting the CA per beam with an RRC signaling according to the sixth embodiment.

FIG. 14 illustrates the example sequence for setting the CA per beam with the RRC signaling according to the sixth embodiment.

FIG. 15 illustrates an example of MAC CEs of activation/deactivation information of beams according to the first modification of the sixth embodiment.

FIG. 16 illustrates an example sequence for setting the CA per beam with the MAC signaling according to the first modification of the sixth embodiment.

FIG. 17 illustrates the example sequence for setting the CA per beam with the MAC signaling according to the first modification of the sixth embodiment.

FIG. 18 illustrates an example sequence for setting the CA per beam with an L1/L2 control signal according to the second modification of the sixth embodiment.

FIG. 19 illustrates the example sequence for setting the CA per beam with the L1/L2 control signal according to the second modification of the sixth embodiment.

FIG. 20 illustrates the example sequence for setting the CA per beam with the L1/L2 control signal according to the second modification of the sixth embodiment.

FIG. 21 illustrates a method for setting the DC (an SCG bearer) according to the seventh embodiment.

FIG. 30 illustrates a method for setting the DC (SCG bearer) for each PDU session according to the second modification of the seventh embodiment.

FIG. 31 illustrates a method for setting the DC (split bearer) for each PDU session according to the second modification of the seventh embodiment.

DESCRIPTION OF EMBODIMENTS

The First Embodiment

Figure 2:
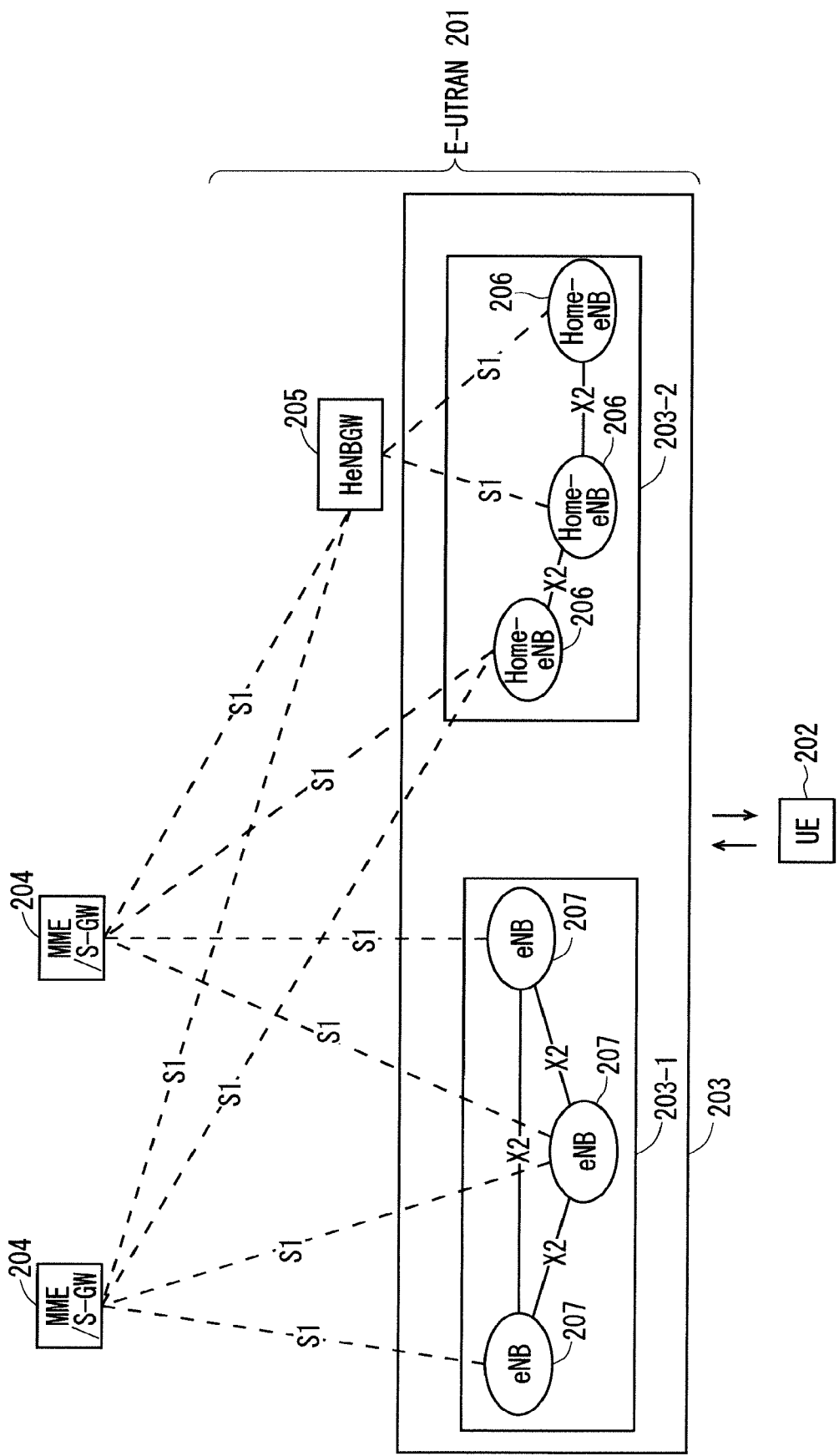
FIG. 2 is a block diagram showing the overall configuration of an LTE communication system 200 under discussion of 3GPP.

FIG. 2 is a block diagram showing an overall configuration of an LTE communication system 200 which is under discussion of 3GPP. FIG. 2 is described. A radio access network is referred to as an evolved universal terrestrial radio access network (E-UTRAN) 201. A user equipment device (hereinafter, referred to as a "user equipment (UE)") 202 that is a communication terminal device is capable of radio communication with a base station device (hereinafter, referred to as a "base station (E-UTRAN Node B: eNB)") 203 and transmits and receives signals through radio communication.

Here, the "communication terminal device" covers not only a user equipment device such as a movable mobile phone terminal device, but also an unmovable device such as a sensor. In the following description, the "communication terminal device" may be simply referred to as a "communication terminal".

The E-UTRAN is composed of one or a plurality of base stations 203, provided that a control protocol for the user equipment 202 such as a radio resource control (RRC), and user planes such as a packet data convergence protocol (PDCP), radio link control (RLC), medium access control (MAC), or physical layer (PHY) are terminated in the base station 203.

The control protocol radio resource control (RRC) between the user equipment 202 and the base station 203 performs broadcast, paging, RRC connection management, and the like. The states of the base station 203 and the user equipment 202 in RRC are classified into RRC_IDLE and RRC_CONNECTED.

In RRC_IDLE, public land mobile network (PLMN) selection, system information (SI) broadcast, paging, cell re-selection, mobility, and the like are performed. In RRC_CONNECTED, the user equipment has RRC connection and is capable of transmitting and receiving data to and from a network. In RRC_CONNECTED, for example, handover (HO) and measurement of a neighbor cell are performed.

The base stations 203 are classified into eNBs 207 and Home-eNBs 206. The communication system 200 includes an eNB group 203-1 including a plurality of eNBs 207 and a Home-eNB group 203-2 including a plurality of Home-eNBs 206. A system, composed of an evolved packet core (EPC) being a core network and an E-UTRAN 201 being a radio access network, is referred to as an evolved packet system (EPS). The EPC being a core network and the E-UTRAN 201 being a radio access network may be collectively referred to as a "network".

The eNB 207 is connected to an MME/S-GW unit (hereinafter, also referred to as an "MME unit") 204 including a mobility management entity (MME), a serving gateway (S-GW), or an MME and an S-GW by means of an S1 interface, and control information is communicated between the eNB 207 and the MME unit 204. A plurality of MME units 204 may be connected to one eNB 207. The eNBs 207 are connected to each other by means of an X2 interface, and control information is communicated between the eNBs 207.

The Home-eNB 206 is connected to the MME unit 204 by means of an S1 interface, and control information is communicated between the Home-eNB 206 and the MME unit 204. A plurality of Home-eNBs 206 are connected to one MME unit 204. Or, the Home-eNBs 206 are connected to the MME units 204 through a Home-eNB gateway (HeNBGW) 205. The Home-eNB 206 is connected to the HeNBGW 205 by means of an S1 interface, and the HeNBGW 205 is connected to the MME unit 204 by means of an S1 interface.

One or a plurality of Home-eNBs 206 are connected to one HeNBGW 205, and information is communicated therebetween through an S1 interface. The HeNBGW 205 is connected to one or a plurality of MME units 204, and information is communicated therebetween through an S1 interface.

The MME units 204 and HeNBGW 205 are entities of higher layer, specifically, higher nodes, and control the connections between the user equipment (UE) 202 and the eNB 207 and the Home-eNB 206 being base stations. The MME units 204 configure an EPC being a core network. The base station 203 and the HeNBGW 205 configure the E-UTRAN 201.

Further, the configuration below is studied in 3GPP. The X2 interface between the Home-eNBs 206 is supported. In other words, the Home-eNBs 206 are connected to each other by means of an X2 interface, and control information is communicated between the Home-eNBs 206. The HeNBGW 205 appears to the MME unit 204 as the Home-eNB 206. The HeNBGW 205 appears to the Home-eNB 206 as the MME unit 204.

The interfaces between the Home-eNBs 206 and the MME units 204 are the same, which are the S1 interfaces, in both cases where the Home-eNB 206 is connected to the MIME unit 204 through the HeNBGW 205 and it is directly connected to the MME unit 204.

The base station device 203 may configure a single cell or a plurality of cells. Each cell has a range predetermined as a coverage in which the cell can communicate with the user equipment 202 and performs radio communication with the user equipment 202 within the coverage. In a case where one base station device 203 configures a plurality of cells, every cell is configured so as to communicate with the user equipment 202.

Figure 3:
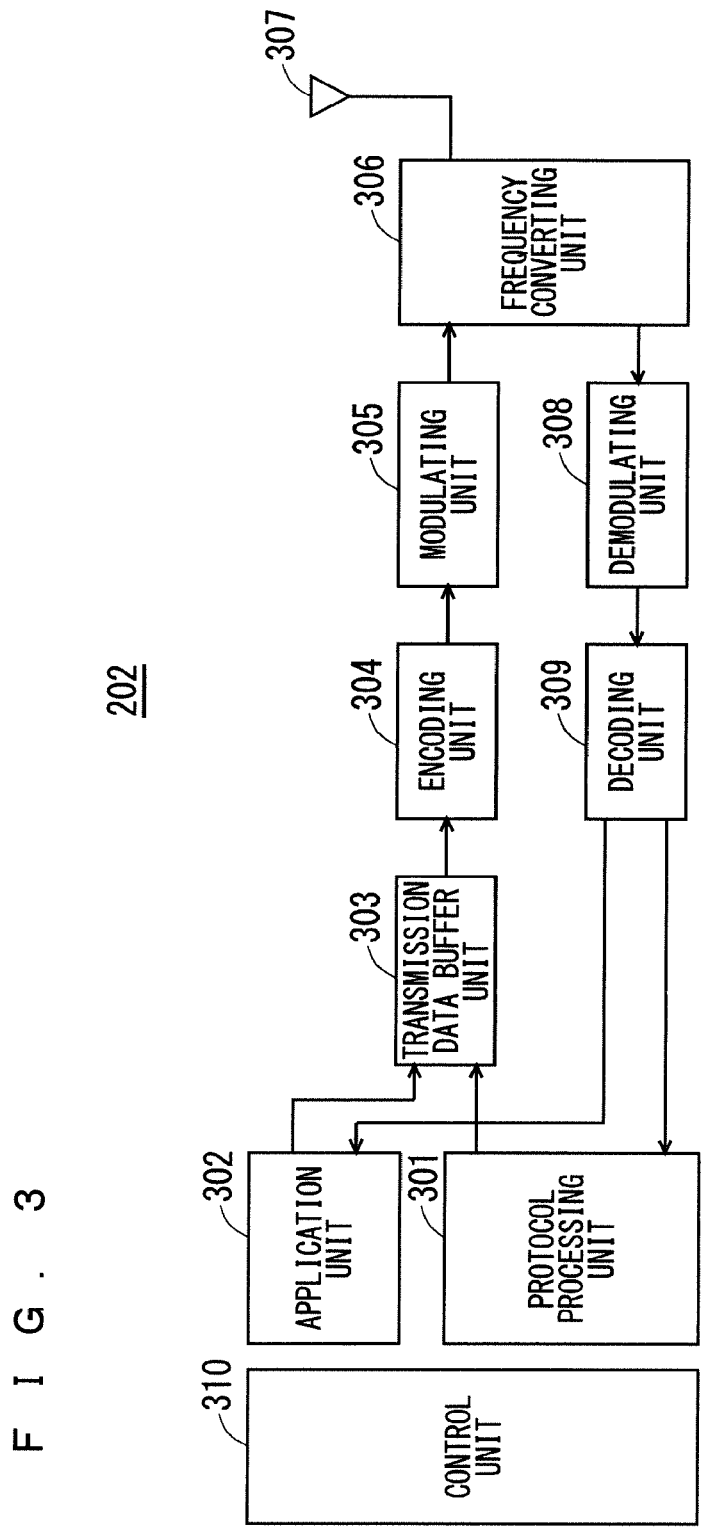
FIG. 3 is a block diagram showing the configuration of a user equipment 202 shown in FIG. 2 which is a communication terminal according to the present invention.

FIG. 3 is a block diagram showing the configuration of the user equipment 202 of FIG. 2 that is a communication terminal according to the present invention. The transmission process of the user equipment 202 shown in FIG. 3 is described. First, a transmission data buffer unit 303 stores the control data from a protocol processing unit 301 and the user data from an application unit 302. The data stored in the transmission data buffer unit 303 is passed to an encoding unit 304, and is subject to an encoding process such as error correction. There may exist the data output from the transmission data buffer unit 303 directly to a modulating unit 305 without the encoding process. The data encoded by the encoding unit 304 is modulated by the modulating unit 305. The modulated data is converted into a baseband signal, and the baseband signal is output to a frequency converting unit 306 and is then converted into a radio transmission frequency. After that, a transmission signal is transmitted from an antenna 307 to the base station 203.

The user equipment 202 executes the reception process as follows. The radio signal from the base station 203 is received through the antenna 307. The received signal is converted from a radio reception frequency into a baseband signal by the frequency converting unit 306 and is then demodulated by a demodulating unit 308. The demodulated data is passed to a decoding unit 309, and is subject to a decoding process such as error correction. Among the pieces of decoded data, the control data is passed to the protocol processing unit 301, and the user data is passed to the application unit 302. A series of processes by the user equipment 202 is controlled by a control unit 310. This means that, though not shown in FIG. 3, the control unit 310 is connected to the individual units 301 to 309.

Figure 4:
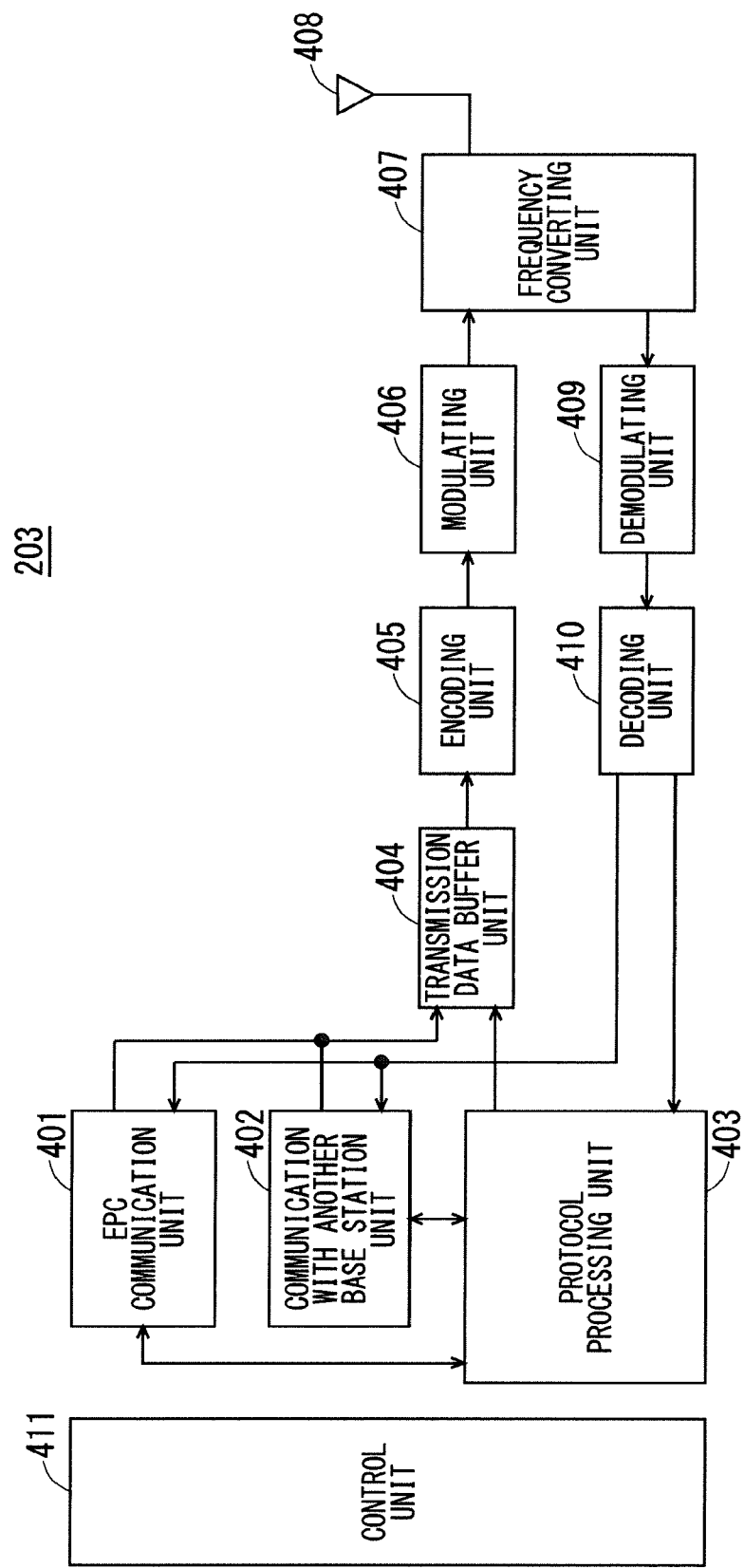
FIG. 4 is a block diagram showing the configuration of a base station 203 shown in FIG. 2 which is a base station according to the present invention.

FIG. 4 is a block diagram showing the configuration of the base station 203 of FIG. 2 that is a base station according to the present invention. The transmission process of the base station 203 shown in FIG. 4 is described. An EPC communication unit 401 performs data transmission and reception between the base station 203 and the EPC (such as the MME unit 204), HeNBGW 205, and the like. A communication with another base station unit 402 performs data transmission and reception to and from another base station. The EPC communication unit 401 and the communication with another base station unit 402 each transmit and receive information to and from a protocol processing unit 403. The control data from the protocol processing unit 403, and the user data and the control data from the EPC communication unit 401 and the communication with another base station unit 402 are stored in a transmission data buffer unit 404.

The data stored in the transmission data buffer unit 404 is passed to an encoding unit 405, and then an encoding process such as error correction is performed for the data. There may exist the data output from the transmission data buffer unit 404 directly to a modulating unit 406 without the encoding process. The encoded data is modulated by the modulating unit 406. The modulated data is converted into a baseband signal, and the baseband signal is output to a frequency converting unit 407 and is then converted into a radio transmission frequency. After that, a transmission signal is transmitted from an antenna 408 to one or a plurality of user equipments 202.

The reception process of the base station 203 is executed as follows. A radio signal from one or a plurality of user equipments 202 is received through the antenna 408. The received signal is converted from a radio reception frequency into a baseband signal by the frequency converting unit 407, and is then demodulated by a demodulating unit 409. The demodulated data is passed to a decoding unit 410 and then subject to a decoding process such as error correction. Among the pieces of decoded data, the control data is passed to the protocol processing unit 403, the EPC communication unit 401, or the communication with another base station unit 402, and the user data is passed to the EPC communication unit 401 and the communication with another base station unit 402. A series of processes by the base station 203 is controlled by a control unit 411. This means that, though not shown in FIG. 4, the control unit 411 is connected to the individual units 401 to 410.

FIG. 5 is a block diagram showing the configuration of the MIME according to the present invention. FIG. 5 shows the configuration of an MME 204a included in the MME unit 204 shown in FIG. 2 described above. A PDN GW communication unit 501 performs data transmission and reception between the MME 204a and the PDN GW. A base station communication unit 502 performs data transmission and reception between the MME 204a and the base station 203 by means of the S1 interface. In a case where the data received from the PDN GW is user data, the user data is passed from the PDN GW communication unit 501 to the base station communication unit 502 via a user plane communication unit 503 and is then transmitted to one or a plurality of base stations 203. In a case where the data received from the base station 203 is user data, the user data is passed from the base station communication unit 502 to the PDN GW communication unit 501 via the user plane communication unit 503 and is then transmitted to the PDN GW.

In a case where the data received from the PDN GW is control data, the control data is passed from the PDN GW communication unit 501 to a control plane control unit 505. In a case where the data received from the base station 203 is control data, the control data is passed from the base station communication unit 502 to the control plane control unit 505.

A HeNBGW communication unit 504 is provided in a case where the HeNBGW 205 is provided, which performs data transmission and reception between the MME 204a and the HeNBGW 205 by means of the interface (IF) according to an information type. The control data received from the HeNBGW communication unit 504 is passed from the HeNBGW communication unit 504 to the control plane control unit 505. The processing results of the control plane control unit 505 are transmitted to the PDN GW via the PDN GW communication unit 501. The processing results of the control plane control unit 505 are transmitted to one or a plurality of base stations 203 by means of the S1 interface via the base station communication unit 502, and are transmitted to one or a plurality of HeNBGWs 205 via the HeNBGW communication unit 504.

The control plane control unit 505 includes a NAS security unit 505-1, an SAE bearer control unit 505-2, and an idle state mobility managing unit 505-3, and performs an overall process for the control plane. The NAS security unit 505-1 provides, for example, security of a non-access stratum (NAS) message. The SAE bearer control unit 505-2 manages, for example, a system architecture evolution (SAE) bearer. The idle state mobility managing unit 505-3 performs, for example, mobility management of an idle state (LTE-IDLE state which is merely referred to as idle as well), generation and control of a paging signal in the idle state, addition, deletion, update, and search of a tracking area of one or a plurality of user equipments 202 being served thereby, and tracking area list management.

The MME 204a distributes a paging signal to one or a plurality of base stations 203. In addition, the MME 204a performs mobility control of an idle state. When the user equipment is in the idle state and an active state, the MME 204a manages a list of tracking areas. The MME 204a begins a paging protocol by transmitting a paging message to the cell belonging to a tracking area in which the UE is registered. The idle state mobility managing unit 505-3 may manage the CSG of the Home-eNBs 206 to be connected to the MME 204a, CSG IDs, and a whitelist.

Figure 6:
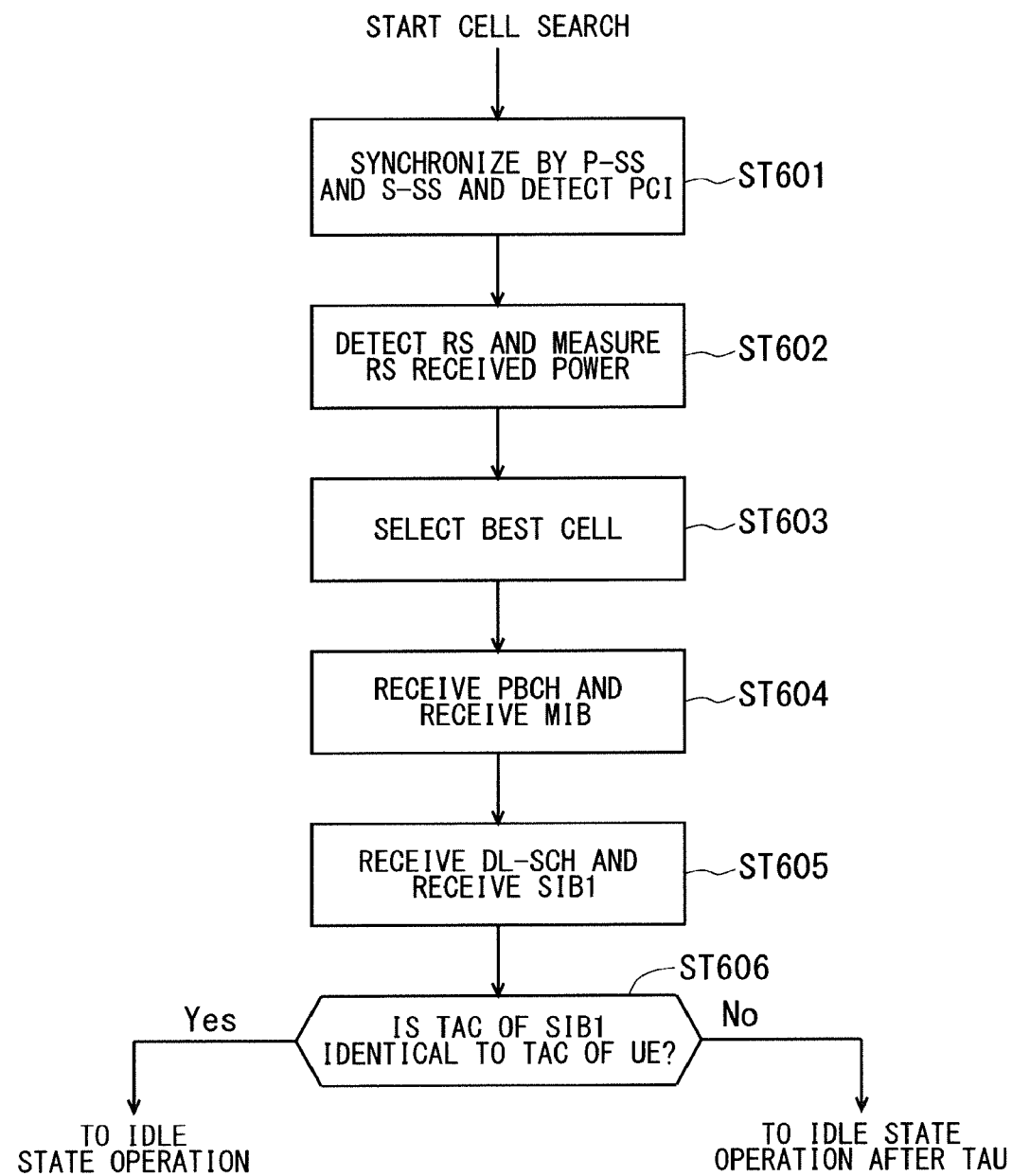
FIG. 6 is a flowchart showing an outline from a cell search to an idle state operation performed by a communication terminal (UE) in the LTE communication system.

An example of a cell search method in a mobile communication system is described next. FIG. 6 is a flowchart showing an outline from a cell search to an idle state operation performed by a communication terminal (UE) in the LTE communication system. When starting a cell search, in Step ST601, the communication terminal synchronizes slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which correspond one-to-one to PCIs assigned per cell, are assigned to the synchronization signals (SSs). The number of PCIs is currently studied in 504 ways. The 504 ways of PCIs are used for synchronization, and the PCIs of the synchronized cells are detected (specified).

In Step ST602, next, the user equipment detects a cell-specific reference signal (CRS) being a reference signal (RS) transmitted from the base station per cell and measures the reference signal received power (RSRP). The codes corresponding one-to-one to the PCIS are used for the reference signal RS. Separation from another cell is enabled by correlation using the code. The code for RS of the cell is derived from the PCI specified in Step ST601, so that the RS can be detected and the RS received power can be measured.

In Step ST603, next, the user equipment selects the cell having the best RS received quality, for example, the cell having the highest RS received power, that is, the best cell, from one or more cells that have been detected up to Step ST602.

In Step ST604, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as a transmission bandwidth configuration (dl-bandwidth)), the number of transmission antennas, and a system frame number (SFN).

In Step ST605, next, the user equipment receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In Step ST606, next, the communication terminal compares the TAC of the SIB1 received in Step ST605 with the TAC portion of a tracking area identity (TAI) in the tracking area list that has already been possessed by the communication terminal. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST606 shows that the TAC received in Step ST605 is identical to the TAC included in the tracking area list, the user equipment enters an idle state operation in the cell. If the comparison shows that the TAC received in Step ST605 is not included in the tracking area list, the communication terminal requires a core network (EPC) including MME and the like to change a tracking area through the cell for performing tracking area update (TAU).

The device configuring a core network (hereinafter, also referred to as a "core-network-side device") updates the tracking area list based on an identification number (such as UE-ID) of a communication terminal transmitted from the communication terminal together with a TAU request signal. The core-network-side device transmits the updated tracking area list to the communication terminal. The communication terminal rewrites (updates) the TAC list of the communication terminal based on the received tracking area list. After that, the communication terminal enters the idle state operation in the cell.

Widespread use of smartphones and tablet terminal devices explosively increases traffic in cellular radio communications, causing a fear of insufficient radio resources all over the world. To increase spectral efficiency, thus, it is studied to downsize cells for further spatial separation.

In the conventional configuration of cells, the cell configured by an eNB has a relatively-wide-range coverage. Conventionally, cells are configured such that relatively-wide-range coverages of a plurality of cells configured by a plurality of macro eNBs cover a certain area.

When cells are downsized, the cell configured by an eNB has a narrow-range coverage compared with the coverage of a cell configured by a conventional eNB. Thus, in order to cover a certain area as in the conventional case, a larger number of downsized eNBs than the conventional eNBs are required.

In the description below, a "macro cell" refers to a cell having a relatively wide coverage, such as a cell configured by a conventional eNB, and a "macro eNB" refers to an eNB configuring a macro cell. A "small cell" refers to a cell having a relatively narrow coverage, such as a downsized cell, and a "small eNB" refers to an eNB configuring a small cell.

The macro eNB may be, for example, a "wide area base station" described in Non-Patent Document 7.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base station" described in Non-Patent Document 7.

Figure 7:
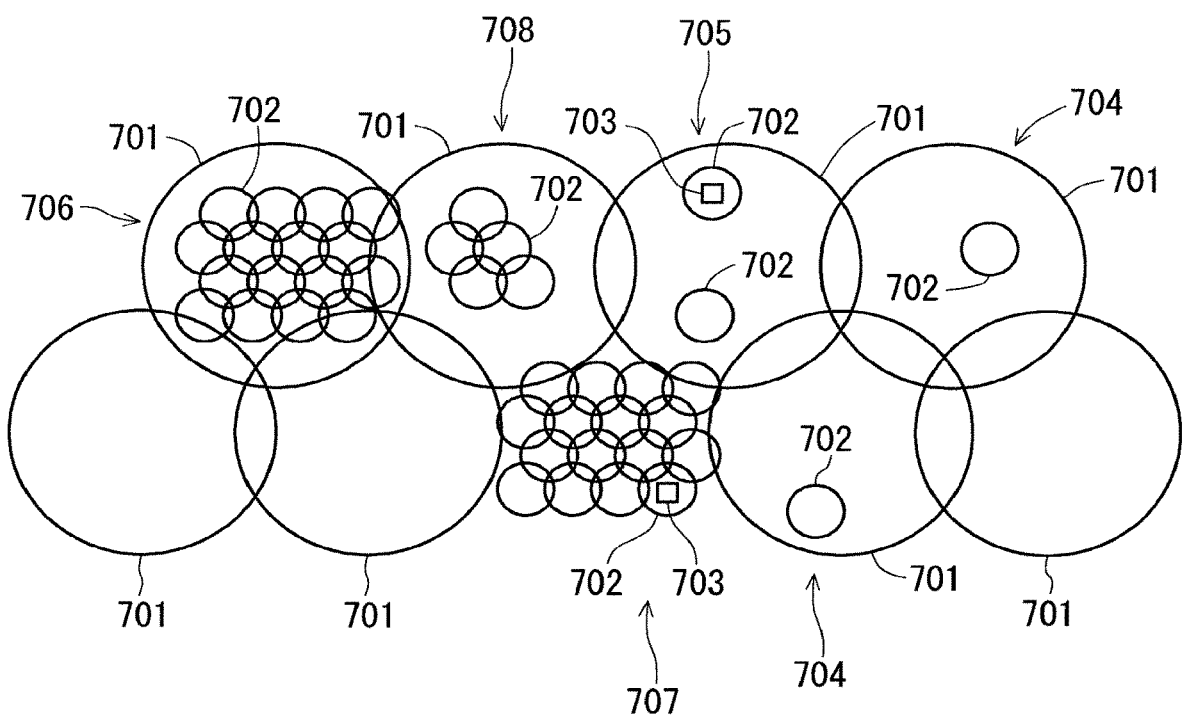
FIG. 7 shows the concept of a cell configuration when macro eNBs and small eNBs coexist.

FIG. 7 shows the concept of the cell configuration in which macro eNBs and small eNBs coexist. The macro cell configured by a macro eNB has a relatively-wide-range coverage 701. A small cell configured by a small eNB has a coverage 702 whose range is narrower than that of the coverage 701 of a macro eNB (macro cell).

When a plurality of eNBs coexist, the coverage of the cell configured by an eNB may be included in the coverage of the cell configured by another eNB. In the cell configuration shown in FIG. 7, as indicated by a reference "704" or "705", the coverage 702 of the small cell configured by a small eNB may be included in the coverage 701 of the macro cell configured by a macro eNB.

As indicated by the reference "705", the coverages 702 of a plurality of, for example, two small cells may be included in the coverage 701 of one macro cell. A user equipment (UE) 703 is included in, for example, the coverage 702 of the small cell and performs communication via the small cell.

In the cell configuration shown in FIG. 7, as indicated by a reference "706", the coverage 701 of the macro cell configured by a macro eNB may overlap the coverages 702 of the small cells configured by small eNBs in a complicated manner.

As indicated by a reference "707", the coverage 701 of the macro cell configured by a macro eNB need not overlap the coverages 702 of the small cells configured by small eNBs.

Further, as indicated by a reference "708", the coverages 702 of a large number of small cells configured by a large number of small eNBs may be configured in the coverage 701 of one macro cell configured by one macro eNB.

In the LTE hand-over, a target cell generates a parameter (for example, a cell ID, etc.) to be used by the UE in a target, and a source cell notifies the UE of the generated parameter as an RRC signaling (see Non-Patent Document 1).

Under the NR, communication via beams is being studied. Since the movement of the UE frequently switches beams that belong to the UE under the NR, application of the mobility without involving the RRC to the movement of the UE between beams is being studied (see Non-Patent Document 11).

Splitting a gNB into two units (see Non-Patent Document 7) is proposed in 3GPP. The two units are referred to as a central unit (CU) and a distributed unit (DU). A plurality of DUs are connected to the CU. The CU having, for example, PDCP, RLC, MAC, and H-PHY is proposed in 3GPP. The DU having L-PHY is proposed in 3GPP. As an alternative method, the CU having PDCP and the DU having RLC, MAC, and PHY or the CU having PDCP and H-RLC and the DU having L-RLC, MAC, and PHY are proposed in 3GPP. The TRP may have the same functions as those of the DU. The DU or the TRP forms one or more beams.

In addition, for the movement of the UE between beams or transmission/reception points (TRPs), performing the inter-cell mobility with the RRC signaling when the TRP has a layer-2 function, and the inter-beam mobility without the RRC signaling when the TRP does not have the layer-2 function (see 3GPP R2-167024 (hereinafter referred to as "Reference 1")) is studied in 3GPP.

In the communication with a plurality of beams or a plurality of TRPs under the NR, a communicable space is separated by the beams or the TRPs.

FIG. 8 illustrates separation of the communicable space by the plurality of beams or TRPs. In FIG. 8, a gNB 800 includes one central unit (CU) and two distributed units (DUs). Each of a DU #1 801 and a DU #2 802 is connected to a CU 803. The DUs may be TRPs.

In FIG. 8, the DU #1 has a beam #1 804, a beam #2 805, and a beam #3 806, whereas the DU #2 has a beam #4 807, a beam #5 808, a beam #6 809, and a beam #7 810. A cell 811, i.e., the space in which the gNB can communicate is separated by the beam #1 804 to the beam #7 810.

In FIG. 8, one DU or a plurality of DUs may be used. Alternatively, the CU and the DUs may be configured as one device without being separated from each other.

However, how to handle an RRC parameter when one cell is spatially separated by the beams or the TRPs has not yet been disclosed.

The first embodiment discloses a method for solving such a problem.

The beams or the TRPs belonging to one cell share the same RRC parameter for one UE. The RRC parameter may be the one described in 6.3.2 of Non-Patent Document 12. The RRC parameter may relate to, for example, the SR, Ack/Nack repetitions, Sounding Reference Signal (SRS), or CQI/CSI.

For sharing of the RRC parameter, the CU of the gNB should notify the TRPs in the cell of the RRC parameter. Particularly, an RRC parameter relating to a physical layer may be notified. The RRC parameter relating to the physical layer may indicate, for example, frequency resources of the SRS. Consequently, modulation and demodulation at each of the TRPs can be facilitated.

Alternatively, beams or the TRPs belonging to one cell may share a parameter necessary for beam sweeping. Examples of the parameter necessary for beam sweeping may include a beam sweeping period, a duration per beam sweeping, and a time required for one beam. The parameters may be provided as new RRC parameters. Consequently, the UE can easily receive a beam sweeping signal in the mobility between beams or TRPs.

The CU may notify the TRPs in the cell of the parameter necessary for beam sweeping. Consequently, each of the TRPs can easily transmit a beam sweeping signal.

The CU may notify the TRPs of the RRC parameter using, for example, an area of a control word of the Common Public Radio Interface (CPRI). The control word should be used when the CPRI is used as an interface between the CU and the DU. Thus, the RRC parameter can be notified without constricting a bandwidth of user data that flows between the CU and the DU across the CPRI.

The CU may notify the TRPs of the RRC parameter using, for example, Abstract Syntax Notation One (ASN.1) format or another format. Use of ASN.1 enables the DU to notify the TRPs of the parameter with the same format as that of the RRC signaling, which facilitates the processing of notifying the RRC parameter to the TRPs of the DU.

According to the first embodiment, the CU can manage the RRC parameter even when one cell includes a plurality of beams or TRPs. Moreover, sharing the same RRC parameter between beams or between TRPs in a cell can simplify the radio resource management in the CU.

The first embodiment provides, for example, a communication system including: a communication terminal device; and a base station device that performs radio communication with the communication terminal device via a radio beam, wherein a cell configured by the base station device is spatially separated by a plurality of radio beams being served by the base station device, and the base station device shares, between a plurality of radio beams belonging to the same cell, a radio resource control (RRC) parameter to be applied to the communication terminal device. The plurality of radio beams may be formed by a plurality of DUs (i.e., TRPs) as exemplified in FIG. 8 or by one DU.

Under this structure, the RRC parameter to be applied to a communication terminal device is shared between two or more of the plurality of radio beams that spatially separate the cell configured by the base station device. Thus, the radio resource management can be simplified as described above. The structure can be variously modified as described above. Although the first embodiment describes the example of sharing the RRC parameter among all the radio beams belonging to the same cell, the structure is not limited by this example (see, for example, the eighth embodiment and its modification to be described later).

The Second Embodiment

Although the first embodiment describes sharing the RRC parameter between different beams or TRPs in a cell, the RRC parameter need not be shared. The RRC parameter may be similar to that in the first embodiment. This enables different UEs present within range of different beams or different TRPs to use the same RRC parameter without any contention. Thus, the number of UEs to be accommodated in the cell can be increased.

However, when the CU has, for example, PDCP, RLC, MAC, and H-PHY in the separation between the CU and the DUs as described in the first embodiment, the RRC signaling cannot be used in the mobility between beams or TRPs in the cell unlike the first embodiment. Thus, the gNB cannot notify the UE of the RRC parameter. Similarly, in a base station device where the CU and the DUs are not separated, the gNB cannot notify the UE of the RRC parameter in the mobility between beams in the cell. This causes a problem with failing to increase the number of UEs to be accommodated in the cell.

The second embodiment discloses a method for solving such a problem.

The CU notifies, in advance, the UE of the RRC parameter to be used in beams or TRPs (hereinafter may be referred to as beams/TRPs) in a cell. The CU may send the notification with the RRC signaling. The CU may send the notification when the UE starts the RRC connection or changes the RRC parameter.

The CU notifies the UE of an instruction for switching a beam/TRP in switching the beam/TRP. The switching instruction may include an identifier representing a target beam/TRP on movement. The CU may notify the UE of the switching instruction with the L1/L2 signaling or the MAC signaling.

Consequently, the CU can change a parameter according to the switching of the beam/TRP with less amount of signaling.

The RRC parameter to be notified may be limited to an RRC parameter to be used in neighboring beams/TRPs of the UE. The neighboring beams/TRPs may include a beam/TRP adjacent to a beam/TRP where the UE is present. The RRC parameter included in the notification may be limited to a parameter different from a parameter used for the beam/TRP where the UE is present. Consequently, the size of the notification can be reduced.

Another method is disclosed. The CU notifies the UE of an RRC parameter to be used in a target beam/TRP on movement in switching a beam/TRP. The notification may be made through a source beam/TRP on movement. The RRC parameter may be the one described in 6.3.2 of Non-Patent Document 12, similarly as the first embodiment. The RRC parameter may relate to, for example, the SR, Ack/Nack repetitions, Sounding Reference Signal (SRS), or CQI/CSI.

Consequently, the CU can switch a beam/TRP with less amount of signaling because the RRC signaling from the CU to the UE is unnecessary.

The CU may notify the UE of the parameter necessary for beam sweeping. The parameter necessary for beam sweeping may be the one described in the first embodiment. The notification may be made through a source beam/TRP on movement. The parameter necessary for beam sweeping may be a parameter in the target beam/TRP on movement. Consequently, the UE can easily receive a beam sweeping signal in the mobility between beams/TRPs.

The CU may notify the UE of the parameter necessary for beam sweeping with the L1/L2 signaling or the MAC signaling. Thus, the parameter necessary for beam sweeping can be promptly notified.

The CU notifies the UE of an instruction for switching the beam/TRP (hereinafter may be simply referred to as "switching instruction") through a source beam/TRP on movement. The switching instruction may include an identifier representing a target beam/TRP on movement. The switching instruction may include information indicating the timing to switch the beam/TRP.

A measurement result of beams to be notified from the UE to the CU may be used when the CU determines the target beam/TRP on movement. The measurement result may be, for example, the received intensity or the reception quality of the beams.

The switching instruction need not include an identifier representing a target beam/TRP on movement. The CU and the UE may automatically determine the target beam/TRP on movement according to the measurement result of the beams/TRPs. The measurement result of the beams/TRPs may be, for example, the received intensity or the reception quality of each of the beams. Consequently, the amount of signaling for the switching instruction can be reduced.

The following (1) to (3) are described as RRC parameters on the SR:

(1) a parameter for determining a Resource Block (RB) and a code of the SR, for example, sr-PUCCH-ResourceIndex described in Non-Patent Document 12;

(2) a transmission period and a subframe offset of the SR, for example, sr-ConfigIndex described in Non-Patent Document 12; and (3) a combination of (1) and (2) above.

In (1) above, preventing the position of the RB to be used for SR from contending with that of another UE due to the mobility between beams/TRPs of the UE can increase the number of UEs to be accommodated in one of the beams/TRPs.

In (2) above, preventing the timing with which the SR is transmitted from contending with that of another UE due to the mobility between beams/TRPs of the UE can increase the number of UEs to be accommodated in one of the beams/TRPs.

In (2) above, only the subframe offset for transmitting the SR may be changed. Only information on the subframe offset may be notified in changing the subframe offset. Consequently, the CU easily adjusts transmission of the SR by a plurality of UEs in the target beam/TRP on movement to avoid a contention between the UEs. Notifying only information on the subframe offset enables reduction in bits to be transmitted from the CU to the UE.

The parameters to be notified as (1) to (3) above may be values per se or amounts of change in the values. Using the value per se facilitates processing for notifying the parameter from the CU to the UE. Further, using the amount of change in the value enables reduction in bits required for notifying the parameter.

The CU may notify the UE of two or more of the RRC parameters including (1) to (3) above simultaneously. Consequently, the amount of signaling required for the notification can be reduced.

The CU may notify the UE of the RRC parameters including (1) to (3) above separately. Consequently, the parameters can be notified with less transmission resources.

The CU may or need not notify the UE of a parameter indicating the maximum number of times the SR is retransmitted as the RRC parameter on the SR. The parameter indicating the maximum number of retransmission times may be, for example, dsr-TransMax described in Non-Patent Document 12. Notifying a parameter, for example, changing the parameter into a smaller value when the propagation environment is inferior enables the UE to proceed earlier to a random access procedure after exceeding the number of times the SR is retransmitted. Consequently, the process for moving the beam/TRP can be completed earlier.

The CU may include an identifier indicating switching of a parameter due to the switching of the TRP/beam in a notification of the RRC parameter to the UE. The UE may hold the RRC parameter before change. Consequently, since the UE can prevent the RRC parameter from being changed before switching the TRP/beam, it is possible, for example, to prevent the SR from being undelivered to the source TRP/beam on movement due to change in the parameter, in transmitting the SR.

The CU need not notify, as the RRC parameter, a parameter using the same value as that of the target beam/TRP on movement. Consequently, the amount of signaling for notifying the parameter can be reduced.

The CU and the UE may initialize the RRC parameter when the beam/TRP of the UE is switched. Change to the initial value may be made, for example, upon failure in notification of the parameter from the source beam/TRP on movement to the UE. The initial value may be defined in a standard or notified from the CU to the UE in advance with the RRC signaling. Consequently, the UE can continue to communicate with the CU using the initial value, even upon failure in notification of the parameter from the source beam/TRP on movement to the UE.

Alternatively, the CU and the UE may hold the parameter value. The parameter value may be held, for example, upon failure in notification of the parameter from the CU to the UE. Consequently, even upon failure in notification of the parameter from the source beam/TRP on movement to the UE, the UE can use the RRC parameter before change. Thus when, for example, the RRC parameter identical to that of the source beam/TRP on movement is used in the target beam/TRP on movement, the UE can prevent the SR from being undelivered to the target beam/TRP on movement.

Whether the parameter value when the beam/TRP of the UE is switched is initialized or held may be defined in a standard or notified from the CU to the UE in advance. The RRC signaling may be used for the notification. Alternatively, information on whether the value is initialized or held may be notified from the CU to the UE together with a switching instruction. Consequently, the CU can flexibly set a parameter according to a status of the RRC parameter to be used by the UE being served thereby.

The CU may notify the UE of the RRC parameter and the switching instruction together. Consequently, the amount of signaling in switching the beam/TRP can be reduced.

Alternatively, the CU may notify the UE of the switching instruction after notifying the RRC parameter. Thereby, the CU may notify the UE of the switching instruction after verifying delivery of the RRC parameter, which enables avoiding execution of a random access caused by the SR undelivered from the UE and an excessive number of times the SR is retransmitted from the UE, due to the undelivered RRC parameter on the SR.

Alternatively, the CU may notify the UE of the RRC parameter after notifying the switching instruction. Here, the CU should notify the UE of the switching timing together with the switching instruction. Even when it takes time for the UE to perform a process of switching the communication destination beam/TRP, the smooth switching is possible.

The CU may notify the UE of the RRC parameter with the L1/L2 signaling. Consequently, the parameter can be promptly notified to the UE.

Alternatively, the CU may notify the RRC parameter with the MAC signaling. Since this enables multi-level modulations, the parameter can be notified with less number of symbols. With the HARQ retransmission control, the reliability of notifying the parameter is increased. Since the CU can notify the UE of the switching instruction after verifying delivery of the parameter, it is possible, for example, to avoid execution of the random access caused by the SR undelivered from the UE and an excessive number of times the SR is retransmitted from the UE due to the undelivered parameter.

The CU may notify the target beam/TRP on movement of the RRC parameter. Similarly as the first embodiment, the notification may be made using, for example, an area of a control word of the CPRI, the ASN.1 format, or another format. This enables, for example, the target beam/TRP on movement to promptly decode the SR from the UE immediately after switching to a beam/TRP, in addition to the same advantages as those according to the first embodiment.

The CU may notify the UE of the switching instruction with the L1/L2 signaling. Thus, switching of the beam/TRP can be promptly notified to the UE.

Alternatively, the CU may notify the switching instruction with the MAC signaling. The CU may switch the beam/TRP for its own use after receiving Ack from the UE in response to the switching instruction. The UE may switch the communication destination beam/TRP after transmitting Ack in response to the switching instruction. This can increase the reliability of notifying the switching instruction from the CU to the UE, and reduce the probability of Radio Link Failure (RLF) caused by link loss with the gNB.

The CU may switch the beam/TRP upon excess of the number of times the HARQ is retransmitted in response to the switching instruction from the source beam/TRP on movement to the UE when the switching instruction is notified with the MAC signaling. The beam/TRP may be switched when Ack/Nack from the UE in response to the switching instruction is indistinguishable. Upon failure in receiving an Ack signal from the UE by the source beam/TRP on movement in response to the switching instruction, the gNB can switch the beam/TRP along with switching of the communication destination beam/TRP by the UE. Thus, the UE can prevent the link loss with the gNB.

Alternatively, the CU need not switch the beam/TRP upon excess of the number of times the HARQ is retransmitted in response to the switching instruction from the source beam/TRP on movement to the UE. Here, the UE may communicate with the source beam/TRP on movement again after recovering from the RLF caused by the link loss with the gNB. This makes it easier for the CU to control the beam switching.

FIG. 9 is a sequence diagram illustrating switching of the beam/TRP when the CU notifies a parameter on the SR through the source beam/TRP on movement. FIG. 9 illustrates an example of notifying the parameter on the SR and the switching instruction from the CU to the UE with the MAC signaling. In FIG. 9, "S-beam/TRP" denotes the source beam/TRP on movement being served by the CU, and "T-beam/TRP" denotes the target beam/TRP on movement being served by the CU. The black circles on the arrows in FIG. 9 represent beams/TRPs to be used for communication.

In Step ST901 before switching the beam/TRP in FIG. 9, the UE transmits and receives the user data to and from the CU through the S-beam/TRP.

In Step ST902 of FIG. 9, the CU notifies the UE of a SR parameter through the S-beam/TRP. The MAC signaling is used for this notification. The L1/L2 signaling may be used. The SR parameter may include sr-PUCCH-ResourceIndex and sr-ConfigIndex that are described in Non-Patent Document 12. In Step ST903, the UE notifies, through the S-beam/TRP, the CU of Ack in response to the notification of the SR parameter. When the reception result from the UE is Nack, the CU may retransmit the SR parameter through the S-beam/TRP.

In Step ST904 of FIG. 9, the CU notifies the UE of a switching instruction through the S-beam/TRP. The MAC signaling is used to notify the switching instruction. The L1/L2 signaling may be used. The CU may include information indicating the T-beam/TRP in the switching instruction. In Step ST905, the UE notifies, through the S-beam/TRP, the CU of Ack in response to the switching instruction. When the reception result from the UE is Nack, the CU may retransmit the switching instruction through the S-beam/TRP.

In Step ST906 of FIG. 9, the UE switches the communication destination beam/TRP from the S-beam/TRP to the T-beam/TRP. In Step ST907, the CU switches the beam/TRP from the S-beam/TRP to the T-beam/TRP. In Step ST908, the CU communicates the user data with the UE through the T-beam/TRP.

The UE may transmit an uplink signal to the source beam/TRP on movement. The uplink signal may be a response to the L1/L2 signaling with which the CU notifies the RRC parameter. The uplink signal may be a response to the L1/L2 signaling with which the CU issues a switching instruction. An L1/L2 signaling for response may be newly provided as the uplink signal. New uplink control information (UCI) may be provided as the response. This enables the CU to verify delivery to the UE even when the L1/L2 signaling is used for notifying the RRC parameter or issuing the switching instruction from the CU. Thus, the reliability of the L1/L2 signaling can be increased.

Alternatively, the UE may transmit the uplink signal to the target beam/TRP on movement. The uplink signal may be a signal for verifying the switching of the beam/TRP in the UE. The signal for verification may be transmitted with frequency resources for the SR. Alternatively, the SR may be transmitted as the signal for verification. Consequently, the frequency resources for the uplink signal can be saved.

Alternatively, the new UCI may be transmitted. The CU may allocate resources for the new UCI to each UE. The CU may include information on the resources for the UCI in a notification requiring a response from the UE. The notification requiring a response may be, for example, a switching notification or a parameter changing notification. As such, the CU can flexibly allocate the resources for the new UCI to the UE according to the availability of the resources.

Common resources for common use among UEs in a cell may be prepared as an alternative example of the resources for the new UCI. For example, a PRACH may be used, common resources for the SR may be prepared, or other common resources may be provided as the common resources. Thus, the amount of signaling can be reduced because the CU need not notify the UE of information on the resources for the new UCI.

The UE may transmit the SR to the target beam/TRP on movement as the uplink signal with the minimum period. Thus, it is possible to verify with lower latency that the UE has switched the communication destination beam/TRP.

The CU may reserve the common resources for the SR for common use among UEs within range of the same beam/TRP. The UE may transmit the SR with the common resources for the SR. The common resources for the SR may be resources allowing a contention among the UEs (contention-based). The position of the common resources for the SR may be predefined in a standard, or notified from the CU to the UEs being served thereby. This notification may be a broadcast or a UE-dedicated notification. The UE-dedicated notification may be the RRC-dedicated signaling. Consequently, the UE can notify the CU that the beam/TRP has been switched even when failing to receive the RRC parameter.

The UE may use, as the common resources for the SR, an initial value of the RRC parameter on the SR in switching the communication destination beam/TRP. Consequently, the UE can notify the CU that the beam/TRP has been switched even when failing to receive the RRC parameter.

The UE may transmit the SRS to the target beam/TRP on movement. The SRS may be aperiodic or periodic. The UE may transmit the SRS to the target beam/TRP on movement a predetermined number of times. The number of transmission times may be defined in a standard or notified from the CU to the UE in advance. The RRC signaling may be used for the notification. Consequently, the UE can notify the CU that the communication destination beam/TRP has been switched even when there is no uplink user data to be transmitted to the CU.

The CU may determine, using the SR, whether the UE has switched the communication destination beam/TRP. The CU may determine that the UE has not switched the communication destination beam/TRP, for example, when there is no notification of the SR from the UE. The CU may notify the RRC parameter and the switching instruction again from the source beam/TRP on movement. This re-notification may be made using a result of the determination. Consequently, for example, it is possible to prevent the RLF or the random access procedure occurring when the UE fails to receive the parameter on the SR or the switching instruction. Consequently, the time to switch the beam/TRP can be shortened.

The CU may notify the UE of the presence or absence of a request to transmit the uplink signal to the UE. The presence or absence of the request may be the presence or absence of a request to transmit the uplink signal to each of the source beam/TRP on movement and the target beam/

TRP on movement. The presence or absence of the request may be included in the switching instruction from the CU to the UE. Since this can eliminate, for example, a response from the UE when the communication quality is superior, the amount of signaling can be reduced.

The CU may notify the UE of the RRC parameter a plurality of number of times. Thus, the reliability of notifying the parameter can be increased. The number of notification times may be defined in a standard or notified from the gNB to the UE in advance. The RRC signaling may be used for the notification.

The CU may increase the transmission power for notifying the RRC parameter to the UE. Thus, the reliability of notifying the parameter can be increased with less number of notifications. The increased amount of power may be defined in a standard or notified from the CU to the UE in advance. The RRC signaling may be used for the notification.

Similarly as the notification of the RRC parameter, a notification of the switching instruction to the UE may be transmitted a plurality of number of times or the power for transmission may be increased. Thus, the reliability of notifying the switching instruction can be increased.

The UE may switch the communication destination beam/TRP, using the notification of the RRC parameter received from the source beam/TRP on movement. Switching of the beam/TRP may involve the beam sweeping and the random access. The beam/TRP may be switched upon receipt of one or more RRC parameters. The beam/TRP may be switched after a lapse of a predetermined time since the UE receives the one or more parameters. The predetermined time may be defined in a standard or notified from the CU to the UE in advance. The RRC signaling may be used for the notification. This enables the UE to switch the communication destination beam/TRP even when the UE cannot accurately receive the switching instruction from the CU to the UE. This also eliminates the time required to retransmit the switching notification from the CU to the UE.

The CU may include, in a notification of a parameter, information indicating the target beam/TRP on movement. Thus, it is possible to shorten the time for the UE to search for a switching target beam/TRP when the beam/TRP of the UE is switched, in a case where the UE cannot accurately receive the switching instruction from the CU to the UE.

For transmission of the SR from the UE, the CU may disable the SR received by the source beam/TRP on movement. The CU may disable the SR when the beam/TRP is switched between reception of the SR and transmission of an uplink scheduling grant. The UE may retransmit the SR to the target beam/TRP on movement. This can facilitate implementation of a process of transmitting the SR in the UE.

Alternatively, in switching the beam/TRP after transmission of the SR from the UE, the CU may enable the SR received by the source beam/TRP on movement. The CU may transmit the uplink scheduling grant for the SR to the UE through the target beam/TRP on movement. This allows smooth uplink data communication when switching of the beam/TRP occurs.

Whether the SR is enabled may be defined in a standard. Alternatively, the CU may notify the UE of whether the SR is enabled. This notification may be made in advance with the RRC signaling, the MAC signaling or the L1/L2 signaling. This notification may be made together with the switching notification in the example with the MAC signaling or the L1/L2 signaling. This enables flexible scheduling of the uplink data communication in the CU.

In the uplink scheduling grant notification from the CU to the UE, the CU and the UE may disable the uplink scheduling grant transmitted from the source beam/TRP on movement. The CU and the UE may disable the uplink scheduling grant when switching of the beam/TRP occurs between the uplink scheduling grant and the uplink user data. The CU may retransmit the uplink scheduling grant from the target beam/TRP on movement. Alternatively, the UE may start again from transmission of the SR to the target beam/TRP on movement. Whether the UE starts again from transmission of the SR may be defined in a standard. Alternatively, the gNB may notify the UE of whether the UE starts again. This notification may be made in advance with the RRC signaling, the MAC signaling, or the L1/L2 signaling. This notification may be made together with the switching notification in the example with the MAC signaling or the L1/L2 signaling. Consequently, the gNB can perform scheduling according to a use status of the uplink resources in the target beam/TRP on movement.

Alternatively, in switching of the beam/TRP after the uplink scheduling grant notification from the CU to the UE, the CU and the UE may enable the uplink scheduling grant transmitted from the source beam/TRP on movement. The UE may transmit the uplink user data to the target beam/TRP on movement with the uplink scheduling grant. Consequently, the amount of signaling between the CU and the UE can be reduced.

Whether the uplink scheduling grant is enabled may be defined in a standard or notified from the CU to the UE. This notification from the CU to the UE may be made in advance with the RRC signaling, the MAC signaling, or the L1/L2 signaling. The uplink scheduling grant may be enabled, for example, when the target beam/TRP on movement can use the uplink resources indicated by the scheduling grant for the UE. The aforementioned notification may be made together with the switching notification in the example with the MAC signaling or the L1/L2 signaling. Consequently, the CU can perform, with less signaling, scheduling according to a use status of the uplink resources in the target beam/TRP on movement.

When the UE transmits the uplink user data to the CU, the CU may transmit, from the target beam/TRP on movement to the UE, Ack/Nack in response to the uplink user data received by the source beam/TRP on movement from the UE. The Ack/Nack may be transmitted from the target beam/TRP on movement when the beam/TRP is switched between transmission of the uplink user data from the UE and notification of the Ack/Nack from the CU. This allows smooth switching of the beam/TRP after transmission of the uplink user data.

According to the second embodiment, the CU can notify the UE of the RRC parameter in the mobility between beams/TRPs in a cell, and the number of UEs to be accommodated in the cell that is spatially separated by the beams/TRPs can be increased. Thus, the parameter can be notified more promptly than by the notification with the RRC signaling.

Although the second embodiment describes, as an example, the base station device in which the CU and the DUs are separated, the second embodiment may be applied to a base station device in which the CU and the DUs are not separated. The base station device may be a base station device that does not share the RRC parameter between beams. With application of the second embodiment to the base station device, the CU may be read as the gNB. This enables notification of the RRC parameter from the gNB to the UE through the source beam in the mobility between beams in a cell, and increase in the number of UEs to be accommodated in the cell that is spatially separated by the beams. The gNB can promptly notify the UE of the parameter.

Although the second embodiment describes, as an example, the base station device which notifies the UE of the RRC parameter using the source beam/TRP on movement, the RRC parameter may be notified from another beam/TRP. The other beam/TRP may be, for example, a beam/TRP for transmitting control information. Consequently, for example, the RRC parameter can be notified with less amount of signaling in a base station device with beams/TRPs for transmitting and receiving the user data and for transmitting and receiving the control information. Consequently, the RRC parameter can be promptly notified in the mobility between beams.

The second embodiment provides, for example, a communication system including: a communication terminal device; and a base station device that performs radio communication with the communication terminal device via a radio beam, wherein a cell configured by the base station device is spatially separated by a plurality of radio beams being served by the base station device, and the base station device changes a radio resource control (RRC) parameter to be applied to the communication terminal device from a first RRC parameter for a first radio beam to a second RRC parameter for a second radio beam when the communication terminal device moves from a range of the first radio beam to a range of the second radio beam. The plurality of radio beams may be formed by a plurality of DUs (i.e., TRPs) as exemplified in FIG. 8, by one DU, or by a base station device in which the CU and the DUs are integrated.

Under this structure, the RRC parameter to be applied to the communication terminal device is changed according to change in the radio beam to be applied to the communication terminal device. Thus, the number of the communication terminal devices to be accommodated can be increased as described above.

Here, the structure can be variously modified as described above. For example, provided is a communication system wherein the base station device includes: at least one distributed unit (DU) that outputs the plurality of radio beams; and a central unit (CU) that controls the at least one DU, the CU has a medium access control (MAC) function, and the CU gives: a notification of the second RRC parameter to the communication terminal device; and a notification of a switching instruction from the first radio beam to the second radio beam to the communication terminal device via the first radio beam. Alternatively, provided is a communication system wherein the base station device has a function of outputting a plurality of radio beams and a MAC function, and gives: a notification of the second RRC parameter to the communication terminal device; and a notification of a switching instruction from the first radio beam to the second radio beam to the communication terminal device via the first radio beam.

The various modifications are provided as described in the first to third modifications below.

The First Modification of the Second Embodiment

Although the second embodiment mainly describes the notification of the RRC parameter on the SR, the second embodiment may be applied to RRC parameters on Ack/Nack repetitions.

The following (1) to (3) are described as the RRC parameters on the Ack/Nack repetitions:

(1) the number of repetitions of Ack/Nack from the UE, for example, repetitionFactor described in Non-Patent Document 12;

(2) a parameter for determining a RB for repeated transmission of Ack/Nack, for example, n1PUCCH-AN-Rep described in Non-Patent Document 12; and (3) a combination of (1) and (2) above.

In (1) above, changing the number of repetitions of Ack/Nack depending on a propagation state can increase the reliability of notifying Ack/Nack from the UE to the CU, particularly under an inferior propagation environment.

In (2) above, preventing a RB for the Ack/Nack repetitions from contending with that of another UE due to the mobility between beams/TRPs of the UE can increase the number of UEs to be accommodated in one of the beams/TRPs.

The parameters to be notified as (1) to (3) above may be values per se or amounts of change in the values.

The first modification may be identical to the second embodiment in terms of the method and details in which the CU notifies the UE of the switching through a source beam/TRP on movement. The method for notifying the RRC parameter described in the second embodiment may be applied to the method in which the CU notifies the UE of the RRC parameter on the Ack/Nack repetitions through the source beam/TRP on movement.

The CU may or need not notify the UE of a parameter indicating whether to bundle pieces of retransmission data as the RRC parameter on the Ack/Nack repetitions. The parameter indicating whether to bundle the pieces may be, for example, tdd AckNackFeedbackMode described in Non-Patent Document 12. When the parameter indicating whether to bundle the pieces is notified, for example, disabling bundling of retransmissions under the inferior propagation environment enables the CU to reduce the retransmission of the user data whose delivery has been verified.

The CU may notify the UE of the parameter necessary for beam sweeping similarly as the second embodiment. Consequently, the UE can easily receive a beam sweeping signal in the mobility between beams/TRPs.

The CU may notify the UE of the parameter necessary for beam sweeping with the L1/L2 signaling or the MAC signaling.

The CU may include, in a notification of the RRC parameter on the Ack/Nack repetitions to the UE, an identifier indicating switching of a parameter due to the switching of the TRP/beam. The UE may hold the RRC parameter on the Ack/Nack repetitions before change. Consequently, the UE can prevent the reliability of transmitting Ack/Nack to the source TRP/beam on movement from being reduced due to change in the parameter, in transmitting Ack/Nack before switching the TRP/beam.

Similarly as the second embodiment, the CU need not notify, as the RRC parameter on the Ack/Nack repetitions, a parameter using the same value as that of the target beam/TRP on movement. Consequently, the amount of signaling for notifying the parameter can be reduced.

The CU and the UE may initialize the RRC parameter on the Ack/Nack repetitions or hold the value when the beam/TRP of the UE is switched. The initial value of the RRC parameter may be defined in a standard or notified from the CU to the UE in advance with the RRC signaling. Whether the parameter value when the beam/TRP of the UE is switched is initialized or held may be defined in a standard or notified from the CU to the UE in advance. Alternatively, information on whether the value is initialized or held may be notified from the CU to the UE together with a switching instruction. Consequently, even upon failure in notification of the parameter from the source beam/TRP on movement to the UE, the UE can use the initial value or the RRC parameter before change. Thus, the reliability of the Ack/Nack repetitions from the UE to the target beam/TRP on movement can be increased.

The CU may notify the UE of the RRC parameter on the Ack/Nack repetitions and the switching instruction together, similarly as the second embodiment. Consequently, the amount of signaling in switching the beam/TRP can be reduced.

Alternatively, the CU may notify the UE of the switching instruction after notifying the RRC parameter on the Ack/Nack repetitions. Consequently, the CU can notify the UE of the switching instruction after verifying delivery of the RRC parameter on the Ack/Nack repetitions. As a result, it is possible to avoid the undelivered RRC parameter on the Ack/Nack repetitions from causing the repeated Ack/Nack from the UE to be undelivered and to avoid the undelivered repeated Ack/Nack from the UE from causing decrease in the reliability of notifying the Ack/Nack.

Alternatively, the CU may notify the UE of the RRC parameter on the Ack/Nack repetitions after notifying the switching instruction. Here, the CU should notify the UE of the switching timing together with the switching instruction. Even when it takes time for the UE to perform a process of switching the communication destination beam/TRP, the smooth switching is possible.

The CU may notify the UE of the RRC parameter on the Ack/Nack repetitions with the L1/L2 signaling. Consequently, the parameter can be promptly notified to the UE.

Alternatively, the CU may notify the RRC parameter on the Ack/Nack repetitions with the MAC signaling. Since this enables multi-level modulations, the parameter can be notified with less number of symbols. With the HARQ retransmission control, the reliability of notifying the parameter is increased. Since the CU can notify the UE of the switching instruction after verifying delivery of the parameter, it is possible to avoid the repeated Ack/Nack from being undelivered from the UE due to the undelivered parameter, and to increase the reliability of transmitting Ack/Nack.

The CU may notify the UE of the switching with the L1/L2 signaling or the MAC signaling, similarly as the second embodiment. This can produce the same advantages as those according to the second embodiment.

The parameter on the SR in Step ST902 of FIG. 9 may be replaced with a parameter on the Ack/Nack repetitions in an example sequence for the notification of the RRC parameter on the Ack/Nack repetitions and the switching instruction.

The CU may transmit a notification of the parameter on the Ack/Nack repetitions to the UE a plurality of number of times or increase the transmission power, similarly as the second embodiment. Consequently, the reliability of notifying the Ack/Nack repetitions can be increased. The same holds true for the switching instruction from the CU to the UE.

The UE may notify the target beam/TRP on movement of Ack/Nack in response to the downlink user data that has been received from the CU through the source beam/TRP on movement. The UE may notify the target beam/TRP on movement of Ack/Nack when the beam/TRP is switched between the downlink user data and the Ack/Nack. This allows the CU and the UE to smoothly process the downlink user data in switching the beam/TRP.

In the Ack/Nack repetitions from the UE to the CU, the CU may use both or only one of Ack/Nack received by the source beam/TRP on movement and Ack/Nack received by the target beam/TRP on movement. Ack/Nack may be used when the beam/TRP is switched during the Ack/Nack repetitions from the UE to the CU. By which beam/TRP the Ack/Nack is received for use may be predefined in a standard, or appropriately switched by the CU. Using both of the Ack/Nack received by the source beam/TRP on movement and the Ack/Nack received by the target beam/TRP on movement can increase the reliability of notifying the Ack/Nack from the UE to the CU even when the beam/TRP is switched during the Ack/Nack repetitions. Moreover, using only one of the Ack/Nack received by the source beam/TRP on movement and the Ack/Nack received by the target beam/TRP on movement eliminates the need for the CU to perform a process of combining the Ack/Nack repetitions. This facilitates a process of receiving the Ack/Nack in the CU.

The CU may retransmit the downlink user data to the UE through the target beam/TRP on movement with the Ack/Nack repetitions transmitted from the UE to the source beam/TRP on movement. The retransmission may be performed when the beam/TRP is switched between the Ack/Nack repetitions from the UE to the CU and the retransmission of the downlink user data from the CU to the UE. This allows the CU and the UE to smoothly perform a process of retransmitting the downlink user data in switching the beam/TRP.

With application of the first modification, the RRC parameter on the Ack/Nack repetitions can be notified to the UE, and the number of UEs to be accommodated in a cell that is spatially separated by the beams/TRPs can be increased. Thus, the parameter can be notified more promptly than by the notification with the RRC signaling.

The Second Modification of the Second Embodiment

Although the second embodiment mainly describes the notification of the RRC parameter on the SR, the second embodiment may be applied to RRC parameters on the SRS.

The following (1) to (7) are described as the RRC parameters on the SRS:
(1) a bandwidth used for the SRS, for example, srs-Bandwidth described in Non-Patent Document 12;
(2) a bandwidth for performing the frequency hopping of the SRS, for example, srs-HoppingBandwidth described in Non-Patent Document 12;
(3) a position of the SRS on the frequency axis, for example, freqDomainPosition described in Non-Patent Document 12;
(4) a period and a subframe offset of the SRS, for example, srs-ConfigIndex described in Non-Patent Document 12;
(5) a Comb position in transmitting the SRS, for example, transmissionComb described in Non-Patent Document 12;
(6) cyclic shift of the SRS, for example, cyclicShift described in Non-Patent Document 12; and
(7) combinations of (1) and (6) above.

In (1) above, changing the bandwidth used for the SRS according to the number of UEs in one beam/TRP can increase the number of UEs to be accommodated in the one beam/TRP.

In (2) above, flexibly changing, according to the number of UEs in one beam/TRP, the bandwidth for performing the frequency hopping of the SRS can increase the number of UEs to be accommodated in the one beam/TRP.

In (3) above, preventing the position of the SRS on the frequency axis from contending with that of another UE due to the mobility between beams/TRPs of the UE can increase the number of UEs to be accommodated in one of the beams/TRPs.

In (4) above, preventing the timing with which the SRS is transmitted from contending with that of another UE due to the mobility between beams/TRPs of the UE can increase the number of UEs to be accommodated in one of the beams/TRPs.

In (5) above, preventing the Comb position of the SRS from contending with that of another UE due to the mobility between beams/TRPs of the UE can increase the number of UEs to be accommodated in one of the beams/TRPs.

In (6) above, preventing an amount of cyclic shift of the SRS from contending with that of another UE due to the mobility between beams/TRPs of the UE can increase the number of UEs to be accommodated in one of the beams/TRPs.

In (4) above, only the subframe offset for transmitting the SRS may be changed. Only information on the subframe offset may be notified in changing the subframe offset. Consequently, the CU easily adjusts transmission of SRSs by a plurality of UEs in the target beam/TRP on movement to avoid a contention between the UEs. Notifying only the information on the subframe offset enables reduction in bits to be transmitted from the CU to the UE.

The parameters to be notified as (1) to (7) above may be values per se or amounts of change in the values. Using the value per se facilitates processing for notifying the parameter from the CU to the UE. Further, using the amount of change in the value enables reduction in bits required for notifying the parameter.

The second modification may be identical to the second embodiment in terms of the method and details in which the CU notifies the UE of the switching through a source beam/TRP on movement. The method for notifying the RRC parameter described in the second embodiment may be applied to the method of which the CU notifies the UE of the RRC parameter on the SRS through the source beam/TRP on movement.

The CU may or need not notify the UE of a parameter indicating whether to consecutively transmit the SRS as the RRC parameter on the SRS. The parameter indicating whether to consecutively transmit the SRS may be, for example, Duration described in Non-Patent Document 12. Notification of the parameter enables the CU to flexibly allocate the SRS resources to the UE.

The CU may notify the UE of the parameter necessary for beam sweeping similarly as the second embodiment. Consequently, the UE can easily receive a beam sweeping signal in the mobility between beams/TRPs.

The CU may notify the UE of the parameter necessary for beam sweeping with the L1/L2 signaling or the MAC signaling.

The CU may include an identifier indicating switching of a parameter due to the switching of the TRP/beam in a notification of the RRC parameter on the SRS to the UE. The UE may hold the RRC parameter on the SRS before change. Consequently, the UE can prevent a random access operation and decrease in the uplink communication rate that are caused by the SRS undelivered to the CU due to change in the parameter in transmitting the SRS before switching the TRP/beam.

Similarly as the second embodiment, the CU need not notify, as the RRC parameter on the SRS, a parameter using the same value as that of the target beam/TRP on movement. Consequently, the amount of signaling for notifying the parameter can be reduced.

The CU and the UE may initialize the RRC parameter on the SRS or hold the value when the beam/TRP of the UE is switched. The initial value of the RRC parameter may be defined in a standard or notified from the CU to the UE in advance with the RRC signaling. Whether the parameter value when the beam/TRP of the UE is switched is initialized or held may be defined in a standard or notified from the CU to the UE in advance. Alternatively, information on whether the value is initialized or held may be notified from the CU to the UE together with a switching instruction. Consequently, even upon failure in notification of the parameter from the source beam/TRP on movement to the UE, the UE can prevent the SRS from being undelivered from the UE to the target beam/TRP on movement, using the initial value or the RRC parameter before change.

The CU may notify the UE of the RRC parameter on the SRS and the switching instruction together, similarly as the second embodiment. Consequently, the amount of signaling in switching the beam/TRP can be reduced.

Alternatively, the CU may notify the UE of the switching instruction after notifying the RRC parameter on the SRS. Thereby, the CU may notify the UE of the switching instruction after verifying delivery of the RRC parameter on the SRS. As a result, it is possible to avoid the SRS from being undelivered from the UE to the CU due to the undelivered RRC parameter on the SRS, and to avoid the random access and decrease in the uplink communication rate.

Alternatively, the CU may notify the UE of the RRC parameter on the SRS after notifying the switching instruction. Here, the CU should notify the UE of the switching timing together with the switching instruction. Even when it takes time for the UE to perform a process of switching the communication destination beam/TRP, the smooth switching is possible.

The CU may notify the UE of the RRC parameter on the SRS with the L1/L2 signaling. Consequently, the parameter can be promptly notified to the UE.

Alternatively, the CU may notify the RRC parameter on the SRS with the MAC signaling. Since this enables multi-level modulations, the parameter can be notified with less number of symbols. With the HARQ retransmission control, the reliability of notifying the parameter is increased. Since the CU can notify the UE of the switching instruction after verifying delivery of the parameter, it is possible to avoid the SRS from being undelivered from the UE to the CU due to the undelivered parameter, and to avoid the random access and decrease in the uplink communication rate.

The CU may notify the UE of the switching with the L1/L2 signaling or the MAC signaling, similarly as the second embodiment. This can produce the same advantages as those according to the second embodiment.

The parameter on the SR in Step ST902 of FIG. 9 may be replaced with the parameter on the SRS in an example sequence for the notification of the RRC parameter on the SRS and the switching instruction.

The CU may transmit a notification of the parameter on the SRS to the UE a plurality of number of times or increase the transmission power, similarly as the second embodiment. Thus, the reliability of notifying the parameter on the SRS can be increased. The same holds true for the switching instruction from the CU to the UE.

The UE may transmit the SRS through the target beam/TRP on movement in response to an instruction for transmitting the SRS that has been received from the CU through the source beam/TRP on movement. The UE may transmit the SRS to the target beam/TRP on movement when the beam/TRP is switched between the instruction for transmitting the SRS and the transmission of the SRS. The transmission of the SRS may be aperiodic transmission of the SRS. This allows the CU and the UE to smoothly perform a process of transmitting the SRS in switching the beam/TRP.

The CU may disable the SRS transmitted from the UE to the source beam. The operation of disabling the SRS may be performed when the beam/TRP is switched after transmission of the SRS. The CU may retransmit the instruction to the UE for transmitting the SRS. The UE may retransmit the SRS to the target beam/TRP on movement. Consequently, the CU can perform scheduling appropriate for a propagation state after switching the beam/TRP.

The UE may autonomously retransmit the SRS. Consequently, the CU can promptly obtain the SRS after switching the beam/TRP. Whether the UE autonomously retransmits the SRS may be defined in a standard, notified from the CU to the UE in advance with the RRC signaling, or notified from the CU to the UE together with a switching instruction.

With application of the second modification, the RRC parameter on the SRS can be notified to the UE, and the number of UEs to be accommodated in a cell that is spatially separated by the beams/TRPs can be increased. Thus, the parameter can be notified more promptly than by the notification with the RRC signaling.

Third Modification of Second Embodiment

Although the second embodiment mainly describes the notification of the RRC parameter on the SR, the second embodiment may be applied to RRC parameters on the CQI/CSI.

The following (1) to (5) are described as the RRC parameters on the CQI/CSI:
(1) a parameter for determining a RB of the CQI, for example, cqi-PUCCH-ResourceIndex described in Non-Patent Document 12;
(2) periods and subframe offsets of the CQI and a precoding matrix indicator (PMI), for example, cqi-pmi-ConfigIndex described in Non-Patent Document 12;
(3) a period and a subframe offset of a rank indicator (RI), for example, ri-ConfigIndex described in Non-Patent Document 12;
(4) whether the Ack/Nack and the CQI can be simultaneously transmitted, for example, simultaneousAckNackAndCQI described in Non-Patent Document 12; and
(5) combinations of (1) and (4) above.

In (1) above, preventing the position of the RB to be used for the CQI from contending with that of another UE due to the mobility between beams/TRPs of the UE can increase the number of UEs to be accommodated in one of the beams/TRPs.

In (2) above, preventing the timing with which the CQI and the PMI are transmitted from contending with that of another UE due to the mobility between beams/TRPs of the UE can increase the number of UEs to be accommodated in one of the beams/TRPs.

In (3) above, preventing the timing with which the RI is transmitted from contending with that of another UE due to the mobility between beams/TRPs of the UE can increase the number of UEs to be accommodated in one of the beams/TRPs.

In (4) above, the flexible settings about whether the Ack/Nack and the CQI can be simultaneously transmitted according to an uplink data scheduling status in the mobility between the target beams/TRPs on movement allow the UE to efficiently transmit the Ack/Nack and the CQI to the CU.

In (2) above, only the subframe offsets of the CQI and the PMI may be changed. Only information on the subframe offsets may be notified in changing the subframe offsets. Consequently, the CU easily adjusts transmission of CQIs/CSIs by a plurality of UEs in the target beam/TRP on movement to avoid a contention between the UEs. Notifying only the information on the subframe offsets enables reduction in bits to be transmitted from the CU to the UE.

In (3) above, only the subframe offset of the RI may be changed similarly as (2) above. Only the information on the subframe offset may be notified in changing the subframe offset. This can produce the same advantages as previously described.

The parameters to be notified as (1) to (5) above may be values per se or amounts of change in the values. Using the value per se facilitates processing for notifying the parameter from the CU to the UE. Further, using the amount of change in the value enables reduction in bits required for notifying the parameter.

The CU may notify the UE of the parameter necessary for beam sweeping similarly as the second embodiment. Consequently, the UE can easily receive a beam sweeping signal in the mobility between beams/TRPs.

The CU may notify the UE of the parameter necessary for beam sweeping with the L1/L2 signaling or the MAC signaling.

The third modification may be identical to the second embodiment in terms of the method and details in which the CU notifies the UE of the switching through a source beam/TRP on movement. The method for notifying the RRC parameter described in the second embodiment may be applied to the method in which the CU notifies the UE of the RRC parameter on the CQI/CSI through the source beam/TRP on movement.

The CU may include, in a notification of the RRC parameter on the CQI/CSI to the UE, an identifier indicating switching of a parameter due to the switching of the TRP/beam. The UE may hold the RRC parameter on the CQI/CSI before change. Consequently, the UE can prevent decrease in the downlink communication rate caused by the CQI/CSI undelivered to the CU due to change in the parameter in transmitting the CQI/CSI before switching the TRP/beam.

Similarly as the second embodiment, the CU need not notify, as the RRC parameter on the CQI/CSI, a parameter using the same value as that of the target beam/TRP on movement. Consequently, the amount of signaling for notifying the parameter can be reduced.

The CU and the UE may initialize the RRC parameter on the CQI/CSI or hold the value when the beam/TRP of the UE is switched. The initial value of the RRC parameter may be defined in a standard or notified from the CU to the UE in advance with the RRC signaling. Whether the parameter value when the beam/TRP of the UE is switched is initialized or held may be defined in a standard or notified from the CU to the UE in advance. Alternatively, information on whether the value is initialized or held may be notified from the CU to the UE together with a switching instruction. Consequently, even upon failure in notification of the parameter from the source beam/TRP on movement to the UE, the UE can use the initial value or the RRC parameter before change. Thus when, for example, the RRC parameter identical to that of the source beam/TRP on movement is used in the target beam/TRP on movement, the UE can prevent the CQI/CSI from being undelivered to the target beam/TRP on movement.

The CU may notify the UE of the RRC parameter on the CQI/CSI and the switching instruction together, similarly as the second embodiment. Consequently, the amount of signaling in switching the beam/TRP can be reduced.

Alternatively, the CU may notify the UE of the switching instruction after notifying the RRC parameter on the CQI/CSI. Thereby, the CU may notify the UE of the switching instruction after verifying delivery of the RRC parameter on the CQI/CSI. As a result, it is possible to avoid the CQI from being undelivered from the UE to the CU due to the undelivered RRC parameter on the CQI/CSI, and to avoid decrease in the downlink communication rate.

Alternatively, the CU may notify the UE of the RRC parameter on the CQI/CSI after notifying the switching instruction. Here, the CU should notify the UE of the switching timing together with the switching instruction. Even when it takes time for the UE to perform a process of switching the communication destination beam/TRP, the smooth switching is possible.

The CU may notify the UE of the RRC parameter on the CQI/CSI with the L1/L2 signaling. Consequently, the parameter can be promptly notified to the UE.

Alternatively, the CU may notify the RRC parameter on the CQI/CSI with the MAC signaling. Since this enables multi-level modulations, the parameter can be notified with less number of symbols. With the HARQ retransmission control, the reliability of notifying the parameter is increased. Since the CU can notify the UE of the switching instruction after verifying delivery of the parameter, it is possible to avoid the CQI/CSI from being undelivered from the UE to the CU due to the undelivered parameter, and to avoid decrease in the downlink communication rate.

The CU may notify the UE of the switching with the L1/L2 signaling or the MAC signaling, similarly as the second embodiment. This can produce the same advantages as those according to the second embodiment.

The parameter on the SR in Step ST902 of FIG. 9 may be replaced with the parameter on the CQI/CSI in an example sequence for the notification of the RRC parameter on the CQI/CSI and the switching instruction.

The CU may transmit a notification of the parameter on the CQI/CSI to the UE a plurality of number of times or increase the transmission power, similarly as the second embodiment. Consequently, the reliability of notifying the parameter on the CQI/CSI can be increased. The same holds true for the switching instruction from the CU to the UE.

The UE may transmit the CQI/CSI through the target beam/TRP on movement in response to an instruction for transmitting the CQI/CSI from the CU. The instruction has been received from the source beam/TRP on movement. The UE may transmit the CQI/CSI to the target beam/TRP on movement when the beam/TRP is switched between the instruction for transmitting the CQI/CSI and transmission of the CQI/CSI. The transmission of the CQI/CSI may be aperiodic transmission of the CQI/CSI. This allows the CU and the UE to smoothly perform a process of transmitting the CQI/CSI in switching the beam/TRP.

The CU may disable the CQI/CSI transmitted from the UE to the source beam. The operation of disabling the CQI/CSI may be performed when the beam/TRP is switched after transmission of the CQI/CSI. The CU may retransmit the instruction to the UE for transmitting the CQI/CSI. The UE may retransmit the CQI/CSI to the target beam/TRP on movement. Consequently, the CU can perform scheduling appropriate for a propagation state after switching the beam/TRP.

The UE may autonomously retransmit the CQI/CSI. Consequently, the CU can promptly obtain the CQI/CSI after switching the beam/TRP. Whether the UE autonomously retransmits the CQI/CSI may be defined in a standard, notified from the CU to the UE in advance with the CQI/CSI signaling, or notified from the CU to the UE together with a switching instruction.

With application of the third modification, the RRC parameter on the CQI/CSI can be notified to the UE, and the number of UEs to be accommodated in a cell that is spatially separated by the beams/TRPs can be increased. Thus, the parameter can be notified more promptly than by the notification with the RRC signaling.

The Third Embodiment

According to the second embodiment, the gNB notifies the UE of the RRC parameter through the source beam/TRP on movement. Under the NR, application of higher frequencies than those of LTE is being studied to allocate a wider frequency bandwidth. Application of the higher frequencies may suddenly deteriorate a communication state under the influence of, for example, an obstacle. When notification of the RRC parameter or the switching is too late for switching the beam/TRP, a problem with loss of the radio link between the gNB and the UE occurs.

The third embodiment discloses a method for solving such a problem.

The CU notifies the UE of the RRC parameter through the target beam/TRP on movement. The CU notifies the UE of the switching instruction through the source beam/TRP on movement. The third embodiment differs from the second embodiment in that the CU notifies the RRC parameter through the target beam/TRP on movement.

The CU may notify the UE of the RRC parameter after notifying the UE of the switching. Consequently, the UE can smoothly obtain the RRC parameter after switching the communication destination beam/TRP.

The RRC parameter may be the one described in 6.3.2 of Non-Patent Document 12, similarly as the second embodiment. The RRC parameter may relate to, for example, the SR, the Ack/Nack repetitions, the Sounding Reference Signal (SRS), or the CQI/CSI.

The CU may notify the UE of the parameter necessary for beam sweeping. The parameter necessary for beam sweeping may be the one described in the first embodiment. The parameter necessary for beam sweeping may be notified though the source beam/TRP on movement. The parameter necessary for beam sweeping may be a parameter in the target beam/TRP on movement. Consequently, the UE can easily receive a beam sweeping signal in the mobility between beams/TRPs.

The CU may notify the UE of the parameter necessary for beam sweeping with the L1/L2 signaling or the MAC signaling, similarly as the second embodiment. Thus, the parameter necessary for beam sweeping can be promptly notified.

The RRC parameters on the SR may be the ones described in (1) to (3) in the second embodiment. The CU may or need not notify the UE of the parameter indicating the maximum number of times the SR is retransmitted as the RRC parameter on the SR, similarly as the second embodiment. This can produce the same advantages as those according to the second embodiment.

The CU may notify the UE of the RRC parameter with the L1/L2 signaling, similarly as the second embodiment. This enables a prompt notification from the CU to the UE. The CU can notify the UE of the RRC parameter even when the frequency resources used for responding to the Ack/Nack from the UE to the CU are changed according to the switching of the beam/TRP in the gNB.

Alternatively, the MAC signaling may be used. Thus, the RRC parameter can be transmitted with less number of symbols, and the reliability of notifying the parameter is increased, similarly as the second embodiment. Thus, it is possible to avoid execution of the random access caused by the SR undelivered from the UE and an excessive number of times the SR is retransmitted from the UE due to the undelivered parameter.

Alternatively, the RRC signaling may be used. Since the CU can notify the UE of the RRC parameter in advance, there is no need to notify the RRC parameter in switching the beam/TRP. This can reduce the amount of signaling. The aforementioned method differs from that of Non-Patent Document 1 in that the target beam/TRP on movement notifies the UE of the RRC parameter.

The L1/L2 signaling may be used as a method for notifying the switching instruction from the CU to the UE, similarly as the second embodiment. Alternatively, the MAC signaling may be used. Thus, switching of the beam/TRP can be promptly notified to the UE. Thus, the reliability of the notification can be increased with the MAC signaling.

The CU need not notify, as the RRC parameter, a parameter using the same value as that of the target beam/TRP on movement. Consequently, the amount of signaling for notifying the parameter can be reduced.

The CU and the UE may initialize the RRC parameter or hold the parameter value when the beam/TRP of the UE is switched, similarly as the second embodiment. The parameter value may be held, for example, upon failure in notification of the parameter from the CU to the UE. The initial value of the parameter value may be defined in a standard or notified from the CU to the UE in advance with the RRC signaling. Whether the parameter value when the beam/TRP of the UE is switched is initialized or held may be defined in a standard, notified from the CU to the UE in advance, or notified from the CU to the UE together with a switching instruction. Consequently, even upon failure in notification of the parameter from the source beam/TRP on movement to the UE, the UE can use the RRC parameter before change. Thus when, for example, the RRC parameter identical to that of the source beam/TRP on movement is used in the target beam/TRP on movement, the UE can prevent the SR from being undelivered to the target beam/TRP on movement.

The gNB may or need not switch the beam/TRP upon excess of the number of times the HARQ is retransmitted in response to the switching instruction from the source beam/TRP on movement to the UE, similarly as the second embodiment. Each of the cases can produce the same advantages as those according to the second embodiment.

FIG. 10 is a sequence diagram illustrating switching of the beam/TRP when the CU notifies a parameter through the target beam/TRP on movement. FIG. 10 illustrates an example of notifying the parameter and the switching instruction from the CU to the UE with the MAC signaling. In FIG. 10, "S-beam/TRP" denotes the source beam/TRP on movement being served by the CU, and "T-beam/TRP" denotes the target beam/TRP on movement being served by the CU. The black circles on the arrows in FIG. 10 represent beams/TRPs to be used for communication. The same step numbers are assigned to the same Steps as those in FIG. 9, and the common description thereof is omitted.

Before switching the beam/TRP in FIG. 10, the UE transmits and receives the user data to and from the CU through the S-beam/TRP (Step ST901).

In Step ST2001 of FIG. 10, the CU notifies the UE of a switching instruction through the S-beam/TRP. The MAC signaling is used to notify the switching instruction. The L1/L2 signaling may be used. The CU may include information indicating the T-beam/TRP in the switching instruction. In Step ST2002, the UE notifies, through the S-beam/TRP, the CU of Ack in response to the switching instruction. When the reception result from the UE is Nack, the CU may retransmit the switching instruction through the S-beam/TRP.

In Step ST2003 of FIG. 10, the CU notifies the UE of a SR parameter through the T-beam/TRP. The MAC signaling is used for this notification. The L1/L2 signaling may be used. The SR parameter may include sr-PUCCH-ResourceIndex and sr-ConfigIndex that are described in Non-Patent Document 12. In Step ST2004, the UE notifies, through the T-beam/TRP, the CU of Ack in response to the notification of the SR parameter. When the reception result from the UE is Nack, the CU may retransmit the SR parameter through the T-beam/TRP.

The UE may transmit an uplink signal to the source beam/TRP on movement. The uplink signal may be a response to the L1/L2 signaling with which the CU issues a switching instruction. An L1/L2 signaling for response may be newly provided as the uplink signal. New uplink control information (UCI) may be provided as the response. This enables the CU to verify delivery to the UE even when the L1/L2 signaling is used for issuing the switching instruction from the CU. Thus, the reliability of the L1/L2 signaling can be increased.

The new UCI may be the same as that in the second embodiment. This can produce the same advantages as those according to the second embodiment.

Alternatively, the UE may transmit the uplink signal to the target beam/TRP on movement. The CU and the UE may use the uplink signal as a signal for verifying switching of the beam/TRP in the UE. The uplink signal may be a response to the MAC signaling with which the CU notifies the RRC parameter. Alternatively, the uplink signal may be a response to the L1/L2 signaling with which the CU notifies the RRC parameter. A L1/L2 signaling for response may be newly provided as the uplink signal. New uplink control information (UCI) may be provided as the response. This enables the CU to verify delivery to the UE even when the L1/L2 signaling is used for issuing the switching instruction from the CU. Thus, the reliability of the L1/L2 signaling can be increased.

The CU may notify the UE of the presence or absence of a request to transmit the uplink signal to the UE, similarly as the second embodiment. The presence or absence of the request may be the presence or absence of a request to transmit the uplink signal to each of the source beam/TRP on movement and the target beam/TRP on movement. The presence or absence of the request may be included in the switching instruction from the CU to the UE. Since this can eliminate, for example, a response from the UE when the communication quality is superior, the amount of signaling can be reduced.

The UE may transmit the signal for verification with frequency resources for the SR. Alternatively, the UE may transmit the SR as the signal for verification. Consequently, the frequency resources for the uplink signal can be saved.

The UE may transmit the SR with the minimum period, similarly as the second embodiment. Thus, it is possible to verify with lower latency that the UE has switched the communication destination beam/TRP.

The CU may reserve the common resources for the SR for common use among UEs within range of the same beam/TRP, similarly as the second embodiment. The UE may transmit the SR with the common resources for the SR. The common resources for the SR may be resources allowing a contention among the UEs (contention-based). Consequently, the UE can notify the CU that the beam/TRP has been switched even when failing to receive the RRC parameter.

The CU and the UE may use the initial value of the RRC parameter on the SR when the beam/TRP of the UE is switched as the position of the common resources for the SR. The UE may notify the target beam/TRP on movement of the SR with the common resources for the SR. Consequently, since the UE can transmit the SR to the CU immediately after switching the communication destination beam/TRP, the UE can transmit the uplink user data to the CU immediately after switching the communication destination beam/TRP. This enables reduction in latency in the uplink communication in switching the beam/TRP.

The UE may transmit the SRS to the target beam/TRP on movement, similarly as the second embodiment. The SRS may be aperiodic or periodic. The UE may transmit the SRS to the target beam/TRP on movement a predetermined number of times. The number of transmission times may be defined in a standard or notified from the CU to the UE in advance. Consequently, the UE can notify the CU that the communication destination beam/TRP has been switched even without any uplink user data to be transmitted to the CU.

The CU may determine, using the SR, whether the UE has switched the communication destination beam/TRP similarly as the second embodiment. The CU may notify the parameter on the SR and the switching instruction again from the source beam/TRP on movement. Consequently, it is possible to prevent the RLF or the random access occurring when the UE fails to receive the parameter on the SR or the switching instruction. Consequently, the time to switch the beam/TRP can be shortened.

The CU may notify the UE of the parameter a plurality of number of times, similarly as the second embodiment. The CU may increase the transmission power for notifying the parameter to the UE. Thus, the reliability of notifying the parameter can be increased.

For transmission of the SR from the UE, the CU may disable the SR received by the source beam/TRP on movement. The CU may disable the SR when the beam/TRP is switched between reception of the SR and transmission of the uplink scheduling grant. The UE may retransmit the SR to the target beam/TRP on movement. The UE may retransmit the SR after receiving a notification of the RRC parameter from the CU. This can prevent the SR retransmitted from the UE from being underlived to the CU.

Alternatively, in switching the beam/TRP after transmission of the SR from the UE, the CU may enable the SR received by the source beam/TRP on movement, similarly as the second embodiment. This allows smooth uplink data communication when switching of the beam/TRP occurs.

In the uplink scheduling grant notification from the CU to the UE, the CU and the UE may disable the uplink scheduling grant when the beam/TRP is switched between the uplink scheduling grant and the uplink user data, similarly as the second embodiment. The CU may retransmit the uplink scheduling grant from the target beam/TRP on movement. Alternatively, the UE may start again from transmission of the SR to the target beam/TRP on movement. The UE may retransmit the SR after receiving a notification of the RRC parameter from the CU. This can prevent the SR retransmitted from the UE from being underlived to the CU.

The CU and the UE may enable the grant. The operations for the CU and the UE to enable the grant are the same as those in the second embodiment. Consequently, the amount of signaling between the CU and the UE can be reduced.

Whether the uplink scheduling grant is enabled may be defined in a standard or notified from the CU to the UE. The notification from the gNB to the UE may be made in advance with the RRC signaling, the MAC signaling, or the L1/L2 signaling. The uplink scheduling grant may be enabled, for example, when the target beam/TRP on movement can use the uplink resources indicated by the scheduling grant for the UE. The aforementioned notification may be made together with the switching notification in the example with the MAC signaling or the L1/L2 signaling. Consequently, the CU can perform, with less signaling, scheduling according to a use status of the uplink resources in the target beam/TRP on movement.

When the UE transmits the uplink user data to the CU, the CU may transmit, from the target beam/TRP on movement to the UE, Ack/Nack in response to the uplink user data received by the source beam/TRP on movement from the UE. The Ack/Nack may be transmitted from the target beam/TRP on movement when the beam/TRP is switched between transmission of the uplink user data from the UE and notification of the Ack/Nack from the gNB. The UE may notify the Ack/Nack before or after the CU notifies the UE of the RRC parameter. Alternatively, the UE may notify the Ack/Nack between notification of the parameter and an Ack/Nack response from the UE to the CU in response to the notification of the parameter. This allows smooth switching of the beam/TRP after transmission of the uplink user data.

In addition to the advantages described in the second embodiment, the third embodiment enables the CU to notify the UE of the RRC parameter even with sudden deterioration in the communication environment between the source beam/TRP on movement and the UE. As a result, for example, the random access procedure by the UE caused by the undelivered SR can be reduced.

The second and third embodiments may be combined for use. In other words, the CU may switch from which one of the source beam/TRP on movement and the target beam/TRP on movement the RRC parameter is to be transmitted. Consequently, the CU can flexibly change the beam/TRP from which the RRC parameter is to be transmitted, according to the communication environment.

The CU may semi-statically preset to the UE from which one of the source beam/TRP on movement and the target beam/TRP on movement the RRC parameter is to be transmitted. The RRC signaling may be used for the notification. This enables flexible settings of a communication path of the RRC parameter according to a propagation state.

Alternatively, the CU may dynamically provide the settings. For example, the CU may include, in the switching instruction, information on from which one of the source beam/TRP on movement and the target beam/TRP on movement the RRC parameter is to be transmitted and notify the UE of the information. The UE may receive the RRC parameter with the notification. Since the UE can explicitly know a receiving target of the RRC parameter, the reliability of obtaining the notification of the RRC parameter can be increased.

Alternatively, the receiving target may be implicitly determined in a standard. For example, the UE may receive the RRC parameter from the source beam/TRP on movement before receiving the switching instruction, and receive the RRC parameter from the target beam/TRP on movement after receiving the switching instruction. This eliminates the need for the CU to notify the UE of information on from which one of the source beam/TRP on movement and the target beam/TRP on movement the RRC parameter is to be received.

Although the third embodiment describes, as an example, the base station device in which the CU and the DUs are separated, the third embodiment may be applied to a base station device in which the CU and the DUs are not separated. The base station device may be a base station device that does not share the RRC parameter between beams. With application of the third embodiment to the base station device, the CU may be read as the gNB. This enables notification of the RRC parameter from the gNB to the UE through the target beam in the mobility between beams in a cell, and increase in the number of UEs to be accommodated in the cell that is spatially separated by the beams. The gNB can promptly notify the UE of the parameter.

Similarly as the second embodiment, the third embodiment provides, for example, a communication system including: a communication terminal device; and a base station device that performs radio communication with the communication terminal device via a radio beam, wherein a cell configured by the base station device is spatially separated by a plurality of radio beams being served by the base station device, and the base station device changes a radio resource control (RRC) parameter to be applied to the communication terminal device from a first RRC parameter for a first radio beam to a second RRC parameter for a second radio beam when the communication terminal device moves from a range of the first radio beam to a range of the second radio beam. The plurality of radio beams may be formed by a plurality of DUs (i.e., TRPs) as exemplified in FIG. 8, by one DU or by a base station device in which the CU and the DUs are integrated.

Under this structure, the RRC parameter to be applied to the communication terminal device is changed according to change in the radio beam to be applied to the communication terminal device. Thus, the number of the communication terminal devices to be accommodated can be increased as described above.

Here, the structure can be variously modified as described above. Particularly, the third embodiment provides, for example, a communication system wherein the base station device includes: at least one distributed unit (DU) that outputs the plurality of radio beams; and a central unit (CU) that controls the at least one DU, the CU has a medium access control (MAC) function, and the CU gives: a notification of the second RRC parameter to the communication terminal device via the second radio beam; and a notification of a switching instruction from the first radio beam to the second radio beam to the communication terminal device via the first radio beam. Alternatively, provided is a communication system wherein the base station device has a function of outputting a plurality of radio beams and a MAC function, and the base station device gives: a notification of the second RRC parameter to the communication terminal device via the second radio beam; and a notification of a switching instruction from the first radio beam to the second radio beam to the communication terminal device via the first radio beam.

The various modifications are provided as described in the first to third modifications below.

The First Modification of the Third Embodiment

Although the third embodiment mainly describes the notification of the RRC parameter on the SR, the third embodiment may be applied to the RRC parameters on the Ack/Nack repetitions.

The RRC parameters on the Ack/Nack repetitions may be the same as those in the first modification of the second embodiment.

The first modification may be identical to the third embodiment in terms of the method and details in which the CU notifies the UE of the switching through a source beam/TRP on movement. The method for notifying the RRC parameter described in the third embodiment may be applied to the method in which the CU notifies the UE of the RRC parameter on the Ack/Nack repetitions through the target beam/TRP on movement. Consequently, the UE can smoothly obtain the RRC parameter after switching the communication destination beam/TRP.

The CU may notify the UE of the parameter necessary for beam sweeping, similarly as the third embodiment. The method for notifying the parameter may be the same as that in the third embodiment. Consequently, the UE can easily receive a beam sweeping signal in the mobility between beams/TRPs.

The CU may notify the UE of the parameter necessary for beam sweeping with the L1/L2 signaling or the MAC signaling. This can produce the same advantages as those according to the third embodiment.

Similarly as the third embodiment, the CU need not notify, as the RRC parameter on the Ack/Nack repetitions, a parameter using the same value as that of the target beam/TRP on movement. Consequently, the amount of signaling for notifying the parameter can be reduced.

The CU and the UE may initialize the RRC parameter on the Ack/Nack repetitions or hold the value when the beam/TRP of the UE is switched, similarly as the third embodiment. Whether the parameter value when the beam/TRP of the UE is switched is initialized or held may be defined in a standard or notified from the CU to the UE in advance. Alternatively, information on whether the value is initialized or held may be notified from the CU to the UE together with a switching instruction. This can produce the same advantages as those according to the third embodiment.

The CU may notify the UE of the RRC parameter on the Ack/Nack repetitions with the L1/L2 signaling. Consequently, the parameter can be promptly notified to the UE.

Alternatively, the CU may notify the RRC parameter on the Ack/Nack repetitions with the MAC signaling. Since this enables multi-level modulations, the parameter can be notified with less number of symbols. With the HARQ retransmission control, the reliability of notifying the parameter is increased.

The CU may notify the UE of the switching with the L1/L2 signaling or the MAC signaling, similarly as the third embodiment. This can produce the same advantages as those according to the third embodiment.

The parameter on the SR in Step ST2003 of FIG. 10 may be replaced with a parameter on the Ack/Nack repetitions in an example sequence for the notification of the RRC parameter on the Ack/Nack repetitions and the switching instruction.

The CU may transmit a notification of the parameter on the Ack/Nack repetitions to the UE a plurality of number of times or increase the transmission power, similarly as the third embodiment. Consequently, the reliability of notifying the Ack/Nack repetitions can be increased. The same holds true for the switching instruction from the CU to the UE.

The UE may notify the target beam/TRP on movement of Ack/Nack in response to the downlink user data that has been received from the CU through the source beam/TRP on movement. The UE may notify the target beam/TRP on movement of Ack/Nack when the beam/TRP is switched between the downlink user data and the Ack/Nack. This allows the CU and the UE to smoothly process the downlink user data in switching the beam/TRP.

The UE may notify the target beam/TRP on movement of Ack/Nack after receiving a parameter notification on the Ack/Nack repetitions from the CU. Consequently, since the CU can receive Ack/Nack from the second time onward that is set by the Ack/Nack repetitions, the reliability of notifying Ack/Nack from the UE to the CU can be increased.

In the Ack/Nack repetitions from the UE to the CU, the CU may use only the Ack/Nack received by the source beam/TRP on movement. Ack/Nack may be used when the beam/TRP is switched during the Ack/Nack repetitions from the UE to the CU. This allows the CU to smoothly perform the process of receiving Ack/Nack in switching the beam/TRP during the Ack/Nack repetitions.

Alternatively, the CU may enable the Acks/Nacks received from both of the source beam/TRP on movement and the target beam/TRP on movement in the Ack/Nack repetitions from the UE to the CU. The UE may transmit the Ack/Nack repetitions to the target beam/TRP on movement after receiving the RRC parameter on the Ack/Nack repetitions. Consequently, the reliability of notifying the Ack/Nack from the UE to the CU can be increased.

Whether the CU uses the Ack/Nack received by the target beam/TRP on movement may be predefined in a standard, or appropriately switched by the CU. Thus, Ack/Nack can be efficiently received by, for example, flexibly switching Ack/Nack depending on the propagation environment.

The CU may notify the UE of whether to use the Ack/Nack received by the target beam/TRP on movement. The notification may be sent with the RRC signaling or together with a switching notification from the CU to the UE. Thus, since the UE need not transmit the Ack/Nack repetitions after switching the beam/TRP when the CU uses only the source beam/TRP on movement, the amount of signaling can be reduced.

The CU may retransmit the downlink user data to the UE through the target beam/TRP on movement with the Ack/Nack repetitions transmitted from the UE to the source beam/TRP on movement. The retransmission may be performed when the beam/TRP is switched between the Ack/Nack repetitions from the UE to the CU and the retransmission of the downlink user data from the CU to the UE. This allows the CU and the UE to smoothly perform the process of retransmitting the downlink user data in switching the beam/TRP.

Application of the first modification can produce the same advantages as those according to the third embodiment, in the notification of the RRC parameter on the Ack/Nack repetitions to the UE.

The Second Modification of the Third Embodiment

Although the third embodiment mainly describes the notification of the RRC parameter on the SR, the third embodiment may be applied to the RRC parameters on the SRS.

The RRC parameters on the SRS may be the same as those in the second modification of the second embodiment.

The second modification may be identical to the third embodiment in terms of the method and details in which the CU notifies the UE of the switching through a source beam/TRP on movement. The method for notifying the RRC parameter described in the third embodiment may be applied to the method in which the CU notifies the UE of the RRC parameter on the SRS through the target beam/TRP on movement. Consequently, the UE can smoothly obtain the RRC parameter after switching the communication destination beam/TRP.

The CU may notify the UE of the parameter necessary for beam sweeping, similarly as the third embodiment. Consequently, the UE can easily receive a beam sweeping signal in the mobility between beams/TRPs.

In the previous description, the CU may notify the UE of the parameter necessary for beam sweeping with the L1/L2 signaling or the MAC signaling. This can produce the same advantages as those according to the third embodiment.

Similarly as the third embodiment, the CU need not notify, as the RRC parameter on the SRS, a parameter using the same value as that of the target beam/TRP on movement. Consequently, the amount of signaling for notifying the parameter can be reduced.

The CU and the UE may initialize the RRC parameter on the SRS or hold the value when the beam/TRP of the UE is switched, similarly as the third embodiment. Whether the parameter value when the beam/TRP of the UE is switched is initialized or held may be defined in a standard or notified from the CU to the UE in advance. Alternatively, information on whether the value is initialized or held may be notified from the CU to the UE together with a switching instruction. This can produce the same advantages as those according to the third embodiment.

The CU may notify the UE of the RRC parameter on the SRS with the L1/L2 signaling. Consequently, the parameter can be promptly notified to the UE.

Alternatively, the CU may notify the RRC parameter on the SRS with the MAC signaling. Since this enables multi-level modulations, the parameter can be notified with less number of symbols. With the HARQ retransmission control, the reliability of notifying the parameter is increased.

The CU may notify the UE of the switching with the L1/L2 signaling or the MAC signaling, similarly as the third embodiment. This can produce the same advantages as those according to the third embodiment.

The parameter on the SR in Step ST2003 of FIG. 10 may be replaced with the parameter on the SRS in an example sequence for the notification of the RRC parameter on the SRS and the switching instruction.

The CU may transmit a notification of the parameter on the SRS to the UE a plurality of number of times or increase the transmission power, similarly as the third embodiment. Thus, the reliability of notifying the parameter on the SRS can be increased. The same holds true for the switching instruction from the CU to the UE.

The UE may transmit the SRS to the target beam/TRP on movement after receiving the parameter on the SRS to be transmitted from the CU through the target beam/TRP on movement. This can reduce transmission of the SRS that cannot be received by the target beam/TRP on movement before the UE receives the parameter on the SRS.

The UE may enable a request for transmitting the SRS from the CU. The request has been received from the source beam/TRP on movement. The operation of enabling the request for transmitting the SRS from the CU may be performed when the beam/TRP is switched between the request for transmitting the SRS and transmission of the SRS. This allows the CU and the UE to smoothly process the downlink user data in switching the beam/TRP.

Alternatively, the UE may disable the request for transmitting the SRS. The CU may retransmit the request for transmitting the SRS to the UE through the target beam/TRP on movement. Consequently, the CU can perform scheduling appropriate for a propagation state after switching the beam/TRP.

The CU may disable the SRS received by the source beam/TRP on movement when the UE transmits the SRS to the CU. The disabling operation may be performed when the beam/TRP is switched after the UE transmits the SRS to the CU. The CU may notify the UE of the request for transmitting the SRS through the target beam/TRP on movement. The notification may be used in an aperiodic SRS. Consequently, the CU can communicate with the UE at an uplink communication rate that accurately reflects switching of the beam/TRP.

Application of the second modification can produce the same advantages as those according to the third embodiment, in the notification of the RRC parameter on the SRS to the UE.

The Third Modification of the Third Embodiment

Although the third embodiment mainly describes the notification of the RRC parameter on the SR, the third embodiment may be applied to the RRC parameters on the CQI/CSI.

The RRC parameters on the CQI/CSI may be the same as those in the third modification of the second embodiment.

The third modification may be identical to the third embodiment in terms of the method and details in which the CU notifies the UE of the switching through a source beam/TRP on movement. The method for notifying the RRC parameter described in the third embodiment may be applied to the method in which the CU notifies the UE of the RRC parameter on the CQI/CSI through the target beam/TRP on movement. Consequently, the UE can smoothly obtain the RRC parameter after switching the communication destination beam/TRP.

The CU may notify the UE of the parameter necessary for beam sweeping, similarly as the third embodiment. Consequently, the UE can easily receive a beam sweeping signal in the mobility between beams/TRPs.

The CU may notify the UE of the parameter necessary for beam sweeping with the L1/L2 signaling or the MAC signaling. This can produce the same advantages as those according to the third embodiment.

Similarly as the third embodiment, the CU need not notify, as the RRC parameter on the CQI/CSI, a parameter using the same value as that of the target beam/TRP on movement. Consequently, the amount of signaling for notifying the parameter can be reduced.

The CU and the UE may initialize the RRC parameter on the CQI/CSI or hold the value when the beam/TRP of the UE is switched, similarly as the third embodiment. Whether the parameter value when the beam/TRP of the UE is switched is initialized or held may be defined in a standard or notified from the CU to the UE in advance. Alternatively, information on whether the value is initialized or held may be notified from the CU to the UE together with a switching instruction. This can produce the same advantages as those according to the third embodiment.

The CU may notify the UE of the RRC parameter on the CQI/CSI with the L1/L2 signaling. Consequently, the parameter can be promptly notified to the UE.

Alternatively, the CU may notify the RRC parameter on the CQI/CSI with the MAC signaling. Since this enables multi-level modulations, the parameter can be notified with less number of symbols. With the HARQ retransmission control, the reliability of notifying the parameter is increased.

The CU may notify the UE of the switching with the L1/L2 signaling or the MAC signaling, similarly as the third embodiment. This can produce the same advantages as those according to the third embodiment.

The parameter on the SR in Step ST2003 of FIG. 10 may be replaced with the parameter on the CQI/CSI in an example sequence for the notification of the RRC parameter on the CQI/CSI and the switching instruction.

The CU may transmit a notification of the parameter on the CQI/CSI to the UE a plurality of number of times or increase the transmission power, similarly as the third embodiment. Consequently, the reliability of notifying the parameter on the CQI/CSI can be increased. The same holds true for the switching instruction from the CU to the UE.

The UE may transmit the CQI/CSI to the target beam/TRP on movement after receiving the parameter on the CQI/CSI to be transmitted from the CU through the target beam/TRP on movement. This can reduce transmission of the CQI/CSI that cannot be received by the target beam/TRP on movement, before the UE receives the parameter on the CQI/CSI.

The UE may enable a request for transmitting the CQI/CSI from the CU. The request has been received from the source beam/TRP on movement. The operation of enabling the request for transmitting the CQI/CSI from the CU may be performed when the beam/TRP is switched between the request for transmitting the CQI/CSI and transmission of the CQI/CSI. This allows the CU and the UE to smoothly process the downlink user data in switching the beam/TRP.

Alternatively, the UE may disable the request for transmitting the CQI/CSI. The CU may retransmit the request for transmitting the CQI/CSI to the UE through the target beam/TRP on movement. Consequently, the CU can perform scheduling appropriate for a propagation state after switching the beam/TRP.

The CU may disable the CQI/CSI received by the source beam/TRP on movement when the UE transmits the CQI/CSI to the CU. The disabling operation may be performed when the beam/TRP is switched after the UE transmits the CQI/CSI to the CU. The CU may notify the UE of the request for transmitting the CQI/CSI through the target beam/TRP on movement. The notification may be used in an aperiodic CQI/CSI. Consequently, the CU can communicate with the UE at a downlink communication rate that accurately reflects switching of the beam/TRP.

Application of the third modification can produce the same advantages as those according to the third embodiment, in the notification of the RRC parameter on the CQI/CSI to the UE.

The Fourth Embodiment

Unlike the second embodiment, for example, when the CU has PDCP and the DU has RLC, MAC, and PHY or when the CU has PDCP and H-RLC and the DU has L-RLC, MAC, and PHY, the RRC parameter can be notified with the RRC signaling in the mobility between beams or TRPs in a cell.

Application of the beamforming under the NR causes frequent mobility between beams/TRPs in a cell. This creates problems with frequent RRC signaling, and decrease in communication efficiency.

The fourth embodiment discloses a method for solving such problems.

Similarly as the second embodiment, the CU notifies, in advance, the UE of the RRC parameter to be used in beams or TRPs (hereinafter may be referred to as beams/TRPs) in a cell. The CU may give the notification with the RRC signaling. The CU notifies the UE of an instruction for switching a beam/TRP in switching the beam/TRP. The switching instruction may include an identifier representing a target beam/TRP on movement. The CU may notify the UE of the switching instruction with the L1/L2 signaling or the MAC signaling. Consequently, the CU can change a parameter according to the switching of the beam/TRP with less amount of signaling.

Similarly as the second embodiment, the RRC parameter included in the notification may be a parameter of a neighboring beam/TRP where the UE is present. The neighboring beam/TRP may include beams/TRPs adjacent to the beam/TRP where the UE is present. The RRC parameter included in the notification may be solely a parameter different from the parameter used in the beam/TRP where the UE is present. Consequently, the size of the notification can be reduced.

Another method is disclosed. The CU notifies, though the source beam/TRP on movement, the UE of the RRC parameter to be used in the target beam/TRP on movement in switching the beam or the TRP. An interface between the CU and the DU may be used for a notification between the CU and the source beam/TRP on movement. The notification between the UE and the source beam/TRP on movement may be made with the L1/L2 signaling and the MAC signaling.

The notification to the UE with the L1/L2 signaling can prompt a notification of the parameter to the UE. Since application of the MAC signaling enables multi-level modulations, the parameter can be notified with less number of symbols. With the HARQ retransmission control, the reliability of notifying the parameter is increased.

The CU may notify the UE of the RRC parameter and the switching instruction together. Consequently, the amount of signaling in switching the beam/TRP can be reduced.

Alternatively, the CU may notify the UE of the switching instruction after notifying the RRC parameter. Thereby, the CU may notify the UE of the switching instruction after verifying delivery of the RRC parameter. Thus, it is possible, for example, to avoid execution of the random access caused by the SR undelivered from the UE and an excessive number of times the SR is retransmitted from the UE due to the undelivered RRC parameter on the SR.

Alternatively, the CU may notify the UE of the RRC parameter after notifying the switching instruction. Here, the CU should notify the UE of the switching timing together with the switching instruction. Even when it takes time for the UE to perform a process of switching the communication destination beam/TRP, the smooth switching is possible.

The source TRP may notify the CU of information indicating that delivery of the parameter has been verified. The information may be notified when the parameter is notified with the MAC signaling. The CU may notify the UE of the switching instruction with the information. Since this can prevent notification of the switching instruction when the parameter is undelivered, for example, it is possible to avoid execution of the random access caused by the SR undelivered from the UE and an excessive number of times the SR is retransmitted from the UE.

The RRC parameter may be the one described in 6.3.2 of Non-Patent Document 12, similarly as the first embodiment. The RRC parameter may relate to, for example, the SR, the Ack/Nack repetitions, the Sounding Reference Signal (SRS), or the CQI/CSI.

The CU may notify the UE of the parameter necessary for beam sweeping, similarly as the second embodiment. The parameter necessary for beam sweeping may be the one described in the first embodiment. The notification may be made through the source beam/TRP on movement. The parameter necessary for beam sweeping may be a parameter in the target beam/TRP on movement. Consequently, the UE can easily receive a beam sweeping signal in the mobility between beams/TRPs.

The CU notifies the UE of an instruction for switching the beam/TRP (hereinafter may be simply referred to as "switching instruction") through the source beam/TRP on movement, similarly as the second embodiment. The switching instruction may or need not include an identifier representing the target beam/TRP on movement. The switching instruction may include information indicating the timing to switch the beam/TRP.

The CU may notify the UE of the switching instruction with the L1/L2 signaling or the MAC signaling. The L1/L2 signaling enables prompt notification of the switching instruction to the UE. Since application of the MAC signaling enables multi-level modulations, the switching instruction can be notified with less number of symbols. With the HARQ retransmission control, the reliability of notifying the switching instruction is increased.

The source TRP may notify the CU of information indicating that delivery of the switching instruction has been verified. The information may be notified when the switching instruction is notified with the MAC signaling. The CU may switch the beam/TRP with the information. Since switching of the beam/TRP when the switching instruction is undelivered can be prevented, the UE can avoid the RLF caused by the link loss with the gNB.

The RRC parameters on the SR may be (1) to (3) disclosed in the second embodiment. The CU may or need not notify the UE of the parameter indicating the maximum number of times the SR is retransmitted as the RRC parameter on the SR. This can produce the same advantages as those according to the second embodiment.

The CU may notify the UE of a plurality of parameters among the RRC parameters simultaneously, similarly as the second embodiment. Consequently, the amount of signaling required for the notification can be reduced.

The CU may notify the UE of the RRC parameters separately, similarly as the second embodiment. Consequently, the parameters can be notified with less transmission resources.

The CU may notify the target beam/TRP on movement of the RRC parameter. Similarly as the first embodiment, the notification may be made using, for example, an area of a control word of the CPRI, the ASN.1 format, or another format. This enables, for example, the target beam/TRP on movement to promptly decode the uplink user data from the UE immediately after switching to the beam/TRP, in addition to the same advantages as those according to the first embodiment.

Similarly as the second embodiment, the CU need not notify, as the RRC parameter, a parameter using the same value as that of the target beam/TRP on movement. Consequently, the amount of signaling for notifying the parameter can be reduced.

Similarly as the second embodiment, the CU may include, in a notification of the RRC parameter to the UE, an identifier indicating switching of a parameter due to the switching of the TRP/beam. The UE may hold the RRC parameter before change. Consequently, the UE can, for example, prevent the SR from being undelivered to the source TRP/beam on movement due to change in the parameter, in transmitting the SR before switching the TRP/beam.

The CU and the UE may initialize the RRC parameter or hold the value when the beam/TRP is switched. The initial value of the RRC parameter may be defined in a standard or notified from the CU to the UE in advance with the RRC signaling. Whether the parameter value when the beam/TRP of the UE is switched is initialized or held may be defined in a standard or notified from the CU to the UE in advance. Alternatively, information on whether the value is initialized or held may be notified from the CU to the UE together with a switching instruction. Consequently, even upon failure in notification of the parameter from the source beam/TRP on movement to the UE, the UE can use the RRC parameter before change. Thus when, for example, the RRC parameter identical to that of the source beam/TRP on movement is used in the target beam/TRP on movement, the UE can prevent the SR from being undelivered to the target beam/TRP on movement.

The CU may or need not switch the beam/TRP upon excess of the number of times the HARQ is retransmitted in response to the switching instruction from the source beam/TRP on movement to the UE, similarly as the second embodiment. Each of the cases can produce the same advantages as those according to the second embodiment.

FIG. 11 is a sequence diagram illustrating switching of the beam/TRP when the CU notifies the parameter on the SR through the source beam/TRP on movement. FIG. 11 illustrates an example of notifying the parameter on the SR and the switching instruction from the CU to the UE with the MAC signaling. In FIG. 11, "S-beam/TRP" denotes the source beam/TRP on movement being served by the CU, and "T-beam/TRP" denotes the target beam/TRP on movement being served by the CU. The black circles on the arrows in FIG. 11 represent beams/TRPs to be used for communication. The same step numbers are assigned to the same Steps as those in FIG. 9, and the common description thereof is omitted.

In Step ST3001 of FIG. 11, the CU notifies the S-beam/TRP of a SR parameter to be notified to the UE. The interface between the CU and the DU may be used for notifying the parameter. In Step ST3002, the S-beam/TRP notifies the UE of the parameter. The S-beam/TRP notifies the UE of the parameter with the MAC signaling. The L1/L2 signaling may be used. In Step ST3003, the UE notifies the S-beam/TRP of Ack in response to the notification of the SR parameter. The Ack may be notified using an uplink control signal.

In Step ST3004 of FIG. 11, the CU notifies the S-beam/TRP of a switching instruction to be notified to the UE. The interface between the CU and the DU may be used for notifying the switching instruction. In Step ST3005, the S-beam/TRP notifies the UE of the switching instruction. The S-beam/TRP notifies the UE of the switching instruction with the MAC signaling. The L1/L2 signaling may be used. In Step ST3006, the UE notifies the S-beam/TRP of Ack in response to the switching instruction. When the reception result from the UE is Nack, the CU may retransmit the switching instruction through the S-beam/TRP.

The UE may transmit an uplink signal to the source beam/TRP on movement, similarly as the second embodiment. The uplink signal may be a response to the L1/L2 signaling with which the CU notifies the parameter. The uplink signal may be a response to the L1/L2 signaling with which the CU issues the switching instruction. An L1/L2 signaling for response may be newly provided as the uplink signal. New uplink control information (UCI) may be provided as the response. This enables the CU to verify delivery to the UE even when the L1/L2 signaling is used for notifying the parameter from the CU or issuing the switching instruction. Thus, the reliability of the L1/L2 signaling can be increased.

The new UCI may be the same as that in the second embodiment. This can produce the same advantages as those according to the second embodiment.

The source beam/TRP on movement may notify the CU of information indicating reception of the L1/L2 signaling for response. Consequently, the CU can understand that the UE has accurately received notification of the parameter or the switching instruction. This allows smooth switching of the beam/TRP.

In response to the notification of the RRC parameter from the CU to the UE with the MAC signaling, the source beam/TRP on movement may notify the CU of information indicating reception of Ack. The CU may switch, with the notified information, the beam/TRP to be used. Consequently, since the CU can understand that the UE has accurately received notification of the RRC parameter, the beam/TRP can be smoothly switched.

In response to the notification of the switching instruction from the CU to the UE with the MAC signaling, the source beam/TRP on movement may notify the CU of information indicating reception of Ack. The CU may switch, with the notified information, the beam/TRP to be used. Since the CU can understand that the UE has accurately received the switching instruction, the beam/TRP can be smoothly switched.

The UE may transmit an uplink signal to the target beam/TRP on movement, similarly as the second embodiment. The uplink signal may be a signal for verifying the switching of the beam/TRP in the UE. The signal for verification may be transmitted with frequency resources for the SR. Alternatively, the SR may be transmitted as the signal for verification. This enables the CU to verify delivery to the UE even when the L1/L2 signaling is used for issuing the switching instruction from the CU. Thus, the reliability of the L1/L2 signaling can be increased.

The UE may transmit the SR with the minimum period. Thus, it is possible to verify with lower latency that the UE has switched the communication destination beam/TRP.

The CU may reserve the common resources for the SR for common use among UEs within range of the same beam/TRP. The UE may transmit the SR with the common resources for the SR. The common resources for the SR may be resources allowing a contention among the UEs (contention-based). The position of the common resources for the SR may be predefined in a standard, or notified from the CU to the UEs being served thereby. This notification may be a broadcast or a UE-dedicated notification. The UE-dedicated notification may be the RRC-dedicated signaling. Consequently, the UE can notify the CU that the beam/TRP has been switched even when failing to receive the RRC parameter.

The UE may determine the position of the common resources for the SR as an initial value of the RRC parameter on the SR in switching the communication destination beam/TRP, similarly as the second embodiment. Consequently, the UE can notify the CU that the beam/TRP has been switched even when failing to receive the RRC parameter.

The UE may transmit the SRS to the target beam/TRP on movement. The SRS may be aperiodic or periodic. The UE may transmit the SRS to the target beam/TRP on movement a predetermined number of times. The number of transmission times may be defined in a standard or notified from the CU to the UE in advance. The RRC signaling may be used for the notification. Consequently, the UE can notify the CU that the communication destination beam/TRP has been switched even without any uplink user data to be transmitted to the CU.

The CU may determine, using the SR, whether the UE has switched the communication destination beam/TRP, similarly as the second embodiment. The CU may determine that the UE has not switched the communication destination beam/TRP, for example, when there is no notification of the SR from the UE. The CU may notify the parameter and the switching instruction again from the source beam/TRP on movement. This re-notification may be made using a result of the determination. Consequently, for example, it is possible to prevent the RLF or the random access occurring when the UE fails to receive the parameter on the SR or the switching instruction. Consequently, the time to switch the beam/TRP can be shortened.

The CU may notify the UE of the parameter a plurality of number of times, similarly as the second embodiment. Alternatively, the CU may increase the transmission power for notifying the parameter to the UE. Thus, the reliability of notifying the parameter can be increased. The number of times the parameter is notified may be defined in a standard or notified from the CU to the UE in advance. The RRC signaling may be used for the notification.

Similarly as the second embodiment, similarly as the notification of the parameter, notification of the switching instruction to the UE may be transmitted a plurality of number of times or the power for transmission may be increased. Thus, the reliability of notifying the switching instruction can be increased.

The UE may switch the communication destination beam/TRP using the notification of the parameter received from the CU, similarly as the second embodiment. Switching of the beam may involve the beam sweeping and the random access. The beam may be switched upon receipt of one or more parameters. The beam may be switched after a lapse of a predetermined time since the UE receives the one or more parameters. The predetermined time may be defined in a standard or notified from the CU to the UE in advance. The RRC signaling may be used for the notification. This enables the UE to switch the communication target beam even when the UE cannot accurately receive the switching instruction from the CU to the UE. This also eliminates the time required to retransmit the switching notification from the CU to the UE.

For transmission of the SR from the UE, the CU may disable the SR received by the source beam/TRP on movement. The CU may disable the SR when the beam/TRP is switched between reception of the SR and transmission of the uplink scheduling grant. The UE may retransmit the SR to the target beam/TRP on movement. This can prevent the SR retransmitted from the UE from being undelivered to the CU.

Alternatively, in switching the beam/TRP after transmission of the SR from the UE, the CU may enable the SR received by the source beam/TRP on movement. The source beam/TRP on movement may transfer the SR to the target beam/TRP on movement. The SR may be transferred via the CU. Information indicating reception of the SR may be used instead of the SR. Consequently, even when the beam/TRP is switched between reception of the SR and transmission of the uplink scheduling grant, the UE can smoothly perform a series of procedures including transmission of the SR, reception of the uplink scheduling grant, and transmission of the uplink user data.

In the uplink scheduling grant notification from the CU to the UE, the CU and the UE may disable the uplink scheduling grant transmitted from the source beam/TRP on movement. The CU and the UE may disable the uplink scheduling grant when switching of the beam/TRP occurs between the uplink scheduling grant and the uplink user data. The target beam/TRP on movement may retransmit the uplink scheduling grant to the UE. For retransmitting the uplink scheduling grant, the source beam/TRP on movement may request the target beam/TRP on movement to retransmit the uplink scheduling grant to the UE. Alternatively, the UE may start again from transmission of the SR to the target beam/TRP on movement. Whether the UE starts again from transmission of the SR may be defined in a standard. Alternatively, the CU may notify the UE of whether the UE starts again. This notification may be made in advance with the RRC signaling, the MAC signaling, or the L1/L2 signaling. This notification may be made together with the switching notification in the example with the MAC signaling or the L1/L2 signaling. Consequently, the UE can receive the uplink scheduling grant according to a use status of the uplink resources in the target beam/TRP on movement for transmitting the uplink user data.

Alternatively, in switching of the beam/TRP after the uplink scheduling grant notification from the source beam/TRP on movement to the UE, the CU and the UE may enable the uplink scheduling grant transmitted from the source beam/TRP on movement. The source beam/TRP on movement may notify the target beam/TRP on movement of information on the uplink scheduling grant. The UE may transmit the uplink user data to the target beam/TRP on movement with the uplink scheduling grant. Consequently, the amount of signaling between the CU and the UE can be reduced.

Whether the uplink scheduling grant is enabled may be defined in a standard or notified from the CU to the UE. The notification from the gNB to the UE may be made in advance with the RRC signaling, the MAC signaling, or the L1/L2 signaling. The uplink scheduling grant may be enabled, for example, when the target beam/TRP on movement can use the uplink resources indicated by the scheduling grant for the UE. The source beam/TRP on movement may notify the target beam/TRP on movement of information on the uplink scheduling grant. Consequently, since the target beam/TRP on movement can determine whether to enable or disable the uplink scheduling grant, the flexible scheduling becomes possible.

This notification may be made together with the switching notification in the example with the MAC signaling or the L1/L2 signaling. Consequently, the CU can perform, with less signaling, scheduling according to a use status of the uplink resources in the target beam/TRP on movement.

For transmission of the uplink user data from the UE to the CU, the target beam/TRP on movement may transmit to the UE Ack/Nack in response to the uplink user data received by the source beam/TRP on movement from the UE. The target beam/TRP on movement may transmit the Ack/Nack to the UE when the beam/TRP is switched between transmission of the uplink user data from the UE and notification of the Ack/Nack in response to the uplink user data. The source beam/TRP on movement may notify the target beam/TRP on movement of information indicating Ack/Nack in response to the uplink user data. This allows smooth switching of the beam/TRP after transmission of the uplink user data.

The source beam/TRP on movement may notify the target beam/TRP on movement of information on a result of decoding the uplink user data received from the UE. This information may be, for example, a soft-decision value of the uplink user data. Consequently, the target beam/TRP on movement can combine an initial reception result and a retransmission reception result of the uplink user data and decode the resulting data. The probability of a reception error can be lowered.

The fourth embodiment can produce the same advantages as those according to the second embodiment even when the CU has PDCP and the DU has RLC, MAC, and PHY or when the CU has PDCP and H-RLC and the DU has L-RLC, MAC, and PHY. Furthermore, the amount of signaling between the beams/TRPs can be reduced.

Although the fourth embodiment describes, as an example, the base station device in which the CU and the DUs are separated, the fourth embodiment may be applied to a base station device in which the CU and the DUs are not separated. The base station device may be a base station device that does not share the RRC parameter between beams. The base station device may be, for example, a base station device that performs different HARQ scheduling for each beam, a base station device having a different RLC layer for each beam, or a base station device with combination of both of them. With application of the fourth embodiment to the base station device, the CU may be read as the gNB. This enables notification of the RRC parameter from the gNB to the UE through the source beam in the mobility between beams in a cell, and increase in the number of UEs to be accommodated in the cell that is spatially separated by the beams. The gNB can promptly notify the UE of the parameter.

Although the fourth embodiment describes, as an example, the base station device which notifies the UE of the RRC parameter using the source beam/TRP on movement, the RRC parameter may be notified from another beam/TRP. The other beam/TRP may be, for example, a beam/TRP for transmitting control information. Consequently, for example, the RRC parameter can be notified with less amount of signaling in a base station device with beams/TRPs for transmitting and receiving the user data and for transmitting and receiving the control information. Consequently, the RRC parameter can be promptly notified in the mobility between the beams.

Similarly as the second embodiment, the fourth embodiment provides, for example, a communication system including: a communication terminal device; and a base station device that performs radio communication with the communication terminal device via a radio beam, wherein a cell configured by the base station device is spatially separated by a plurality of radio beams being served by the base station device, and the base station device changes a radio resource control (RRC) parameter to be applied to the communication terminal device from a first RRC parameter for a first radio beam to a second RRC parameter for a second radio beam when the communication terminal device moves from a range of the first radio beam to a range of the second radio beam. The plurality of radio beams may be formed by a plurality of DUs (i.e., TRPs) as exemplified in FIG. 8, by one DU, or by a base station device in which the CU and the DUs are integrated.

Under this structure, the RRC parameter to be applied to the communication terminal device is changed according to change in the radio beam to be applied to the communication terminal device. Thus, the number of the communication terminal devices to be accommodated can be increased as described above.

Here, the structure can be variously modified as described above. Particularly, the fourth embodiment provides, for example, a communication system wherein the base station device includes: at least one distributed unit (DU) that outputs the plurality of radio beams; and a central unit (CU) that controls the at least one DU, the at least one DU has a medium access control (MAC) function, and the CU gives: a notification of the second RRC parameter to the communication terminal device via the first radio beam with an L1/L2 signaling or a MAC signaling; and a notification of a switching instruction from the first radio beam to the second radio beam to the communication terminal device via the first radio beam with the L1/L2 signaling or the MAC signaling. The DU may have a radio link control (RLC) function. As an alternative example, provided is a communication system wherein the base station device has a function of outputting a plurality of radio beams and a MAC function, and the base station device gives: a notification of the second RRC parameter to the communication terminal device; and a notification of a switching instruction from the first radio beam to the second radio beam to the communication terminal device via the first radio beam.

The various modifications are provided as described in the first to fourth modifications below.

The First Modification of the Fourth Embodiment

Although the fourth embodiment mainly describes the notification of the RRC parameter on the SR, the fourth embodiment may be applied to the RRC parameters on the Ack/Nack repetitions.

The RRC parameters on the Ack/Nack repetitions may be the same as those in the first modification of the second embodiment.

The first modification may be identical to the fourth embodiment in terms of the method and details in which the CU notifies the UE of the switching through a source beam/TRP on movement. The method for notifying the RRC parameter described in the fourth embodiment may be applied to the method in which the CU notifies the UE of the RRC parameter on the Ack/Nack repetitions through the source beam/TRP on movement. This can produce the same advantages as those according to the fourth embodiment.

The CU may notify the UE of the parameter necessary for beam sweeping, similarly as the fourth embodiment. The method for notifying the parameter may be the same as that in the fourth embodiment. Consequently, the UE can easily receive a beam sweeping signal in the mobility between beams/TRPs.

The CU may notify the UE of the parameter necessary for beam sweeping with the L1/L2 signaling or the MAC signaling. This can produce the same advantages as those according to the fourth embodiment.

Similarly as the fourth embodiment, the CU may include an identifier indicating switching of a parameter due to the switching of the TRP/beam in a notification of the RRC parameter on the Ack/Nack repetitions to the UE. The UE may hold the RRC parameter on the Ack/Nack repetitions before change. Consequently, the UE can prevent the reliability of transmitting Ack/Nack to the source TRP/beam on movement from being reduced due to change in the parameter, in transmitting Ack/Nack before switching the TRP/beam.

Similarly as the fourth embodiment, the CU need not notify, as the RRC parameter on the Ack/Nack repetitions, a parameter using the same value as that of the target beam/TRP on movement. Consequently, the amount of signaling for notifying the parameter can be reduced.

The CU and the UE may initialize the RRC parameter on the Ack/Nack repetitions or hold the value when the beam/TRP of the UE is switched, similarly as the fourth embodiment. The initial value of the RRC parameter may be defined in a standard or notified from the CU to the UE in advance with the RRC signaling. Whether the parameter value when the beam/TRP of the UE is switched is initialized or held may be defined in a standard or notified from the CU to the UE in advance. Alternatively, information on whether the value is initialized or held may be notified from the CU to the UE together with a switching instruction. This can produce the same advantages as those according to the fourth embodiment.

The CU may notify the UE of the RRC parameter on the Ack/Nack repetitions and the switching instruction together, similarly as the fourth embodiment. Consequently, the amount of signaling in switching the beam/TRP can be reduced.

Alternatively, the CU may notify the UE of the switching instruction after notifying the RRC parameter on the Ack/Nack repetitions. This can avoid application of the parameter before change in the UE after switching the beam/TRP, avoid the repeated Ack/Nack from being undelivered from the UE, and avoid the undelivered repeated Ack/Nack from the UE from reducing the reliability of notifying the Ack/Nack.

Alternatively, the CU may notify the UE of the RRC parameter on the Ack/Nack repetitions after notifying the switching instruction. Here, the CU should notify the UE of the switching timing together with the switching instruction. Even when it takes time for the UE to perform a process of switching the communication destination beam/TRP, the smooth switching is possible.

The CU may notify the UE of the RRC parameter on the Ack/Nack repetitions with the L1/L2 signaling. Consequently, the parameter can be promptly notified to the UE.

Alternatively, the CU may notify the RRC parameter on the Ack/Nack repetitions with the MAC signaling. Since this enables multi-level modulations, the parameter can be notified with less number of symbols. With the HARQ retransmission control, the reliability of notifying the parameter is increased.

The source TRP may notify the CU of information indicating that delivery of the parameter has been verified, similarly as the fourth embodiment. The information may be notified when the parameter is notified with the MAC signaling. The CU may notify the UE of the switching instruction with the information. Thus, it is possible to avoid the repeated Ack/Nack from being undelivered from the UE due to the undelivered parameter, and to increase the reliability of transmitting Ack/Nack.

The CU may notify the UE of the switching with the L1/L2 signaling or the MAC signaling, similarly as the fourth embodiment. This can produce the same advantages as those according to the fourth embodiment.

The parameter on the SR in Steps ST3001 and ST3002 of FIG. 11 may be replaced with a parameter on the Ack/Nack repetitions in an example sequence for the notification of the RRC parameter on the Ack/Nack repetitions and the switching instruction.

The CU may transmit a notification of the parameter on the Ack/Nack repetitions to the UE a plurality of number of times or increase the transmission power, similarly as the fourth embodiment. Consequently, the reliability of notifying the parameter can be increased. The same holds true for the switching instruction from the CU to the UE.

The UE may notify neither the source TRP/beam on movement nor the target beam/TRP on movement of Ack/Nack in response to the downlink user data that has been received from the CU through the source TRP/beam on movement. The operation of the UE may be performed when the beam/TRP is switched between the downlink user data and Ack/Nack. The source beam/TRP on movement may transfer the downlink user data to the target beam/TRP on movement. The target beam/TRP on movement may transmit the downlink user data to the UE. This can prevent the downlink user data from missing due to switching of the beam/TRP.

As an alternative example, the UE may notify the target beam/TRP on movement of Ack/Nack in response to the downlink user data that has been received from the CU through the source TRP/beam on movement. The UE may notify the Ack/Nack when the beam/TRP is switched between the downlink user data and the Ack/Nack. The target beam/TRP on movement may notify the source TRP/beam on movement of a reception result of the Ack/Nack. This can reduce the amount of signaling on the downlink user data in switching of the beam/TRP.

The source beam/TRP on movement may transfer the downlink user data to the target beam/TRP on movement. The transfer may be performed upon receipt of a notification of Nack from the UE in response to the downlink user data. The target beam/TRP on movement may perform retransmission to the UE with the transferred downlink user data. This can smooth a process of retransmitting the downlink user data in switching of the beam/TRP.

The source beam/TRP on movement may determine Ack/Nack received from the UE using only a reception result of its own beam/TRP, or using the reception result in conjunction with a reception result of the target beam/TRP on movement. The target beam/TRP on movement may transfer a reception result of Ack/Nack from the UE to the source TRP/beam on movement. The operation may be performed when the beam/TRP is switched during the Ack/Nack repetitions from the UE to the source beam/TRP on movement. The operation of receiving the Ack/Nack repetitions from the UE can be promptly performed using only a reception result of the source beam/TRP on movement. The reliability of the Ack/Nack repetitions in the source beam/TRP on movement can be increased using the reception result in conjunction with the reception result of the target beam/TRP on movement. Whether the source beam/TRP on movement uses only the reception result of its own beam/TRP or uses the reception result in conjunction with the reception result of the target beam/TRP on movement may be defined in a standard or appropriately switched by the CU. Since the appropriate switching by the CU enables, for example, selection of an appropriate receiving operation according to a propagation state in the source beam/TRP on movement, it is possible to increase flexibility for the gNB to perform a process of receiving the Ack/Nack repetitions.

Instead of the source beam/TRP on movement, the target beam/TRP on movement may perform the process of receiving the Ack/Nack repetitions. The target beam/TRP on movement may use only the reception result of its own beam/TRP or use the reception result in conjunction with the reception result of the source beam/TRP on movement. The source beam/TRP on movement may transfer, to the target beam/TRP on movement, a reception result of Ack/Nack from the UE. This can produce the same advantages as those previously described. Whether the target beam/TRP on movement uses only the reception result of its own beam/TRP or uses the reception result in conjunction with the reception result of the source beam/TRP on movement may be defined in a standard or appropriately switched by the CU.

Whether the source beam/TRP on movement or the target beam/TRP on movement performs an operation of receiving Ack/Nack may be defined in a standard or determined in advance by the CU. This can prevent a malfunction caused by a variance in result of receiving Ack/Nack between the source beam/TRP on movement and the target beam/TRP on movement.

The target beam/TRP on movement may retransmit the downlink user data to the UE with the Ack/Nack repetitions transmitted from the UE to the source beam/TRP on movement. The retransmission may be performed when the beam/TRP is switched between the Ack/Nack repetitions from the UE to the source beam/TRP on movement and the retransmission of the downlink user data to the UE. The source beam/TRP on movement may transfer the retransmission data to the target beam/TRP on movement. This can smooth the process of retransmitting the downlink user data in switching the beam/TRP.

Application of the first modification can produce the same advantages as those according to the fourth embodiment, in the notification of the RRC parameter on the Ack/Nack repetitions to the UE.

The Second Modification of the Fourth Embodiment

Although the fourth embodiment mainly describes the notification of the RRC parameter on the SR, the fourth embodiment may be applied to the RRC parameters on the SRS.

The RRC parameters on the SRS may be the same as those in the second modification of the second embodiment.

The second modification may be identical to the fourth embodiment in terms of the method and details in which the CU notifies the UE of the switching through a source beam/TRP on movement. The method for notifying the RRC parameter described in the fourth embodiment may be applied to the method in which the CU notifies the UE of the RRC parameter on the SRS through the source beam/TRP on movement. This can produce the same advantages as those according to the fourth embodiment.

The CU may notify the UE of the parameter necessary for beam sweeping, similarly as the fourth embodiment. The method for notifying the parameter may be the same as that in the fourth embodiment. Consequently, the UE can easily receive a beam sweeping signal in the mobility between beams/TRPs.

The CU may notify the UE of the parameter necessary for beam sweeping with the L1/L2 signaling or the MAC signaling. This can produce the same advantages as those according to the fourth embodiment.

Similarly as the fourth embodiment, the CU may include, in a notification of the RRC parameter on the SRS to the UE, an identifier indicating switching of a parameter due to the switching of the TRP/beam. The UE may hold the RRC parameter on the SRS before change. Consequently, the UE can prevent the random access operation and decrease in the uplink communication rate that are caused by the undelivered SRS in transmitting the SRS before switching the TRP/beam.

Similarly as the fourth embodiment, the CU need not notify, as the RRC parameter on the SRS, a parameter using the same value as that of the target beam/TRP on movement. Consequently, the amount of signaling for notifying the parameter can be reduced.

The CU and the UE may initialize the RRC parameter on the SRS or hold the value when the beam/TRP of the UE is switched, similarly as the fourth embodiment. The initial value of the RRC parameter may be defined in a standard or notified from the CU to the UE in advance with the RRC signaling. Whether the parameter value when the beam/TRP of the UE is switched is initialized or held may be defined in a standard or notified from the CU to the UE in advance. Alternatively, information on whether the value is initialized or held may be notified from the CU to the UE together with a switching instruction. This can produce the same advantages as those according to the fourth embodiment.

The CU may notify the UE of the RRC parameter on the SRS and the switching instruction together, similarly as the fourth embodiment. Consequently, the amount of signaling in switching the beam/TRP can be reduced.

Alternatively, the CU may notify the UE of the switching instruction after notifying the RRC parameter on the SRS. This can avoid application of the RRC parameter on the SRS before change in the UE after switching the beam/TRP, avoid the SRS from being undelivered from the UE, and avoid the undelivered SRS from the UE from causing the random access operation and reducing the uplink communication rate.

Alternatively, the CU may notify the UE of the RRC parameter on the SRS after notifying the switching instruction. Here, the CU should notify the UE of the switching timing together with the switching instruction. Even when it takes time for the UE to perform a process of switching the communication destination beam/TRP, the smooth switching is possible.

The CU may notify the UE of the RRC parameter on the SRS with the L1/L2 signaling. Consequently, the parameter can be promptly notified to the UE.

Alternatively, the CU may notify the RRC parameter on the SRS with the MAC signaling. Since this enables multi-level modulations, the parameter can be notified with less number of symbols. With the HARQ retransmission control, the reliability of notifying the parameter is increased.

The source TRP may notify the CU of information indicating that delivery of the parameter has been verified, similarly as the fourth embodiment. The information may be notified when the parameter is notified with the MAC signaling. The CU may notify the UE of the switching instruction with the information. Thus, it is possible to avoid the SRS from being undelivered from the UE due to the undelivered parameter, and to prevent the random access operation and decrease in the uplink communication rate.

The CU may notify the UE of the switching with the L1/L2 signaling or the MAC signaling, similarly as the fourth embodiment. This can produce the same advantages as those according to the fourth embodiment.

The parameter on the SR in Steps ST3001 and ST3002 of FIG. 11 may be replaced with a parameter on the SRS in an example sequence for the notification of the RRC parameter on the SRS and the switching instruction.

The CU may transmit a notification of the parameter on the SRS to the UE a plurality of number of times or increase the transmission power, similarly as the fourth embodiment. Consequently, the reliability of notifying the parameter can be increased. The same holds true for the switching instruction from the CU to the UE.

The UE may transmit the SRS to the target beam/TRP on movement in response to an instruction for transmitting the SRS. The instruction has been received from the source beam/TRP on movement. The UE may transmit the SRS to the target beam/TRP on movement when the beam/TRP is switched between the instruction for transmitting the SRS and the transmission of the SRS. The transmission of the SRS may be aperiodic transmission of the SRS. The source beam/TRP on movement may notify the target beam/TRP on movement that it has instructed the UE to transmit the SRS. This allows the CU and the UE to smoothly perform the process of transmitting the SRS in switching the beam/TRP.

The UE may disable the instruction for transmitting the SRS. The instruction has been received from the source beam/TRP on movement. Consequently, the signaling from the source beam/TRP on movement to the target beam/TRP on movement can be reduced.

The source beam/TRP on movement may disable the SRS transmitted from the UE to its own beam. The operation of disabling the SRS may be performed when the beam/TRP is switched after transmission of the SRS. Consequently, the target beam/TRP on movement can perform scheduling appropriate for a propagation state after switching the beam/TRP.

Application of the second modification can produce the same advantages as those according to the fourth embodiment, in the notification of the RRC parameter on the SRS to the UE.

The Third Modification of the Fourth Embodiment

Although the fourth embodiment mainly describes the notification of the RRC parameter on the SR, the fourth embodiment may be applied to the RRC parameters on the CQI/CSI.

The RRC parameters on the CQI/CSI may be the same as those in the third modification of the second embodiment.

The third modification may be identical to the fourth embodiment in terms of the method and details in which the CU notifies the UE of the switching through a source beam/TRP on movement. The method for notifying the RRC parameter described in the fourth embodiment may be applied to the method in which the CU notifies the UE of the RRC parameter on the CQI/CSI through the source beam/TRP on movement. This can produce the same advantages as those according to the fourth embodiment.

The CU may notify the UE of the parameter necessary for beam sweeping, similarly as the fourth embodiment. The method for notifying the parameter may be the same as that in the fourth embodiment. Consequently, the UE can easily receive a beam sweeping signal in the mobility between beams/TRPs.

The CU may notify the UE of the parameter necessary for beam sweeping with the L1/L2 signaling or the MAC signaling. This can produce the same advantages as those according to the fourth embodiment.

Similarly as the fourth embodiment, the CU may include, in a notification of the RRC parameter on the CQI/CSI to the UE, an identifier indicating switching of a parameter due to the switching of the TRP/beam. The UE may hold the RRC parameter on the CQI/CSI before change. Consequently, the UE can prevent decrease in the downlink communication rate that is caused by the undelivered CQI/CSI in transmitting the CQI/CSI before switching the TRP/beam.

Similarly as the fourth embodiment, the CU need not notify, as the RRC parameter on the CQI/CSI, a parameter using the same value as that of the target beam/TRP on movement. Consequently, the amount of signaling for notifying the parameter can be reduced.

The CU and the UE may initialize the RRC parameter on the CQI/CSI or hold the value when the beam/TRP of the UE is switched. The initial value of the RRC parameter may be defined in a standard or notified from the CU to the UE in advance with the RRC signaling. Whether the parameter value when the beam/TRP of the UE is switched is initialized or held may be defined in a standard or notified from the CU to the UE in advance. Alternatively, information on whether the value is initialized or held may be notified from the CU to the UE together with a switching instruction. This can produce the same advantages as those according to the fourth embodiment.

The CU may notify the UE of the RRC parameter on the CQI/CSI and the switching instruction together, similarly as the fourth embodiment. Consequently, the amount of signaling in switching the beam/TRP can be reduced.

Alternatively, the CU may notify the UE of the switching instruction after notifying the RRC parameter on the CQI/CSI. This can avoid application of the RRC parameter on the CQI/CSI before change in the UE after switching the beam/TRP, avoid the CQI/CSI from being undelivered from the UE, and avoid the undelivered CQI/CSI from the UE from reducing the downlink communication rate.

Alternatively, the CU may notify the UE of the RRC parameter on the CQI/CSI after notifying the switching instruction. Here, the CU should notify the UE of the switching timing together with the switching instruction. Even when it takes time for the UE to perform a process of switching the communication destination beam/TRP, the smooth switching is possible.

The CU may notify the UE of the RRC parameter on the CQI/CSI with the L1/L2 signaling. Consequently, the parameter can be promptly notified to the UE.

Alternatively, the CU may notify the RRC parameter on the CQI/CSI with the MAC signaling. Since this enables multi-level modulations, the parameter can be notified with less number of symbols. With the HARQ retransmission control, the reliability of notifying the parameter is increased.

The source TRP may notify the CU of information indicating that delivery of the parameter has been verified, similarly as the fourth embodiment. The information may be notified when the parameter is notified with the MAC signaling. The CU may notify the UE of the switching instruction with the information. This can avoid undelivering the CQI/CSI from the UE due to the undelivered parameter and prevent decrease in the downlink communication rate.

The CU may notify the UE of the switching with the L1/L2 signaling or the MAC signaling, similarly as the fourth embodiment. This can produce the same advantages as those according to the fourth embodiment.

The parameter on the SR in Steps ST3001 and ST3002 of FIG. 11 may be replaced with the parameter on the CQI/CSI in an example sequence for the notification of the RRC parameter on the CQI/CSI and the switching instruction.

The CU may transmit a notification of the parameter on the CQI/CSI to the UE a plurality of number of times or increase the transmission power, similarly as the fourth embodiment. Consequently, the reliability of notifying the parameter can be increased. The same holds true for the switching instruction from the CU to the UE.

The UE may transmit the CQI/CSI to the target beam/TRP on movement in response to an instruction for transmitting the CQI/CSI. The instruction has been received from the source beam/TRP on movement. The UE may transmit the CQI/CSI to the target beam/TRP on movement when the beam/TRP is switched between the instruction for transmitting the CQI/CSI and transmission of the CQI/CSI. The transmission of the CQI/CSI may be aperiodic transmission of the CQI/CSI. The source beam/TRP on movement may notify the target beam/TRP on movement of information indicating that it has instructed the UE to transmit the CQI/CSI. This allows the source beam/TRP on movement, the target beam/TRP on movement, and the UE to smoothly perform the process of transmitting the CQI/CSI in switching the beam/TRP.

The source beam/TRP on movement may disable the CQI/CSI transmitted from the UE to its own beam. The operation of disabling the CQI/CSI may be performed when the beam/TRP is switched after transmission of the CQI/CSI. The source beam/TRP on movement may notify the target beam/TRP on movement of information indicating that it has instructed the UE to transmit the CQI/CSI. The target beam/TRP on movement may retransmit the instruction to the UE for transmitting the CQI/CSI. The UE may retransmit the CQI/CSI to the target beam/TRP on movement. Consequently, the target beam/TRP on movement can perform scheduling appropriate for a propagation state after switching the beam/TRP.

Application of the third modification can produce the same advantages as those according to the fourth embodiment, in the notification of the RRC parameter on the CQI/CSI to the UE.

The Fourth Modification of the Fourth Embodiment

Although the fourth embodiment mainly describes the notification of the RRC parameter on the SR, the fourth embodiment may be applied to RRC parameters on the RLC.

The following (1) to (8) are described as the RRC parameters on the RLC:
(1) a timer for determining whether retransmission of a RLC PDU is necessary, for example, T-PollRetransmit described in Non-Patent Document 12;
(2) the number of RLC PDUs to be used as intervals for transmitting polling from an RLC transmitting side entity to a receiving side entity, for example, PollPDU described in Non-Patent Document 12;
(3) the amount of RLC PDU data to be used as intervals for transmitting polling from the RLC transmitting side entity to the receiving side entity, for example, PollByte described in Non-Patent Document 12;
(4) the maximum number of retransmission times in an RLC ARQ, for example, maxRetx Threshold described in Non-Patent Document 12;
(5) a timer for reordering the RLC PDU, for example, T-reordering described in Non-Patent Document 12;
(6) the minimum transmission intervals of an RLC Status PDU, for example, T-StatusProhibit described in Non-Patent Document 12;
(7) the size of the sequence number of the RLC PDU, for example, SN-FieldLength described in Non-Patent Document 12; and
(8) combinations of (1) and (7) above.

In (1) above, for example, reducing a value of the timer for determining whether retransmission of the RLC PDU is necessary in a beam/TRP under an unstable propagation environment can reduce the latency in communication between the UE and the CU.

In (2) above, for example, reducing the number of RLC PDUs during the polling in a beam/TRP under an unstable propagation environment can reduce the latency in communication between the UE and the CU.

In (3) above, for example, reducing the size of the RLC PDU during the polling in a beam/TRP under an unstable propagation environment can reduce the latency in communication between the UE and the CU.

In (4) above, for example, increasing the maximum number of times the RLC PDU is retransmitted in a beam/TRP under an unstable propagation environment can increase the reliability of transmitting and receiving the RLC PDU.

In (5) above, for example, increasing the value of the timer to be used for reordering the RLC PDU in a beam/TRP under an unstable propagation environment can prevent the RLC PDU from missing.

In (6) above, for example, shortening the transmission intervals of the Status PDU in a beam/TRP under an unstable propagation environment can maintain the communication with low latency and high reliability.

In (7) above, for example, increasing the size of the sequence number in a beam/TRP under an unstable propagation environment can prevent the RLC PDU from missing.

The first modification may be identical to the fourth embodiment in terms of the method and details in which the CU notifies the UE of the switching through a source beam/TRP on movement. The method for notifying the RRC parameter described in the fourth embodiment may be applied to the method in which the CU notifies the UE of the RRC parameter on the RLC through the source beam/TRP on movement. This can produce the same advantages as those according to the fourth embodiment.

The CU may notify the UE of the parameter necessary for beam sweeping, similarly as the fourth embodiment. The method for notifying the parameter may be the same as that in the fourth embodiment. This can produce the same advantages as those according to the fourth embodiment.

The CU may notify the UE of the parameter necessary for beam sweeping with the L1/L2 signaling or the MAC signaling. This can produce the same advantages as those according to the fourth embodiment.

Similarly as the fourth embodiment, the CU may include, in a notification of the RRC parameter on the RLC to the UE, an identifier indicating switching of a parameter due to the switching of the TRP/beam. The UE may hold the RRC parameter on the RLC before change and use the parameter after change after switching the TRP/beam. This can prevent the UE and the source beam/TRP on movement from reconstructing the RLC due to change in the RRC parameter on the RLC before switching the TRP/beam, and the communication loss caused by the reconstruction.

Similarly as the fourth embodiment, the CU need not notify, as the RRC parameter on the RLC, a parameter using the same value as that of the target beam/TRP on movement. Consequently, the amount of signaling for notifying the parameter can be reduced.

The CU and the UE may initialize the RRC parameter on the RLC or hold the value when the beam/TRP of the UE is switched, similarly as the fourth embodiment. The initial value may be defined in a standard or notified from the CU to the UE in advance with the RRC signaling. Whether the value is initialized or held may be defined in a standard, notified from the CU to the UE in advance, or notified from the CU to the UE together with a switching instruction. This can produce the same advantages as those according to the fourth embodiment.

The CU may notify the UE of the RRC parameter on the RLC and the switching instruction together, or notify the UE of the switching instruction after notifying the RRC parameter on the RLC, similarly as the fourth embodiment. Alternatively, the CU may notify the UE of the RRC parameter on the RLC after notifying the switching instruction. Here, the CU should notify the UE of the switching timing together with the switching instruction. This can produce the same advantages as those according to the fourth embodiment.

The CU may notify the UE of the RRC parameter on the RLC with the L1/L2 signaling. Consequently, the parameter can be promptly notified to the UE.

Alternatively, the CU may notify the UE the RRC parameter on the RLC with the MAC signaling. Since this enables multi-level modulations, the parameter can be notified with less number of symbols. With the HARQ retransmission control, the reliability of notifying the parameter is increased.

The source TRP may notify the CU of information indicating that delivery of the parameter has been verified, similarly as the fourth embodiment. The information may be notified when the parameter is notified with the MAC signaling. The CU may notify the UE of the switching instruction with the information. This can prevent a malfunction of the RLC caused by the undelivered parameter.

The CU may notify the UE of the switching with the L1/L2 signaling or the MAC signaling, similarly as the fourth embodiment. This can produce the same advantages as those according to the fourth embodiment.

The CU may transmit a notification of the parameter on the RLC a plurality of number of times or increase the transmission power, similarly as the fourth embodiment. Consequently, the reliability of notifying the parameter can be increased. The same holds true for the switching instruction from the CU to the UE.

The CU and the UE may stop transmitting and receiving the user data together with notification of the switching instruction. The CU and the UE may resume transmitting and receiving the user data after completion of switching the beam/TRP. This can prevent data from missing due to reconstruction of the RLC.

With application of the fourth modification, the RRC parameter on the RLC can be promptly notified to the UE. Since an appropriate value can be set according to a propagation environment of the beam/TRP, the communication latency in the RLC layer can be reduced and the reliability is increased.

The Fifth Embodiment

The fourth embodiment describes that, for example, the source beam/TRP on movement notifies the UE of the RRC parameter when the CU has PDCP and the DU has RLC, MAC, and PHY or when the CU has PDCP and H-RLC and the DU has L-RLC, MAC, and PHY. The target beam/TRP on movement may notify the UE of the RRC parameter.

The target beam/TRP on movement notifies the UE of the RRC parameter. The source beam/TRP on movement notifies the UE of the switching instruction.

The target beam/TRP on movement may notify the UE of the RRC parameter after the source beam/TRP on movement notifies the UE of the switching. Consequently, the UE can smoothly obtain the RRC parameter after switching the communication destination beam/TRP.

The RRC parameter may be the one described in 6.3.2 of Non-Patent Document 12, similarly as the second embodiment. The RRC parameter may relate to, for example, the SR, the Ack/Nack repetitions, the Sounding Reference Signal (SRS), or the CQI/CSI.

The RRC parameters on the SR may be the ones described in (1) to (3) in the second embodiment. The CU may or need not notify the UE of the parameter indicating the maximum number of times the SR is retransmitted as the RRC parameter on the SR, similarly as the second embodiment. This can produce the same advantages as those according to the second embodiment.

The CU may notify the UE of the parameter necessary for beam sweeping. The parameter necessary for beam sweeping may be the one described in the first embodiment. The parameter necessary for beam sweeping may be notified though the source beam/TRP on movement. The parameter necessary for beam sweeping may be a parameter in the target beam/TRP on movement. Consequently, the UE can easily receive a beam sweeping signal in the mobility between beams/TRPs.

The target beam/TRP on movement may notify the UE of the RRC parameter with the L1/L2 signaling or the MAC signaling, similarly as the second embodiment. Thus, the parameter necessary for beam sweeping can be promptly notified.

Alternatively, the RRC signaling may be used, similarly as the third embodiment. Thus, since the CU can notify the UE of the RRC parameter in advance, there is no need to notify the RRC parameter in switching the beam/TRP. This can reduce the amount of signaling.

The L1/L2 signaling or the MAC signaling may be used as a method for notifying the switching instruction from the source beam/TRP on movement to the UE, similarly as the second embodiment. Thus, switching of the beam/TRP can be promptly notified to the UE. Thus, the reliability of the notification can be increased with the MAC signaling.

The source TRP may notify the CU of information indicating that delivery of the switching instruction has been verified, similarly as the fourth embodiment. The information may be notified when the switching instruction is notified with the MAC signaling. The CU may switch the beam/TRP with the information. Since switching of the beam/TRP when the switching instruction is undelivered can be prevented, the UE can avoid the RLF caused by the link loss with the CU.

The CU need not notify, as the RRC parameter, a parameter using the same value as that of the target beam/TRP on movement. Consequently, the amount of signaling for notifying the parameter can be reduced.

Similarly as the second embodiment, the CU may switch the beam/TRP upon excess of the number of times the HARQ is retransmitted in response to the switching instruction from the source beam/TRP on movement to the UE when the switching instruction is notified with the MAC signaling. The beam/TRP may be switched when Ack/Nack from the UE in response to the switching instruction is indistinguishable. Upon failure in receiving an Ack signal from the UE by the source beam/TRP on movement in response to the switching instruction, the gNB can switch the beam/TRP along with switching of the communication destination beam/TRP by the UE. Thus, the UE can prevent the link loss with the gNB.

The UE may transmit an uplink signal to the source beam/TRP on movement, similarly as the second embodiment. The uplink signal may be a response to the L1/L2 signaling with a switching instruction issued by the CU. An L1/L2 signaling for response may be newly provided as the uplink signal. New uplink control information (UCI) may be provided as the response. This can produce the same advantages as described in the second embodiment.

The new UCI may be the same as that in the second embodiment. This can produce the same advantages as those according to the second embodiment.

The source beam/TRP on movement may notify the CU of information indicating reception of the L1/L2 signaling for response, similarly as the fourth embodiment. Since the CU can understand that the UE has accurately received the switching instruction, the beam/TRP can be smoothly switched.

When the source beam/TRP on movement notifies the UE of the switching instruction with the MAC signaling, the source beam/TRP on movement may notify the CU of information indicating reception of Ack in response to the notification of the switching instruction. The CU may switch, with the notified information, the beam/TRP to be used. Since the CU can understand that the UE has accurately received the switching instruction, the beam/TRP can be smoothly switched.

The UE may transmit an uplink signal to the target beam/TRP on movement, similarly as the second embodiment. The uplink signal may be a signal for verifying the switching of the beam/TRP in the UE. The signal for verification may be transmitted with frequency resources for the SR. Alternatively, the SR may be transmitted as the signal for verification. The target beam/TRP on movement can notify the RRC parameter upon verifying that the UE has switched the communication destination beam/TRP. The reliability of delivering the notification of the RRC parameter to the UE can be increased.

Since transmission of the SR from the UE to the target beam/TRP on movement, the common resources for the SR and transmission of the SRS are the same as those described in the second embodiment, the description is omitted.

Since the determination of the CU on whether the UE switches the communication destination beam/TRP is the same as that described in the second embodiment, the description is omitted.

The transmission source beam/TRP may transmit the notification of the switching instruction to the UE a plurality of number of times or increase the power. Consequently, the reliability of notifying the switching instruction can be increased.

The transmission target beam/TRP may transmit the notification of the parameter to the UE a plurality of number of times or increase the power. Consequently, the reliability of notifying the parameter can be increased.

When the UE transmits the SR, the source beam/TRP on movement may disable the SR received from the UE. The source beam/TRP on movement may disable the SR when the beam/TRP is switched between reception of the SR and transmission of the uplink scheduling grant. The UE may retransmit the SR to the target beam/TRP on movement. The UE may retransmit the SR after receiving the RRC parameter on the SR from the target beam/TRP on movement. This can avoid the SR retransmitted from the UE to the target beam/TR from being undelivered to the target beam/TRP on movement.

Alternatively, the source beam/TRP on movement may enable the SR received from the UE. The source beam/TRP on movement may transfer the SR to the target beam/TRP on movement. The SR may be transferred via the CU. Information indicating reception of the SR may be used instead of the SR. Consequently, even when the beam/TRP is switched between reception of the SR and transmission of the uplink scheduling grant, the UE can smoothly perform a series of procedures including transmission of the SR, reception of the uplink scheduling grant, and transmission of the uplink user data. This enables reception of the uplink scheduling grant and transmission of the uplink user data without waiting for a notification of the RRC parameter on the SR from the target beam/TRP on movement. Consequently, latency in the uplink user data communication can be reduced.

The target beam/TRP on movement may notify the UE of the uplink scheduling grant and the RRC parameter on the SR simultaneously. This can reduce the amount of signaling from the target beam/TRP on movement to the UE and the latency in the uplink user data communication.

In the uplink scheduling grant notification from the CU to the UE, the CU and the UE may disable the uplink scheduling grant transmitted from the source beam/TRP on movement. The CU and the UE may disable the uplink scheduling grant when switching of the beam/TRP occurs between the uplink scheduling grant and the uplink user data. The target beam/TRP on movement may retransmit the uplink scheduling grant to the UE. For retransmitting the uplink scheduling grant, the source beam/TRP on movement may request the target beam/TRP on movement to retransmit the uplink scheduling grant to the UE. Alternatively, the UE may start again from transmission of the SR to the target beam/TRP on movement. The UE may retransmit the SR after receiving a notification of the RRC parameter from the CU. This can prevent the SR retransmitted from the UE from being undelivered to the CU.

Whether the UE starts again from transmission of the SR may be defined in a standard or notified from the CU to the UE. The notification from the gNB to the UE may be made in advance with the RRC signaling, the MAC signaling, or the L1/L2 signaling. This notification may be made together with the switching notification in the example with the MAC signaling or the L1/L2 signaling. Consequently, the UE can receive the uplink scheduling grant according to a use status of the uplink resources in the target beam/TRP on movement for transmitting the uplink user data.

Alternatively, in switching of the beam/TRP after the uplink scheduling grant notification from the source beam/TRP on movement to the UE, the CU and the UE may enable the uplink scheduling grant transmitted from the source beam/TRP on movement. The UE may transmit the uplink user data to the target beam/TRP on movement with the uplink scheduling grant. Consequently, the amount of signaling between the CU and the UE can be reduced.

Whether the uplink scheduling grant is enabled may be defined in a standard or notified from the CU to the UE. The notification from the gNB to the UE may be made in advance with the RRC signaling, the MAC signaling, or the L1/L2 signaling. The uplink scheduling grant may be enabled, for example, when the target beam/TRP on movement can use the uplink resources indicated by the scheduling grant for the UE. The source beam/TRP on movement may notify the target beam/TRP on movement of information on the uplink scheduling grant. Consequently, since the target beam/TRP on movement can determine whether to enable or disable the uplink scheduling grant, the flexible scheduling becomes possible.

This notification may be made together with the switching notification in the example with the MAC signaling or the L1/L2 signaling. Consequently, the CU can perform, with less signaling, scheduling according to a use status of the uplink resources in the target beam/TRP on movement.

For transmission of the uplink user data from the UE to the CU, the target beam/TRP on movement may transmit to the UE Ack/Nack in response to the uplink user data received by the source beam/TRP on movement from the UE. The target beam/TRP on movement may transmit the Ack/Nack to the UE when the beam/TRP is switched between transmission of the uplink user data from the UE and notification of the Ack/Nack in response to the uplink user data. The source beam/TRP on movement may notify the target beam/TRP on movement of information indicating Ack/Nack in response to the uplink user data. This allows smooth switching of the beam/TRP after transmission of the uplink user data.

The source beam/TRP on movement may notify the target beam/TRP on movement of information on a result of decoding the uplink user data received from the UE. This information may be, for example, a soft-decision value of the uplink user data. Consequently, the target beam/TRP on movement can combine an initial reception result and a retransmission reception result of the uplink user data and decode the resulting data. The probability of a reception error can be lowered.

The fifth embodiment can produce the same advantages as those according to the second embodiment even when the CU has PDCP and the DU has RLC, MAC, and PHY or when the CU has PDCP and H-RLC and the DU has L-RLC, MAC, and PHY. Moreover, the CU can notify the UE of the RRC parameter even with sudden deterioration in the communication environment between the source beam/TRP on movement and the UE. As a result, for example, the random access procedure by the UE caused by the undelivered SR can be reduced.

The fourth and fifth embodiments may be combined for use, similarly as the combination of the second and third embodiments. In other words, the CU may switch from which one of the source beam/TRP on movement and the target beam/TRP on movement the RRC parameter is to be transmitted. Consequently, the CU can flexibly change the beam/TRP from which the RRC parameter is to be transmitted, according to the communication environment.

From which one of the source beam/TRP on movement and the target beam/TRP on movement the RRC parameter is to be transmitted may be semi-statically preset by the CU to the UE, dynamically set by the CU to the UE, or implicitly determined in a standard, similarly as the combination of the second and third embodiments. This can produce the same advantages as those according to the combination of the second and third embodiments.

Although the fifth embodiment describes, as an example, the base station device in which the CU and the DUs are separated, the fifth embodiment may be applied to a base station device in which the CU and the DUs are not separated. The base station device may be a base station device that does not share the RRC parameter between beams. The base station device may be, for example, a base station device that performs different HARQ scheduling for each beam, a base station device having a different RLC layer for each beam, or a base station device with combi-nation of both of them. With application of the fifth embodiment to the base station device, the CU may be read as the gNB. This enables notification of the RRC parameter from the gNB to the UE through the target beam in the mobility between beams in a cell, and increase in the number of UEs to be accommodated in the cell that is spatially separated by the beams. The gNB can promptly notify the UE of the parameter.

Similarly as the second embodiment, the fifth embodiment provides, for example, a communication system including: a communication terminal device; and a base station device that performs radio communication with the communication terminal device via a radio beam, wherein a cell configured by the base station device is spatially separated by a plurality of radio beams being served by the base station device, and the base station device changes a radio resource control (RRC) parameter to be applied to the communication terminal device from a first RRC parameter for a first radio beam to a second RRC parameter for a second radio beam when the communication terminal device moves from a range of the first radio beam to a range of the second radio beam. The plurality of radio beams may be formed by a plurality of DUs (i.e., TRPs) as exemplified in FIG. 8, by one DU, or by a base station device in which the CU and the DUs are integrated.

Under this structure, the RRC parameter to be applied to the communication terminal device is changed according to change in the radio beam to be applied to the communication terminal device. Thus, the number of the communication terminal devices to be accommodated can be increased as described above.

Here, the structure can be variously modified as described above. Particularly, the fifth embodiment provides, for example, a communication system wherein the base station device includes: at least one distributed unit (DU) that outputs the plurality of radio beams; and a central unit (CU) that controls the at least one DU, the at least one DU has a medium access control (MAC) function, and the base station device gives: a notification of the second RRC parameter to the communication terminal device via the second radio beam with an L1/L2 signaling or a MAC signaling; and a notification of a switching instruction from the first radio beam to the second radio beam to the communication terminal device via the first radio beam with the L1/L2 signaling or the MAC signaling. The DU may have a radio link control (RLC) function. As an alternative example, provided is a communication system wherein the base station device has a function of outputting a plurality of radio beams and a MAC function, and the base station device gives: a notification of the second RRC parameter to the communication terminal device via the second radio beam; and a notification of a switching instruction from the first radio beam to the second radio beam to the communication terminal device via the first radio beam.

The various modifications are provided as described in the first to fourth modifications below.

The First Modification of the Fifth Embodiment

Although the fifth embodiment mainly describes the notification of the RRC parameter on the SR, the fifth embodiment may be applied to the RRC parameters on the Ack/Nack repetitions.

The RRC parameters on the Ack/Nack repetitions may be the same as those in the first modification of the second embodiment.

The first modification may be identical to the fifth embodiment in terms of the method and details in which the CU notifies the UE of the switching through a source beam/TRP on movement. The method for notifying the RRC parameter described in the fifth embodiment may be applied to the method in which the CU notifies the UE of the RRC parameter on the Ack/Nack repetitions through the target beam/TRP on movement. This can produce the same advantages as those according to the fifth embodiment.

The CU may notify the UE of the parameter necessary for beam sweeping, similarly as the fifth embodiment. The method for notifying the parameter may be the same as that in the fifth embodiment. Consequently, the UE can easily receive a beam sweeping signal in the mobility between beams/TRPs.

The CU may notify the UE of the parameter necessary for beam sweeping with the L1/L2 signaling or the MAC signaling. This can produce the same advantages as those according to the fifth embodiment.

Similarly as the fifth embodiment, the CU need not notify, as the RRC parameter on the Ack/Nack repetitions, a parameter using the same value as that of the target beam/TRP on movement. Consequently, the amount of signaling for notifying the parameter can be reduced.

The CU and the UE may initialize the RRC parameter on the Ack/Nack repetitions or hold the value when the beam/TRP of the UE is switched, similarly as the fifth embodiment. Whether the parameter value when the beam/TRP of the UE is switched is initialized or held may be defined in a standard or notified from the CU to the UE in advance. Alternatively, information on whether the value is initialized or held may be notified from the CU to the UE together with a switching instruction. Consequently, even upon failure in notification of the parameter from the source beam/TRP on movement to the UE, the UE can use the initial value or the RRC parameter before change. Thus, the reliability of the Ack/Nack repetitions from the UE to the target beam/TRP on movement can be increased.

The CU may notify the UE of the RRC parameter on the Ack/Nack repetitions with the L1/L2 signaling. Consequently, the parameter can be promptly notified to the UE.

Alternatively, the CU may notify the RRC parameter on the Ack/Nack repetitions with the MAC signaling. Since this enables multi-level modulations, the parameter can be notified with less number of symbols. With the HARQ retransmission control, the reliability of notifying the parameter is increased.

The CU may notify the UE of the switching with the L1/L2 signaling or the MAC signaling, similarly as the second embodiment. This can produce the same advantages as those according to the second embodiment.

The L1/L2 signaling or the MAC signaling may be used as a method for notifying the switching instruction from the source beam/TRP on movement to the UE, similarly as the fifth embodiment. This can produce the same advantages as those according to the fifth embodiment.

The source TRP may notify the CU of information indicating that delivery of the switching instruction has been verified, similarly as the fifth embodiment. The information may be notified when the switching instruction is notified with the MAC signaling. The CU may switch the beam/TRP with the information. Since switching of the beam/TRP when the switching instruction is undelivered can be prevented, the UE can avoid the RLF caused by the link loss with the gNB.

The CU may transmit a notification of the parameter on the Ack/Nack repetitions to the UE a plurality of number of times or increase the transmission power, similarly as the fifth embodiment. Consequently, the reliability of notifying the Ack/Nack repetitions can be increased. The same holds true for the switching instruction from the CU to the UE.

The UE may notify neither the source TRP/beam on movement nor the target beam/TRP on movement of Ack/Nack in response to the downlink user data that has been received from the CU through the source TRP/beam on movement. The operation of the UE may be performed when the beam/TRP is switched between the downlink user data and Ack/Nack. The source beam/TRP on movement may transfer the downlink user data to the target beam/TRP on movement. The target beam/TRP on movement may transmit the downlink user data to the UE. This can prevent the downlink user data from missing due to switching of the beam/TRP.

As an alternative example, the UE may notify the target beam/TRP on movement of Ack/Nack in response to the downlink user data that has been received from the CU through the source TRP/beam on movement. The UE may notify the Ack/Nack when the beam/TRP is switched between the downlink user data and the Ack/Nack. The target beam/TRP on movement may notify the source TRP/beam on movement of a reception result of the Ack/Nack. This can reduce the amount of signaling on the downlink user data in switching of the beam/TRP.

The source beam/TRP on movement may transfer the downlink user data to the target beam/TRP on movement. The transfer may be performed upon receipt of a notification of Nack from the UE in response to the downlink user data. The target beam/TRP on movement may perform retransmission to the UE with the transferred downlink user data. This can smooth a process of retransmitting the downlink user data in switching of the beam/TRP.

The target beam/TRP on movement may retransmit the downlink user data to the UE after receiving a parameter notification on the Ack/Nack repetitions from the CU to the UE. Consequently, since the target beam/TRP on movement can receive Ack/Nack from the second time onward that is set by the Ack/Nack repetitions, the reliability of notifying Ack/Nack from the UE to the target beam/TRP on movement can be increased.

The UE may notify the target beam/TRP on movement of Ack/Nack after receiving, from the target beam/TRP on movement, a parameter notification on the Ack/Nack repetitions as previously described. This can produce the same advantages as those previously described.

The source beam/TRP on movement may determine Ack/Nack received from the UE using only a reception result of its own beam/TRP or using the reception result in conjunction with a reception result of the target beam/TRP on movement. The target beam/TRP on movement may transfer a reception result of Ack/Nack from the UE to the source beam/TRP on movement. The operation may be performed when the beam/TRP is switched during the Ack/Nack repetitions from the UE to the source beam/TRP on movement. The operation of receiving the Ack/Nack repetitions from the UE can be promptly performed using only the reception result of the source beam/TRP on movement. The reliability of the Ack/Nack repetitions in the source beam/TRP on movement can be increased using the reception result in conjunction with the reception result of the target beam/TRP on movement. Whether the source beam/TRP on movement uses only the reception result of its own beam/TRP or uses the reception result in conjunction with the reception result of the target beam/TRP on movement may be defined in a standard or appropriately switched by the CU. Since the appropriate switching by the CU enables, for example, selection of an appropriate receiving operation according to a propagation state in the source beam/TRP on movement, it is possible to increase flexibility for the gNB to perform a process of receiving the Ack/Nack repetitions.

Instead of the source beam/TRP on movement, the target beam/TRP on movement may perform the process of receiving the Ack/Nack repetitions. The target beam/TRP on movement may use only the reception result of its own beam/TRP or use the reception result in conjunction with the reception result of the source beam/TRP on movement. The source beam/TRP on movement may transfer, to the target beam/TRP on movement, a reception result of Ack/Nack from the UE. This can produce the same advantages as those previously described. Whether the target beam/TRP on movement uses only the reception result of its own beam/TRP or uses the reception result in conjunction with the reception result of the source beam/TRP on movement may be defined in a standard or appropriately switched by the CU.

Whether the source beam/TRP on movement or the target beam/TRP on movement performs an operation of receiving Ack/Nack may be defined in a standard or determined in advance by the CU. This can prevent a malfunction caused by a variance in result of receiving Ack/Nack between the source beam/TRP on movement and the target beam/TRP on movement.

The target beam/TRP on movement may retransmit the downlink user data to the UE with the Ack/Nack repetitions transmitted from the UE to the source beam/TRP on movement. The retransmission may be performed when the beam/TRP is switched between the Ack/Nack repetitions from the UE to the source beam/TRP on movement and the retransmission of the downlink user data to the UE. The source beam/TRP on movement may transfer the retransmission data to the target beam/TRP on movement. This can smooth the process of retransmitting the downlink user data in switching the beam/TRP.

Application of the first modification can produce the same advantages as those according to the fifth embodiment, in the notification of the RRC parameter on the Ack/Nack repetitions to the UE.

The Second Modification of the Fifth Embodiment

Although the fifth embodiment mainly describes the notification of the RRC parameter on the SR, the fifth embodiment may be applied to the RRC parameters on the SRS.

The RRC parameters on the SRS may be the same as those in the second modification of the second embodiment.

The second modification may be identical to the fifth embodiment in terms of the method and details in which the CU notifies the UE of the switching through a source beam/TRP on movement. The method for notifying the RRC parameter described in the fifth embodiment may be applied to the method in which the CU notifies the UE of the RRC parameter on the SRS through the target beam/TRP on movement. This can produce the same advantages as those according to the fifth embodiment.

The CU may notify the UE of the parameter necessary for beam sweeping, similarly as the fifth embodiment. Consequently, the UE can easily receive a beam sweeping signal in the mobility between beams/TRPs.

The CU may notify the UE of the parameter necessary for beam sweeping with the L1/L2 signaling or the MAC signaling. This can produce the same advantages as those according to the fifth embodiment.

Similarly as the fifth embodiment, the CU need not notify, as the RRC parameter on the SRS, a parameter using the same value as that of the target beam/TRP on movement. Consequently, the amount of signaling for notifying the parameter can be reduced.

The CU and the UE may initialize the RRC parameter on the SRS or hold the value when the beam/TRP of the UE is switched, similarly as the fifth embodiment. Whether the parameter value when the beam/TRP of the UE is switched is initialized or held may be defined in a standard or notified from the CU to the UE in advance. Alternatively, information on whether the value is initialized or held may be notified from the CU to the UE together with a switching instruction. This can produce the same advantages as those according to the fifth embodiment.

The CU may notify the UE of the RRC parameter on the SRS with the L1/L2 signaling. Consequently, the parameter can be promptly notified to the UE.

Alternatively, the CU may notify the RRC parameter on the SRS with the MAC signaling. Since this enables multi-level modulations, the parameter can be notified with less number of symbols. With the HARQ retransmission control, the reliability of notifying the parameter is increased.

The CU may notify the UE of the switching with the L1/L2 signaling or the MAC signaling, similarly as the fifth embodiment. This can produce the same advantages as those according to the fifth embodiment.

The CU may transmit a notification of the parameter on the SRS to the UE a plurality of number of times or increase the transmission power, similarly as the fifth embodiment. Thus, the reliability of notifying the parameter on the SRS can be increased. The same holds true for the switching instruction from the CU to the UE.

The UE may transmit the SRS to the target beam/TRP on movement after receiving the parameter on the SRS to be transmitted from the CU through the target beam/TRP on movement. This can reduce transmission of the SRS that cannot be received by the target beam/TRP on movement before the UE receives the parameter on the SRS.

The UE may transmit the SRS to the target beam/TRP on movement in response to an instruction for transmitting the SRS. The instruction has been received from the source beam/TRP on movement. The UE may transmit the SRS to the target beam/TRP on movement when the beam/TRP is switched between the instruction for transmitting the SRS and the transmission of the SRS. The transmission of the SRS may be aperiodic transmission of the SRS. The source beam/TRP on movement may notify the target beam/TRP on movement that it has instructed the UE to transmit the SRS. This allows the CU and the UE to smoothly perform the process of transmitting the SRS in switching the beam/TRP.

The UE may disable the instruction for transmitting the SRS. The instruction has been received from the source beam/TRP on movement. Consequently, the signaling from the source beam/TRP on movement to the target beam/TRP on movement can be reduced.

The source beam/TRP on movement may disable the SRS transmitted from the UE to its own beam. The operation of disabling the SRS may be performed when the beam/TRP is switched after transmission of the SRS. Consequently, the target beam/TRP on movement can perform scheduling appropriate for a propagation state after switching the beam/TRP.

Application of the second modification can produce the same advantages as those according to the fifth embodiment, in the notification of the RRC parameter on the SRS to the UE.

The Third Modification of the Fifth Embodiment

Although the fifth embodiment mainly describes the notification of the RRC parameter on the SR, the fifth embodiment may be applied to the RRC parameters on the CQI/CSI.

The RRC parameters on the CQI/CSI may be the same as those in the third modification of the second embodiment.

The third modification may be identical to the fifth embodiment in terms of the method and details in which the CU notifies the UE of the switching through a source beam/TRP on movement. The method for notifying the RRC parameter described in the fifth embodiment may be applied to the method in which the CU notifies the UE of the RRC parameter on the CQI/CSI through the target beam/TRP on movement. This can produce the same advantages as those according to the fifth embodiment.

The CU may notify the UE of the parameter necessary for beam sweeping, similarly as the fifth embodiment. Consequently, the UE can easily receive a beam sweeping signal in the mobility between beams/TRPs.

The CU may notify the UE of the parameter necessary for beam sweeping with the L1/L2 signaling or the MAC signaling. This can produce the same advantages as those according to the fifth embodiment.

Similarly as the fifth embodiment, the CU need not notify, as the RRC parameter on the CQI/CSI, a parameter using the same value as that of the target beam/TRP on movement. Consequently, the amount of signaling for notifying the parameter can be reduced.

The CU and the UE may initialize the RRC parameter on the CQI/CSI or hold the value when the beam/TRP of the UE is switched, similarly as the fifth embodiment. Whether the parameter value when the beam/TRP of the UE is switched is initialized or held may be defined in a standard or notified from the CU to the UE in advance. Alternatively, information on whether the value is initialized or held may be notified from the CU to the UE together with a switching instruction. This can produce the same advantages as those according to the fifth embodiment.

The CU may notify the UE of the RRC parameter on the CQI/CSI with the L1/L2 signaling. Consequently, the parameter can be promptly notified to the UE.

Alternatively, the CU may notify the RRC parameter on the CQI/CSI with the MAC signaling. Since this enables multi-level modulations, the parameter can be notified with less number of symbols. With the HARQ retransmission control, the reliability of notifying the parameter is increased.

The CU may notify the UE of the switching with the L1/L2 signaling or the MAC signaling, similarly as the fifth embodiment. This can produce the same advantages as those according to the fifth embodiment.

The CU may transmit a notification of the parameter on the CQI/CSI to the UE a plurality of number of times or increase the transmission power, similarly as the fifth embodiment. Consequently, the reliability of notifying the parameter on the CQI/CSI can be increased. The same holds true for the switching instruction from the CU to the UE.

The UE may transmit the CQI/CSI to the target beam/TRP on movement after receiving the parameter on the CQI/CSI to be transmitted from the CU through the target beam/TRP on movement. This can reduce transmission of the CQI/CSI that cannot be received by the target beam/TRP on movement before the UE receives the parameter on the CQI/CSI.

The UE may transmit the CQI/CSI to the target beam/TRP on movement in response to an instruction for transmitting the CQI/CSI. The instruction has been received from the source beam/TRP on movement. The UE may transmit the CQI/CSI to the target beam/TRP on movement when the beam/TRP is switched between the instruction for transmitting the CQI/CSI and transmission of the CQI/CSI. The transmission of the CQI/CSI may be aperiodic transmission of the CQI/CSI. The source beam/TRP on movement may notify the target beam/TRP on movement of information indicating that it has instructed the UE to transmit the CQI/CSI. This allows the source beam/TRP on movement, the target beam/TRP on movement, and the UE to smoothly perform the process of transmitting the CQI/CSI in switching the beam/TRP.

The source beam/TRP on movement may disable the CQI/CSI transmitted from the UE to its own beam. The operation of disabling the CQI/CSI may be performed when the beam/TRP is switched after transmission of the CQI/CSI. The source beam/TRP on movement may notify the target beam/TRP on movement of information indicating that it has instructed the UE to transmit the CQI/CSI. The target beam/TRP on movement may retransmit the instruction to the UE for transmitting the CQI/CSI.

The UE may retransmit the CQI/CSI to the target beam/TRP on movement.

Consequently, the target beam/TRP on movement can perform scheduling appropriate for a propagation state after switching the beam/TRP.

Application of the third modification can produce the same advantages as those according to the fifth embodiment, in the notification of the RRC parameter on the CQI/CSI to the UE.

The Fourth Modification of the Fifth Embodiment

Although the fifth embodiment mainly describes the notification of the RRC parameter on the SR, the fifth embodiment may be applied to the RRC parameters on the RLC.

The (1) to (8) described in the fourth modification of the fourth embodiment may be used as the RRC parameters on the RLC.

The fourth modification may be identical to the fifth embodiment in terms of the method and details in which the CU notifies the UE of the switching through a source beam/TRP on movement. The method for notifying the RRC parameter described in the fifth embodiment may be applied to the method in which the CU notifies the UE of the RRC parameter on the RLC through the source beam/TRP on movement. This can produce the same advantages as those according to the fifth embodiment.

The CU may notify the UE of the parameter necessary for beam sweeping, similarly as the fifth embodiment. The method for notifying the parameter may be the same as that in the fifth embodiment. This can produce the same advantages as those according to the fifth embodiment.

The CU may notify the UE of the parameter necessary for beam sweeping with the L1/L2 signaling or the MAC signaling. This can produce the same advantages as those according to the fifth embodiment.

Similarly as the fifth embodiment, the CU may include, in a notification of the RRC parameter on the RLC to the UE, an identifier indicating switching of a parameter due to the switching of the TRP/beam. The UE may hold the RRC parameter on the RLC before change, and use the parameter after change after switching the TRP/beam. This can prevent the UE and the source beam/TRP on movement from reconstructing the RLC due to change in the RRC parameter on the RLC before switching the TRP/beam, and the communication loss caused by the reconstruction.

Similarly as the fifth embodiment, the CU need not notify, as the RRC parameter on the RLC, a parameter using the same value as that of the target beam/TRP on movement. Consequently, the amount of signaling for notifying the parameter can be reduced.

The CU and the UE may initialize the RRC parameter on the RLC or hold the value when the beam/TRP of the UE is switched, similarly as the fifth embodiment. The initial value may be defined in a standard or notified from the CU to the UE in advance with the RRC signaling. Whether the value is initialized or held may be defined in a standard, notified from the CU to the UE in advance, or notified from the CU to the UE together with a switching instruction. This can produce the same advantages as those according to the fifth embodiment.

The CU may notify the UE of the RRC parameter on the RLC with the L1/L2 signaling. Consequently, the parameter can be promptly notified to the UE.

Alternatively, the CU may notify the RRC parameter on the RLC with the MAC signaling. Since this enables multi-level modulations, the parameter can be notified with less number of symbols. With the HARQ retransmission control, the reliability of notifying the parameter is increased.

The target TRP may notify the CU of information indicating that delivery of the parameter has been verified, similarly as the fifth embodiment. The information may be notified when the parameter is notified with the MAC signaling. The CU may notify the UE of the switching instruction with the information. This can prevent a malfunction of the RLC caused by the undelivered parameter.

The CU may notify the UE of the switching with the L1/L2 signaling or the MAC signaling, similarly as the fifth embodiment. This can produce the same advantages as those according to the fifth embodiment.

The CU may transmit a notification of the parameter on the RLC a plurality of number of times or increase the transmission power, similarly as the fifth embodiment. Consequently, the reliability of notifying the parameter can be increased. The same holds true for the switching instruction from the CU to the UE.

The CU and the UE may stop transmitting and receiving the user data together with notification of the switching instruction. The CU and the UE may resume transmitting and receiving the user data after completion of switching the beam/TRP and transmitting and receiving the parameter on the RLC. This can prevent data from missing due to reconstruction of the RLC.

Application of the fourth modification can produce the same advantages as those according to the fifth embodiment, in the notification of the RRC parameter on the RLC to the UE.

The Sixth Embodiment

There is a technique called the carrier aggregation (CA) for aggregating and using a plurality of carriers as radio resources for communication. In the CA, a serving cell group of one PCell and one or more SCells is configured for one UE. Thus, the CA is set per cell. The eNB sets the CA to the UE by notifying a parameter per cell for performing the CA.

Under the New Radio (NR), it has been proposed that a base station (a 5G base station is referred to as a gNB in the Description) should communicate via beamforming for forming narrow beams using a plurality of antennas. For example, the gNB configures the antenna 408 illustrated in FIG. 4 with a multi-element antenna. The gNB forms a beam in a predetermined direction with a part of the multi-element antenna or all of the antennas. Forming the narrow beams can broaden the radio coverage.

If a cell performing the CA supports operations of a plurality of beams, setting the CA only with an identifier of the cell makes unclear which beams in the cell should be aggregated. Thus, the gNB can neither set the CA to the UE nor use many radio resources. Consequently, the UE cannot be provided with a high-speed and large-capacity communication service.

The sixth embodiment discloses a method for solving such problems.

The CA is set per beam. Here, one beam or a plurality of beams may be used. The gNB notifies the UE of which beam should be used in setting the SCell.

FIG. 12 illustrates the architecture for the CA that the gNB sets per beam. The gNB is configured with protocols of PDCP, RLC, MAC, and PHY. The PHY function may be divided into two. The two PHY functions are referred to as H-PHY and L-PHY.

Splitting the gNB into two units is proposed in 3GPP (see Non-Patent Document 7). The two units are referred to as the central unit (CU) and the distributed unit (DU). A plurality of the DUs are connected to the CU. For example, the CU having PDCP, RLC, MAC, and H-PHY is proposed in 3GPP. The DU having L-PHY is proposed in 3GPP. The TRPs may have the same functions as those of DUs. Bn denotes forming beams, where "n" is a natural number. The DU or the TRP forms one or more beams.

The gNB performs the CA for the UE using one primary component carrier (PCC) and one or more secondary component carriers (SCCs). A cell with application of the PCC is a PCell. A cell with application of the SCC is a SCell. To put it differently, the gNB performs the CA for the UE using one PCell and one or more SCells. Each cell separately includes the HARQ at the bottom of MAC. Aggregation is performed above the HARQ. Each of the cells separately includes functions below PHY.

When the CA is set per beam, which beam in the PCell or the SCell is used to perform the CA is set. In the example of FIG. 12, the gNB performs the CA for the UE, using a beam 1 of a TRP 1 of the PCell, a beam 2 of a TRP 2 of the PCell, beams 1 and 2 of a TRP 1 of the SCell, and a beam 1 of a TRP 2 of the SCell.

Setting the CA per beam allows a cell in which the beamforming is supported to be a cell for the CA. Thus, many radio resources are available for the UE, and high-speed and large-capacity communication becomes possible.

A method for setting the CA per beam is disclosed.

The RRC signaling is used to set the CA per beam. Information on the beams is provided, and the gNB notifies it to the UE with the RRC signaling. The information on the beams may be included in a message for setting the SCell. The information on the beams may be included in, for example, a message for the RRC Connection Reconfiguration. The information on the beams may be included in a parameter for adding and changing the SCell or releasing the SCell.

The information on the beams may be information with which the UE can identify the beams. For example when a dedicated-to-beam RS is transmitted with the beam, the UE can identify the beam upon receipt of the dedicated-to-beam RS. Here, the information on the beams includes a dedicated-to-beam RS (beam RS (BRS)) structure. For example, when an identifier is allocated to a beam and the beam identifier is associated with the dedicated-to-beam RS structure, the beam identifier may be used as the information on the beams. Beam indices renumbered by the number of beams to which the beam identifiers are allocated may be provided.

The gNB notifies the UE of information on these beams in association with the SCell to be used for the CA. The gNB notifies the UE of information on the beams that the UE monitor in the SCell. Upon receipt of the information, the UE can recognize the beams to be monitored in the SCell. The association between the SCell and the beams that are set by the RRC is maintained until it is set again.

The gNB activates or deactivates the SCell for the UE with the MAC control signaling. The UE considers the beam associated with the SCell and received with the RRC signaling as being activated or deactivated when the SCell is activated or deactivated with the MAC control signaling. The UE monitors the beam associated with the activated SCell. The UE detects the presence or absence of information addressed to its own UE by monitoring the beam. For example, upon receipt of a physical downlink control channel (PDCCH) of the beam, the UE detects the presence or absence of the scheduling information addressed to its own UE.

The UE performs synchronization upon receipt of a synchronization signal (SS) of the SCell that has been notified with the RRC signaling. Here, the UE performs synchronization by receiving the SS with any of the beams in the SCell. After the synchronization, the UE detects the beam to be monitored in the SCell, using at least one of the beam identifier and the BRS structure of the beam associated with the SCell notified with the RRC signaling. The UE receives a physical downlink control channel (PDCCH) of the beam to be monitored.

As an alternative method, the UE may perform synchronization upon receipt of a synchronization signal (SS) of the activated SCell notified with the MAC control signaling. Here, the UE performs synchronization by receiving the SS with any of the beams in the SCell. After the synchronization, the UE detects the beam to be monitored in the SCell, using at least one of the beam identifier and the BRS structure of the beam associated with the SCell notified with the RRC signaling. The UE receives a physical downlink control channel (PDCCH) of the beam to be monitored.

The gNB can notify the UE of the scheduling information using the PDCCH of the beam. Consequently, the gNB can notify the UE of which beam is used to perform communication. The UE can recognize which beam should be monitored and which beam should be used to perform communication.

If only the SCell is notified as conventionally done, it is necessary to set which beam in the SCell is used after access to the SCell. In addition to the process of accessing the SCell, a process of selecting a beam to be used is required. Thus, it takes time until the CA is started.

As disclosed in the sixth embodiment, identifying which beam is used to perform the CA in setting the CA enables reduction in the time until the CA is started. Since the CA can be started earlier, a larger-capacity communication becomes possible.

The UE may measure each beam of the SCell in advance before setting the CA as a method for the gNB to recognize which beam is to be used for communication. The UE should notify the gNB of a result of the measurement. The notification may be made, for example, periodically, according to an event trigger, or in response to a request from the gNB.

FIGS. 13 and 14 illustrate an example sequence for setting the CA per beam with the RRC signaling. FIGS. 13 and 14 are connected across a location of a border BL521. FIGS. 13 and 14 illustrate that the gNB performs the CA for the UE using the PCell and the SCell. FIGS. 13 and 14 also illustrate that the PCell includes beams 1 and 2 and the SCell includes beams 1 to 3. In Step ST5201, the UE communicates with the gNB via the beam 1 of the PCell.

In Step ST5202, the gNB notifies, via the beam 1 of the PCell, the UE of setting information of the SCell for the CA and information on the beam associated with the SCell. The RRC-dedicated signaling is used for this notification. Since the RRC-dedicated signaling is used for notifying the setting information of the SCell for the CA under the conventional LTE, adding information on the beam to the message will suffice. The complexity in the control for setting each beam can be reduced.

In Step ST5202, the beam to be notified in association with the SCell should be a beam for communicating with the UE. The beam to be notified in association with the SCell should be a beam via which the UE preferably monitors a physical downlink control channel. The beam to be notified in association with the SCell should be a beam preferably accessed by the UE. Consequently, the gNB can notify the UE of which beam in the SCell is used for communication. The UE can identify the beam in the SCell for communication.

Each beam in the SCell periodically transmits the SS (see Steps ST5203 to ST5205). Each beam in the SCell periodically transmits the BRS (see Steps ST5206 to ST5208). The BRS may be transmitted with at least one of frequency resources and time resources that have a predetermined pattern In Step ST5209, the gNB notifies activation/deactivation information of the SCell. The MAC control signaling is used for this notification. The activation/deactivation information is included in MAC CEs to be notified. In Step ST5210, the UE receives the SS of the activated SCell to perform synchronization. In Step ST5211, the UE detects the beam to be monitored in the SCell, using at least one of the beam identifier and the BRS structure of the beam associated with the SCell notified with the RRC-dedicated signaling. In Step ST5212, the UE receives the physical downlink control channel (PDCCH) of the beam to be monitored.

After notifying the activation information of the SCell via the beam 1 of the PCell in Step ST5209, the gNB notifies the UE of the downlink scheduling information from the beam 1 of the SCell in Step ST5213. An L1/L2 control signal is used for this notification. In Step ST5214, the gNB transmits the downlink data to the UE according to the scheduling information. In Step ST5214, the UE receives the downlink data from the beam 1 of the SCell, according to the scheduling information received from the beam 1 of the SCell in Step ST5213.

The UE, which preferably performs uplink transmission through the SCell, transmits the PRACH via the beam 1 of the SCell and performs the RA procedure with the gNB, in Step ST5215. The RA procedure may be performed according to an instruction in the physical downlink control channel (PDCCH). In Step ST5216, the UE starts to transmit the uplink data to the beam 1 of the SCell. The UE which preferably performs uplink transmission through the SCell may transmit not the PRACH but the SR. Such transmission is effective, for example, when synchronization has been performed in uplink or when there is no need to obtain the TA again. When the gNB already recognizes the presence of the uplink data in the UE, the gNB notifies the UE of the uplink scheduling information from the beam 1 of the SCell. The UE transmits the uplink data to the gNB according to the scheduling information.

The UE may transmit the PRACH after detecting a beam for communicating with the UE. Here, the PRACH may be transmitted to the beam detected after the process in Step ST5211. Alternatively, the UE may transmit the PRACH after receiving the PDCCH and before receiving the downlink scheduling information. Here, the PRACH may be transmitted to the beam detected after the process in Step ST5212. The uplink data communication can be started earlier.

Next, an example sequence in which the gNB changes, in the SCell, a beam for communicating with the UE is disclosed with reference to FIG. 14. In Step ST5217, the gNB determines to change the beam for communicating with the UE. For example, an RRC function unit of the gNB may make the determination. The previously disclosed method for the gNB to recognize with which beam communication is performed should be applied as a method for the gNB to determine into which beam the beam for communicating with the UE should be changed. In Step ST5218, the gNB notifies, via the beam 1 of the PCell, the UE of the setting information of the SCell for the CA and the information on the beam associated with the SCell. The information on the beam is information after change. The RRC-dedicated signaling is used for this notification.

Although it is disclosed that the gNB notifies, via the beam 1 of the PCell, the UE of the setting information of the SCell for the CA and information on the beam after change, such information may be notified via the beam 1 of the SCell. The gNB may determine which communication quality is superior and give the notification via the beam with the superior communication quality.

When the information is notified via the beam of the PCell, the gNB can notify the UE of the setting information of the SCell for the CA and the information on the beam after change without being subject to any influence of sudden degradation in the communication quality of the beam of the SCell. The UE can change a beam into a beam notified from the gNB.

For example, if the SCell is operated at a higher frequency with a narrow coverage, blocking or movement of the UE easily causes sudden deterioration in a communication quality. Here, the gNB should give the notification via the beam of the PCell.

Each beam in the SCell periodically transmits the SS (see Steps ST5219 to ST5221). Each beam in the SCell periodically transmits the BRS (see Steps ST5222 to ST5224). The BRS may be transmitted with at least one of frequency resources and time resources that have a predetermined pattern.

In Step ST5225, the gNB notifies the activation/deactivation information of the SCell. The MAC control signaling is used for this notification. The activation/deactivation information is included in MAC CEs to be notified. This notification may be omitted when there is no change in the activation/deactivation information of the SCell. In Step ST5226, the UE receives the SS of the activated SCell to perform synchronization. This process may be omitted when there is no change in the activated SCell or when the synchronization has already been performed.

In Step ST5227, the UE detects the beam to be monitored in the SCell, using at least one of the beam identifier and the BRS structure of the beam after change that is associated with the SCell notified with the RRC signaling. In Step ST5228 the UE receives the physical downlink control channel (PDCCH) of the beam to be monitored.

In Step ST5229, the gNB notifies the UE of the downlink scheduling information from the beam 2 of the SCell. An L1/L2 control signal is used for this notification. In Step ST5230, the gNB transmits the downlink data to the UE according to the scheduling information. In Step ST5230, the UE receives the downlink data from the beam 2 of the SCell, according to the scheduling information received from the beam 2 of the SCell in Step ST5229.

The UE, which preferably performs the uplink transmission through the SCell, transmits the PRACH via the beam 2 of the SCell and performs the RA procedure with the gNB, in Step ST5231. In Step ST5232, the UE starts to transmit the uplink data to the beam 2 of the SCell. Not the PRACH but the SR may be transmitted. Such transmission is effective, for example, when synchronization has been performed in uplink or when there is no need to obtain the TA again. When the gNB already recognizes the presence of the uplink data in the UE, the gNB notifies the UE of the uplink scheduling information from the beam 2 of the SCell. The UE transmits the uplink data to the gNB according to the scheduling information.

Consequently, the beam of the SCell for communicating with the UE can be changed from the beam 1 to the beam 2.

According to the method disclosed in the sixth embodiment, the gNB and the UE can identify the beam of the SCell to communicate with each other. The gNB can set the CA to the UE with the beam of the PCell and the beam of the SCell. The radio resources to be used can be increased by setting the CA to the UE by the gNB. Consequently, the UE can be provided with a high-speed and large-capacity communication service.

The UE need not execute a process of selecting a beam for communication after receiving the SS of the SCell. The UE need not notify the gNB of which beam of the SCell the UE receives. Thus, the UE can identify the beam for communication earlier, and perform processes of adding and correcting the SCell with lower latency.

The sixth embodiment provides, for example, a communication system including: a communication terminal device; and a base station device that performs radio communication with the communication terminal device via a radio beam, wherein a cell configured by the base station device is spatially separated by a plurality of radio beams being served by the base station device, and the base station device sets carrier aggregation per radio beam. The plurality of radio beams may be formed by a plurality of DUs (i.e., TRPs) as exemplified in FIG. 8 or by one DU.

According to this structure, the carrier aggregation is set per radio beam. Thus, a cell in which the beamforming is supported can be a cell for the carrier aggregation, and the radio resources to be used can be increased. Consequently, the high-speed and large-capacity communication service can be provided.

Here, the structure above can be variously modified as described in the first and second modifications.

The First Modification of the Sixth Embodiment

To reserve broadband frequency resources, the NR requires operations at a higher frequency bandwidth. At the higher frequency bandwidth, the blocking between an antenna of the gNB and the UE easily causes abrupt degradation in the channel quality. Since the propagation loss increases at the higher frequency bandwidth, beams with narrow coverages are used. In operating the beams with the narrow coverages, the movement of the UE involves frequent changes in the beams.

The method disclosed in the sixth embodiment requires the RRC signaling in setting and changing the beams to be monitored by the UE in the CA. Thus, it takes time to set and change the beams to be aggregated, which increases the latency until communication with a desired beam. Increase in the latency causes no time to perform the processes of setting and changing the beams in response to the blocking and the movement of the UE, which may lead to discontinuity in communication with the SCell.

The first modification discloses a method for solving such a problem.

The gNB notifies, with the RRC signaling, the UE of a beam that can be formed by the SCell. In the sixth embodiment, the beam to be monitored by the UE is notified with the RRC signaling. In this first modification, the beam that can be formed by the SCell is notified. In other words, the gNB notifies the UE of a beam that can be formed as the CA in a SCell that can be set as the CA. This may be notified separately to each UE. The information on the beams described in the sixth embodiment should be applied as information on the beams to be notified.

The gNB notifies the UE of the activation/deactivation information of the SCell with the MAC signaling. The gNB should notify the activation/deactivation information of the SCell notified with the RRC signaling.

Consequently, the UE can recognize which SCell is to be monitored. However, this alone obscures which beam of the SCell the communication should be performed with.

The gNB notifies, with the MAC signaling, the UE of the activation/deactivation information of the beam to be formed by the SCell. The gNB may notify the activation/deactivation information of the beam to be formed by the SCell activated with the MAC signaling. The gNB may notify not the activation/deactivation information of the beam to be formed by the SCell but information on the beam to be activated. The information on the beam includes an identifier of the beam.

The activation/deactivation settings of the beam should be changed when the beam performing the CA is changed. The gNB should notify the UE of the activation/deactivation information of the beam after change. The activation/deactivation information of the beam to be formed by the SCell may be provided as MAC control information. The activation/deactivation information of the beam to be formed by the SCell to be activated may be provided.

The activation/deactivation information of the SCell and the activation/deactivation information of the beam may be combined as one MAC CE. The amount of information can be reduced, and a process of setting the CA can be simplified.

The activation/deactivation information of the SCell and the activation/deactivation information of the beam may be different MAC CEs. Consequently, only the MAC CE of the activated/deactivated beam can be used in setting not the CA but change of the beam in the SCell. The amount of information in changing the beam can be reduced, and a process of changing the beam can be simplified.

An example where the activation/deactivation information of the beam is a MAC CE is disclosed. The maximum value of the number of beams that can be formed by one cell is predetermined. Beam indices from 0 to the maximum value for the beams formed by the SCell are assigned to information on the beams when the beams formed by the SCell are notified with the RRC signaling. In other words, the beams are renumbered. The beam indices are associated with the beam IDs and the BRSs. For example, one cell can form 7 beams at a maximum. Indices from a beam #0 to a beam #6 are assigned to the beams formed by the cell.

FIG. 15 illustrates an example of MAC CEs of the activation/deactivation information of the beams. FIG. 15 illustrates that one cell can form 7 beams at a maximum. A MAC CE consists of 8 bits. R denotes a reserved bit. B0 to B6 denote bits indicating activation or deactivation for each beam. For example, 1 may indicate activation, and 0 may indicate deactivation. B0 to B6 are beam indices for respective beams that are set by the RRC signaling.

Each piece of the activation/deactivation information of the beams of the SCell consists of 8 bits. These pieces of information are concatenated in the order of indices of the SCell. The activation/deactivation information of beams of the deactivated SCell may be on all the deactivated beams. Alternatively, only pieces of the activation/deactivation information of the beams of the SCell to be activated may be concatenated. The concatenating method may be statically predetermined in a standard and others. Both the gNB and the UE can recognize the method.

As such, setting the activation/deactivation information of the beams as MAC CEs enables the gNB to notify, with the MAC signaling, the UE of the activation/deactivation information of the beams to be formed by the SCell.

FIGS. 16 and 17 illustrate an example sequence for setting the CA per beam with the MAC signaling. FIGS. 16 and 17 are connected across a location of a border BL541. Since the sequence illustrated in FIGS. 16 and 17 includes the same steps as those of the sequence illustrated in FIGS. 13 and 14, the same step numbers are assigned to the same Steps and the common description thereof is omitted.

In Step ST5401, the gNB notifies, via the beam 1 of the PCell, the UE of the setting information of the SCell for the CA and information on the beam associated with the SCell. The RRC-dedicated signaling is used for this notification. In Step ST5401, the beam to be notified in association with the SCell should be a beam that can be formed in the CA for the UE. As such, the gNB can notify the UE of which beam in the SCell can be formed in the CA.

In Step ST5402, the gNB notifies the UE of the activation/deactivation information of the SCell. The MAC control signaling is used for this notification. The activation/deactivation information is included in MAC CEs to be notified. In Step ST5403, the gNB notifies the UE of the activation/deactivation information of the beams of the activated SCell. The MAC control signaling is used for this notification. The activation/deactivation information is included in MAC CEs to be notified.

In Step ST5404, the UE receives the SS of the activated SCell to perform synchronization. In Step ST5405, the UE receives the BRS of each beam and detects a beam to be monitored in the SCell from information on the beams that can be formed by the SCell, wherein the information has been notified with the RRC signaling (specifically, at least one of the beam identifiers and the BRS structures, and the beam indices) and from information, which has been notified with the MAC signaling, on the beams to be activated (specifically, the beam indices). In Step ST5406, the UE receives the physical downlink control channel (PDCCH) of the beam to be monitored.

Consequently, the gNB can communicate with the UE via the beam 1 of the SCell.

Next, an example sequence in which the gNB changes, in the SCell, a beam for communicating with the UE is disclosed with reference to FIG. 17. In Step ST5407, the gNB determines to change the beam for communicating with the UE. For example, a MAC function unit of the gNB may make the determination. In Step ST5408, the gNB notifies, via the beam 1 of the PCell, the UE of the activation/deactivation information of the beam after change. The information is included in a MAC CE, and notified with the MAC signaling.

The gNB may notify, via the beam 1 of the SCell, the UE of the activation/deactivation information of the beam after change. The gNB may determine which communication quality is superior and give the notification via the beam with the superior communication quality.

When the information is notified via the beam of the PCell, the gNB can notify the UE of the setting information of the SCell for the CA and the information on the beam after change without being subject to any influence of sudden degradation in the communication quality of the beam of the SCell. The UE can change a beam into the beam notified from the gNB.

In Step ST5409, the UE receives the BRS of each beam and detects a beam to be monitored in the SCell from information on the beams that can be formed by the SCell, wherein the information has been notified with the RRC signaling (specifically, at least one of the beam identifiers and the BRS structures, and the beam indices) and from information, which has been notified with the MAC signaling, on the beams to be activated after change (specifically, the beam indices). In Step ST5410, the UE receives the physical downlink control channel (PDCCH) of the beam to be monitored.

Consequently, the beam of the SCell for communicating with the UE can be changed from the beam 1 to the beam 2.

The method disclosed in the first modification enables the beam to be activated or deactivated with the MAC signaling.

Thus, the latency from measuring the beams by the UE until start of the CA with the beams with superior communication quality can be reduced. Thus, it is possible to reduce a problem with failing to start communication via the SCell that is caused by sudden deterioration in the communication quality due to the blocking and the movement of the UE.

Moreover, the latency from measuring the beams by the UE until change into the beams with superior communication quality can be reduced. Thus, it is possible to reduce interruption of communication via the SCell that is caused by sudden deterioration in the communication quality due to the blocking and the movement of the UE.

As such, the latency until communication with a desired beam can be reduced without requiring time to set and change beams. Thus, the processing time for setting and changing the beams can be shortened, and the incapability to start communication and the interruption of communication via the SCell that are caused by the blocking and the movement of the UE can be reduced.

The Second Modification of the Sixth Embodiment

The second modification discloses another method for solving the problems described in the first modification.

The gNB notifies, with the RRC signaling, the UE of a beam that can be formed by the SCell. In the sixth embodiment, the beam to be monitored by the UE is notified with the RRC signaling. In this second modification, the beam that can be formed by the SCell is notified. In other words, the gNB notifies the UE of a beam that can be formed as the CA in a SCell that can be set as the CA. This may be notified separately to each UE. The information on the beams described in the sixth embodiment should be applied to information on the beams to be notified.

The gNB notifies the UE of the activation/deactivation information of the SCell via an L1/L2 control signal. The gNB should notify the activation/deactivation information of the SCell that has been notified with the RRC signaling. Notification from the gNB to the UE via the L1/L2 control signal enables notification of whether to activate or deactivate the SCell with lower latency.

The MAC signaling may be applied as an alternative method for the gNB to notify the UE of the activation/deactivation information of the SCell. The methods disclosed in the first modification of the sixth embodiment should be applied. Here, the retransmission control enables a notification at a lower reception error rate.

Consequently, the UE can recognize which SCell is to be monitored. However, this alone obscures with which beam of the SCell the communication should be performed.

The gNB notifies, via the L1/L2 control signal, the UE of the activation/deactivation information of the beam to be formed by the SCell. The gNB may notify the activation/deactivation information of the beam to be formed by the SCell activated with the L1/L2 control signal. The gNB may notify not the activation/deactivation information of the beam to be formed by the SCell but information on the beam to be activated. The information on the beam includes an identifier of the beam.

The activation/deactivation settings of the beam should be changed when the beam performing the CA is changed. The gNB should notify the UE of the activation/deactivation information of the beam after change. The activation/deactivation information of the beam to be formed by the SCell may be provided as L1/L2 control information. The activation/deactivation information of the beam to be formed by the SCell to be activated may be provided.

At least one of the activation/deactivation information of the SCell and the activation/deactivation information of the beam to be formed by the SCell may be DCI. The gNB notifies the UE of the information via the downlink. The activation/deactivation information of the SCell and the activation/deactivation information of the beam may be included in one piece of DCI. The amount of information can be reduced, and the process of setting the CA can be simplified.

The activation/deactivation information of the SCell and the activation/deactivation information of the beam may be different pieces of DCI. Consequently, only the DCI of the activated/deactivated beam can be used not in the setting of the CA but in the setting at the change of the beam in the SCell. The amount of information in changing the beam can be reduced, and the process of changing the beam can be simplified.

The DCI may have a new format for these pieces of information.

Beam indices may be used as the activation/deactivation information of the SCell and the activation/deactivation information of the beam. Bit maps may be used similarly as the first modification of the sixth embodiment. The amount of information can be reduced.

A method for notifying the activation/deactivation information of the beam is disclosed.

The gNB notifies the UE of the activation/deactivation information of the beam with the L1/L2 control information of the SCell. The gNB may notify information on the beam to be activated. The UE receives the beam of the activated SCell. The UE receives, for example, a beam with higher received power or higher reception quality. The UE identifies a beam ID from the BRS of the received beam, and notifies the gNB of the identified beam ID. Alternatively, the UE may notify the gNB of the beam ID through transmission of a PRACH with the received beam and start of the RA procedure. The UE monitors the beam.

Upon receipt of the beam ID from the UE, the gNB notifies the UE of the beam to be activated for the UE via the L1/L2 control signal of the beam. The UE monitors the activated beam. The UE receives a physical downlink control channel of the activated beam. Here, one beam or a plurality of beams may be used. Consequently, the UE can recognize the activation/deactivation information of the beam of the SCell.

According to the aforementioned method, after the gNB determines to start the CA and notifies the UE to activate the SCell performing the CA, the UE and the gNB perform a process of identifying a beam. Thus, latency occurs until the UE is ready to communicate with a cell to which the CA is actually set.

Another method for notifying the activation/deactivation information of the beam is disclosed.

The gNB notifies the UE of the activation/deactivation information of the beam of the SCell with the L1/L2 control information of the PCell. The gNB may notify the activation/deactivation information of the beam of the SCell to be activated. The gNB may notify information on the beam to be activated of the SCell. The UE monitors the beam of the SCell that has been notified from the PCell. The UE receives a physical downlink control channel of the activated beam. Here, one beam or a plurality of beams may be used. Consequently, the UE can recognize the activation/deactivation information of the beam of the SCell.

For example, information on the activated SCell and information on the beam to be activated in the SCell may be included in the same DCI to be associated with each other. Simultaneous notification of these pieces of information from the gNB to the UE enables the UE to receive the BRS in synchronization with the SCell, then to identify the beam to be monitored and to receive a physical downlink control channel of the beam. The UE can monitor the beam of the SCell in a shorter period of time.

The DCI including information on the beam of the SCell may be mapped to the physical downlink control channel of the PCell. The DCI including information on the PCell may be different from the DCI including information on the SCell, and the DCI including information on the SCell may include information on the beam.

The methods for notifying the activation/deactivation information of the two beams may be combined. An example of such combination is disclosed.

The gNB notifies the UE of information on one beam to be activated of the SCell with the L1/L2 control information of the PCell. The information on the activated SCell and the information on the beam to be activated in the SCell may be included in the same DCI to be associated with each other. The UE monitors the one beam of the SCell that has been notified from the PCell. The UE receives a physical downlink control channel of the activated one beam.

The gNB notifies the UE of information on the beam to be activated, with the L1/L2 control information of the one beam of the SCell. Alternatively, the gNB may notify the activation/deactivation information of the beam of the SCell. Here, one beam or a plurality of beams may be used. The UE monitors the activated beam. The UE receives a physical downlink control channel of the activated beam.

According to this method, the UE need not transmit the uplink signal to the gNB to receive the activation/deactivation information of the beams in the SCell. Thus, the UE can identify earlier which beam in the SCell is used. Moreover, the power consumption of the UE can be reduced.

FIGS. 18 to 20 illustrate an example sequence for setting the CA per beam with the L1/L2 control signal, and an example of the combined methods for notifying the activation/deactivation information of the two beams. FIGS. 18 to 20 are connected across locations of borders BL551 and BL552. Since the sequence illustrated in FIGS. 18 to 20 includes the same steps as those of the sequence illustrated in FIGS. 16 and 17, the same step numbers are assigned to the same Steps and the common description thereof is omitted.

In Step ST5501, the gNB notifies the UE of the activation/deactivation information of the SCell. An L1/L2 control signal is used for this notification. The activation/deactivation information is included in the DCI to be notified. In Step ST5502, the gNB notifies the UE of the activation/deactivation information of one beam of the activated SCell. An L1/L2 control signal is used for this notification. The activation/deactivation information is included in the DCI to be notified.

In Step ST5503, the UE receives the SS of the activated SCell to perform synchronization. In Step ST5504, the UE receives the BRS of each beam and detects a beam to be monitored in the SCell from information on the beams that can be formed by the SCell, wherein the information has been notified with the RRC signaling (specifically, at least one of the beam identifiers and the BRS structures, and the beam indices) and from information, which has been notified via the L1/L2 control signal from the PCell, on the one beam to be activated (specifically, the beam index). In Step ST5505, the UE receives the physical downlink control channel (PDCCH) of one beam to be monitored.

Consequently, the gNB can communicate with the UE via the beam 1 of the SCell.

With reference to FIG. 19, the gNB notifies the UE of the activation/deactivation information of the beam of the SCell via the beam 1 of the SCell in Step ST5506. An L1/L2 control signal is used for this notification. The activation/deactivation information is included in the DCI to be notified.

In Step ST5507, the UE receives the BRS of each beam and detects a beam to be monitored in the SCell from information on the beams that can be formed by the SCell, wherein the information has been notified with the RRC signaling (specifically, at least one of the beam identifiers and the BRS structures, and the beam indices) and from information, which has been notified via the L1/L2 control signal from the SCell, on the beams to be activated of the SCell (specifically, the beam indices). In Step ST5508, the UE receives the physical downlink control channel (PDCCH) of the beam to be monitored.

Consequently, the gNB can communicate with the UE via the beam 2 of the SCell.

Next, an example sequence when the gNB changes a beam for communicating with the UE in the SCell is disclosed with reference to FIG. 20. In Step ST5509, the gNB determines to change the beam for communicating with the UE. For example, a PHY function unit of the SCell of the gNB may make the determination. In Step ST5510, the gNB notifies the UE via the beam 1 of the SCell of the activation/deactivation information of the beam after change. The information is included in the DCI and notified via the L1/L2 control signal.

The gNB may notify the UE of the activation/deactivation information of the beam after change via the beam 1 of the PCell. The gNB may determine which communication quality is superior and give the notification via the beam with the superior communication quality.

When the information is notified via the beam of the PCell, the gNB can notify the UE of information on the beam after change without being subject to any influence of sudden degradation in the communication quality of the beam of the SCell. The UE can change a beam into the beam notified from the gNB.

In Step ST5511, the UE receives the BRS of each beam and detects a beam to be monitored in the SCell from information on the beams that can be formed by the SCell, wherein the information has been notified with the RRC signaling (specifically, at least one of the beam identifiers and the BRS structures, and the beam indices) and from information, which has been notified via the L1/L2 control signal from the SCell, on the beams to be activated after change (specifically, the beam indices). In Step ST5512, the UE receives the physical downlink control channel (PDCCH) of the beam to be monitored.

Consequently, the beam of the SCell for communicating with the UE can be changed from the beam 2 to the beam 3.

Since the L1/L2 control signal is used to notify information on the beams, the beams to be aggregated can be set and changed more dynamically than those according to the sixth embodiment and the first modification of the sixth embodiment. Thus, the time required for setting and changing the beams, and the latency until communication with a desired beam can be further reduced. Consequently, the processing time for setting and changing the beams can be further shortened, and the incapability to start communication and the interruption of communication via the SCell that are caused by the blocking and the movement of the UE can be reduced.

According to the aforementioned method, the best beam need not be identified and set as a beam of the SCell to be notified via the PCell. The beam with a communicable communication quality should be set. After the CA with the beam of the SCell is started, the best beam should be set in changing the beam to be notified via the SCell. Since the beam of the SCell is measured after start of communication with the SCell, the measurement process in the UE can be simplified, and the power consumption can be reduced.

It is disclosed that the gNB notifies the UE of information on one beam to be activated of the SCell with the L1/L2 control information of the PCell according to the aforementioned method. The gNB may notify not limited to the information on the one beam to be activated of the SCell but a plurality of pieces of information on beams. The gNB may notify the UE of the plurality of pieces of information on beams to be activated of the SCell with the L1/L2 control information of the PCell.

The UE monitors a plurality of beams of the SCell that have been notified from the PCell. The UE receives physical downlink control channels of the activated plurality of beams.

The gNB notifies the UE via the L1/L2 control signal of one of the plurality of beams of the SCell of information on the beam to be activated. Alternatively, the gNB may notify the activation/deactivation information of the beam of the SCell. Here, one beam or a plurality of beams may be used. The UE can receive an L1/L2 control signal to be transmitted via one of the plurality of beams since the UE monitors the plurality of activated beams.

Application of a plurality of beams as beams to be activated of the SCell enables notification of information on the beams to be activated with another beam even when communication quality of some of the beams is deteriorated. A stable communication with high reliability becomes possible.

The methods disclosed from the sixth embodiment to the second modification of the sixth embodiment may be appropriately combined. The gNB notifies the UE of, for example, the activation/deactivation information of the SCell via the PCell with the MAC signaling and information on one beam to be activated of the activated SCell via the PCell with the MAC signaling. And then, the UE starts to communicate via the one beam to be activated of the activated SCell to notify the activation/deactivation information of the beam of the SCell via the SCell using the L1/L2 control signal.

Notifying information on the SCell to be activated and the beam to be activated with the MAC signaling can reduce the reception error rate in the UE. Since the CA can be reliably set, malfunctions between the gNB and the UE can be reduced. Notifying the activation/deactivation information of the beam of the SCell via the L1/L2 control signal enables dynamic notification to the UE with lower latency. Even when beams appropriate for communication are frequently changed due to the blocking in an operation at a higher frequency or the movement of the UE, the beams performing the CA can be set and changed with lower latency.

Such appropriate combinations of the methods disclosed from the sixth embodiment to the second modification of the sixth embodiment enable the beams performing the CA to be set and changed with lower latency according to an ever-changing radio propagation state.

The Seventh Embodiment

The dataflow in the LTE is bearer-based from the core network (CN) to the radio access network (RAN). A bearer is set between nodes (see Non-Patent Document 1). Under the LTE, an EPS bearer is mapped one-to-one to a data radio bearer (DRB).

However, what is being discussed is that the dataflow in the 5G is under the flow-based control between the CN and the RAN and under the bearer-based control in the RAN (see 3GPP R2-166892 (hereinafter referred to as "Reference 2")). When the control between the CN and the RAN is flow-based, neither the EPS bearer conventionally set between a P-GW and the UE nor the E-RAB conventionally set between the S-GW and the UE is set. However, since the RAN maintains the bearer-based control, the DRB is set as a radio bearer for data.

In 5G, the use of QoS flow rather than service flow is studied (see Reference 2). 3GPP has decided to use, as a standard, a QoS marking per packet for the QoS flows. The QoS marking is set by a scalar value. Thus, even different services/sessions with the same QoS can be categorized into the same QoS flow. What is also being studied is that a plurality of QoS flows can be mapped to one DRB.

Thus, the gNB, which is a node of the RAN, maps traffics from one or more different protocol data unit (PDU) sessions to one DRB. The gNB sets the DRB according to the QoS of the traffics from the PDU sessions. The gNB maps data from the PDU sessions to the set DRB.

The CN in the 5G is hereinafter referred to as a NG-CN. Setting of the dual connectivity (DC) by the gNB being served by the NG-CN is discussed. The DC is set per bearer. The DC supports three bearer types. The bearer types are a Master Cell Group (MCG) bearer, a Secondary Cell Group (SCG) bearer and a split bearer (see Non-Patent Document 1). In the DC under the conventional LTE, the master eNB (MeNB) requires bearer setting of the secondary eNB (SeNB).

An E-RAB parameter has been used in a conventional request for setting a bearer. However, the E-RAB is eliminated in the NG-CN under the 5G. Thus, the E-RAB parameter cannot be used to request setting of the bearer in the DC. This creates a problem of obscuring a method for setting the DC (for example, a method for requesting settings of a bearer from the master gNB (MgNB) to the secondary gNB (SgNB) and a method for setting a bearer for the DC in the SgNB).

The seventh embodiment discloses a method for solving such a problem.

The SgNB sets a bearer for the DC with information on the QoS of a PDU session. The MgNB requests the SgNB to set a bearer with information on the QoS that is included in the information on the PDU session notified from the NG-CN (CP). Notification of information on the PDU session from the NG-CN (CP) to the gNB in establishing the PDU session is studied in 3GPP. Notification of context of the PDU session as the information on the PDU session and inclusion of information on the QoS in the PDU session context are also studied in 3GPP (see Non-Patent Document 6). Such information on the QoS that is included in the information on the PDU session may be used.

The SgNB sets the DRB for the DC with the information on the QoS in the PDU session context that is notified together with the bearer setting request from the MgNB or that is included in a bearer setting request message to be notified. In setting the split bearer, the MgNB may change a value of the information on the QoS in the PDU session context, and notify the SgNB of the value after change. The SgNB should set the DRB for the DC with a bearer on the MgNB side and a bearer on the SgNB side to satisfy the QoS required for the PDU session.

The MgNB may notify the SgNB of a session identifier of the PDU session performing the DC. The MgNB should notify the PDU session identifier in association with information on the QoS of the PDU session. The PDU session identifier may be notified together with the bearer setting request or included in a bearer setting request message to be notified.

Notification of the PDU session identifier performing the DC enables the SgNB to recognize which PDU session in the NG-CN is used for the DC. The SgNB can map between the PDU sessions to perform the DC and the DRBs.

The following parameters are proposed in 3GPP as examples of the information on the QoS in the PDU session context (see Non-Patent Document 6). Information on the QoS of these may be used.

(1) A flow priority indicator;
(2) a flow priority level;
(3) a packet priority indicator;
(4) a packet discard priority indicator;
(5) the maximum flow bit rate;
(6) a guaranteed flow bit rate;
(7) a session bit rate; and
(8) a QoS indicator.

A QCI may be provided as the information on the QoS in the information on the PDU session. Information on allowable latency may be provided as the information on the QoS in the information on the PDU session. The MgNB may request the SgNB to set a bearer with QCI information and the information on allowable latency that are included in the information on the PDU session that is notified from the NG-CN (CP).

As previously described, the DRB may include a plurality of PDU sessions. Thus, the DRB to which the DC is set may include a plurality of PDU sessions. Here, the MgNB should notify the SgNB of information on the QoS in a plurality of PDU session contexts of the plurality of PDU sessions. The SgNB sets the DRB for the DC with the information on the QoS in the plurality of PDU session contexts. The information has been received from the MgNB.

FIG. 21 illustrates a method for setting the DC (an SCG bearer) according to the seventh embodiment. The state of (a) to the left of FIG. 21 may be a state in setting an MCG bearer using the MgNB or a state before the DC is set. The state of (b) to the right of FIG. 21 may be a state in setting an SCG bearer using the SgNB, or a state in which the DC (SCG bearer) has been set.

A NG-UPF denotes a function of U-Plane of the NG-CN. FIG. 21 illustrates the downlink. The state of (a) illustrates settings of two PDU session flows from the NG-UPF to the MgNB. The two PDU session flows are of PDU sessions #1 and #2. The MgNB sets and maps one DRB #M1 to the two PDU sessions.

As illustrated in the state of (b), setting of the DC (SCG bearer) will switch the MCG bearer to the SCG bearer. Since the DC is set per bearer, a DRB #S1 is set to the SgNB, and the DRB #M1 of the MgNB is switched to the DRB #S1 of the SgNB. Thus, all the PDU sessions mapped to the DRB #M1 of the MgNB are mapped to the DRB #S1.

With setting of the DC (SCG bearer), the NG-UPF path-switches all the PDU sessions mapped to the DRB #M1 from the MgNB to the SgNB. The DC is set among the NG-CN, the gNB and the UE.

Figure 22:
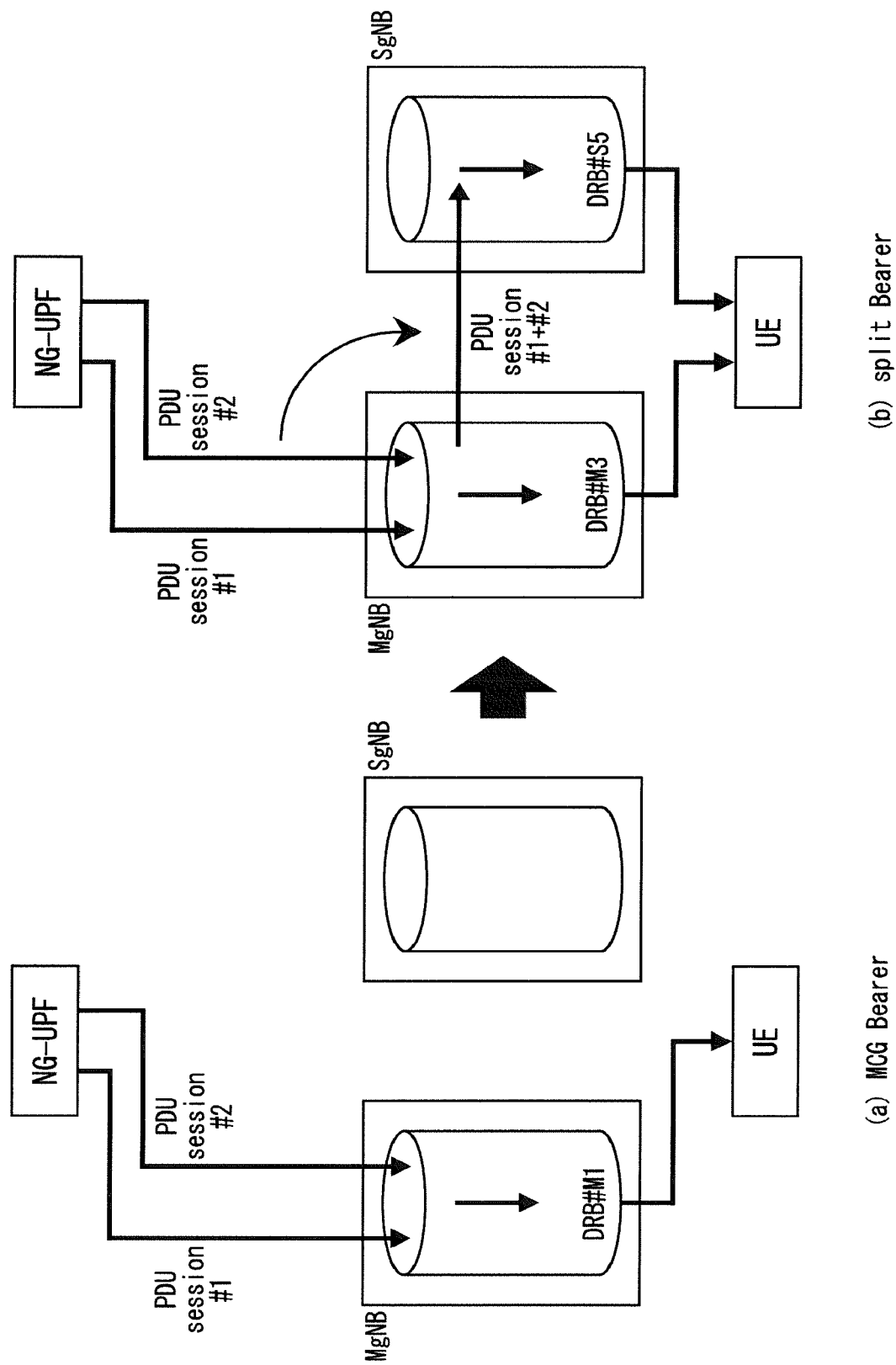
FIG. 22 illustrates a method for setting the DC (a split bearer) according to the seventh embodiment.

FIG. 22 illustrates a method for setting the DC (a split bearer) according to the seventh embodiment.

The state of (a) to the left of FIG. 22 may be a state in setting the MCG bearer using the MgNB or a state before the DC is set. Since the state of (a) is the same as the state of (a) in FIG. 21, the description thereof is omitted. The state of (b) to the right of FIG. 22 may be a state in setting the split bearer using the SgNB or a state in which the DC (split bearer) has been set.

As illustrated in the state of (b), setting of the DC (split bearer) will switch the MCG bearer to the split bearer. Since the DC is set per bearer, the DRB #M1 of the MgNB is split into a DRB #M3 set by the MgNB and a DRB #S5 set by the SgNB. Thus, all the PDU sessions mapped to the DRB #M1 of the MgNB are split into the DRB #M3 and the DRB #S5, and mapped thereto.

When the DC (split bearer) is set, the NG-UPF need not path-switch all the PDU sessions mapped to the DRB #M1 from the MgNB to the SgNB but may maintain the PDU sessions in the MgNB. Thus, the DC (split bearer) is set between the gNB and the UE.

Figure 23:
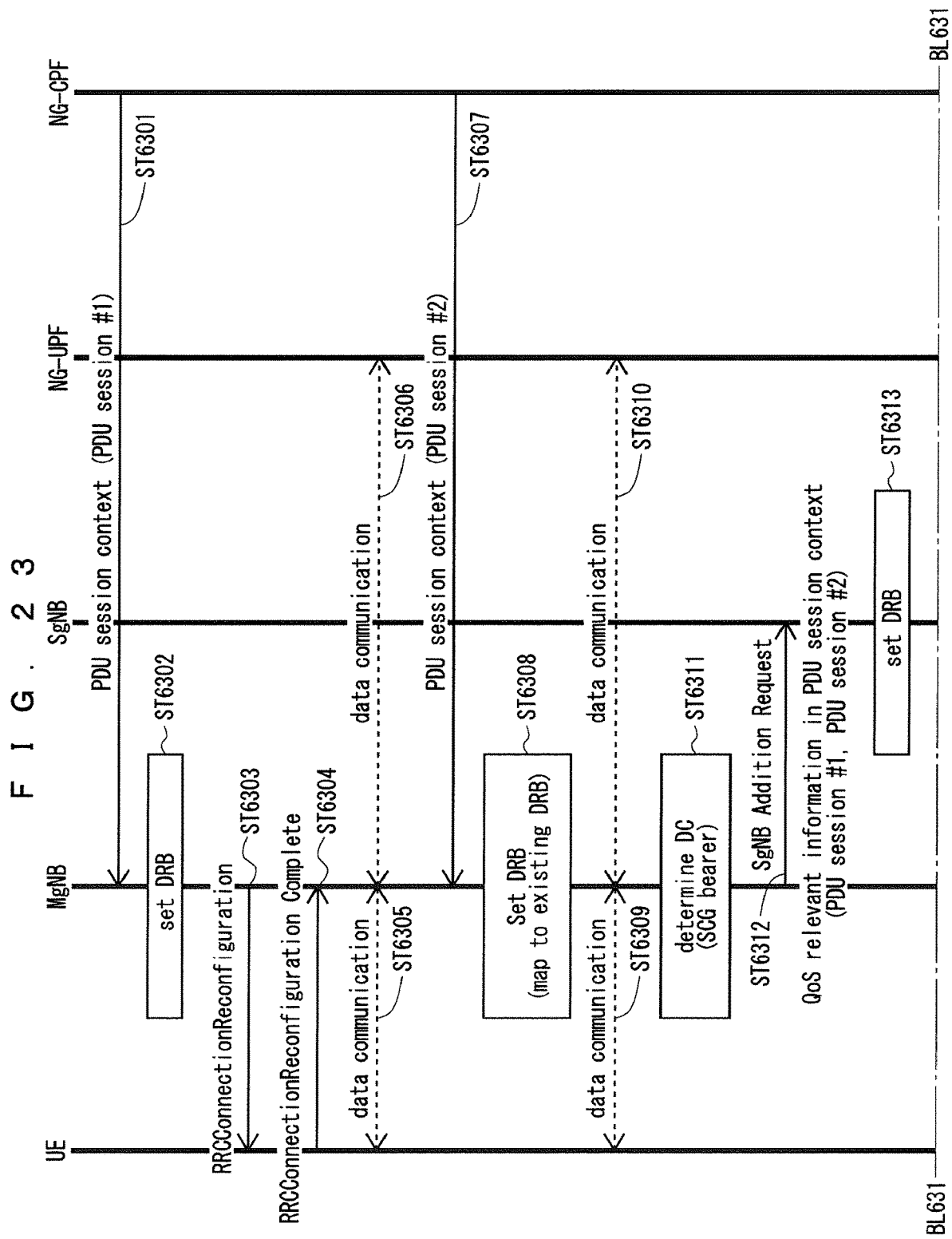
FIG. 23 illustrates an example sequence for setting the DC (SCG bearer) according to the seventh embodiment.
Figure 24:
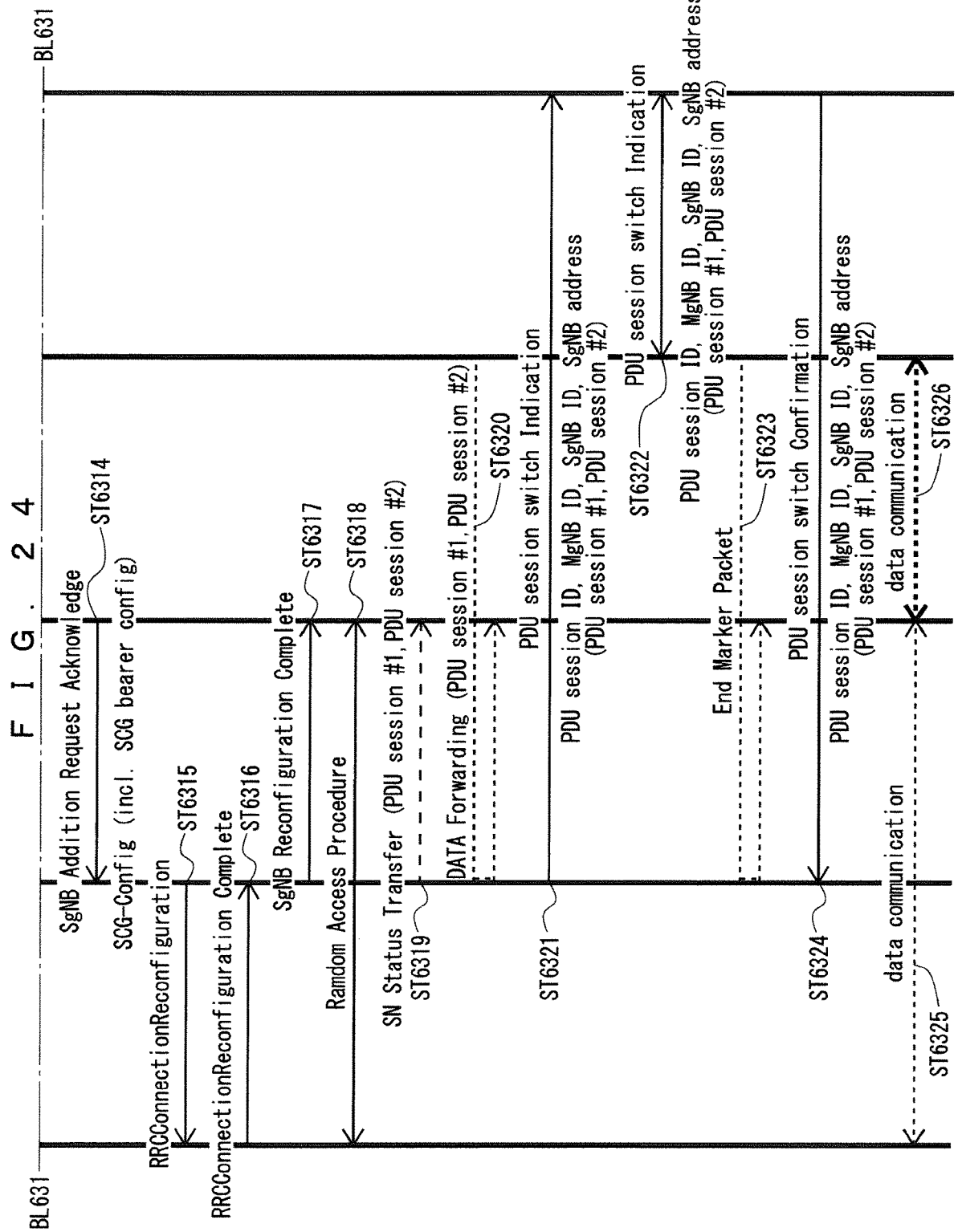
FIG. 24 illustrates the example sequence for setting the DC (SCG bearer) according to the seventh embodiment.

FIGS. 23 and 24 illustrate an example sequence for setting the DC (SCG bearer) according to the seventh embodiment. FIGS. 23 and 24 are connected across a location of a border BL631. The SgNB maps the DRB. FIGS. 23 and 24 illustrate establishment of two PDU sessions and mapping of these two PDU sessions to one DRB. Although FIGS. 23 and 24 illustrate the PDU sessions, they may be applied to the QoS flows configured by the QoS, instead of the PDU sessions.

In Step ST6301, a NG-CPF requests a PDU session from the MgNB. The NG-CPF denotes a function of C-Plane of the NG-CN. In the PDU session request, a PDU session context is notified. The PDU session context includes information on the QoS. The PDU session context is herein assumed to be of the PDU session #1.

In Step ST6302 the MgNB sets a DRB for the PDU session #1. The DRB is set in consideration of, for example, the information on the QoS. In Steps ST6303 and ST6304, the MgNB notifies the UE of information on the DRB settings. Consequently, the UE sets the DRB with the MgNB. In Steps ST6306 and ST6305, data communication is performed between the NG-UPF and the MgNB and between the MgNB and the UE respectively. The MgNB maps the PDU sessions to the DRB.

In Step ST6307, the NG-CPF requests a PDU session different from the PDU session #1 from the MgNB. The PDU session is herein assumed to be the PDU session #2. In Step ST6308, the MgNB sets a DRB for the PDU session #2. The DRB is set in consideration of, for example, the information on the QoS. FIGS. 23 and 24 illustrate mapping to the DRB set for the existing PDU session #1. The PDU sessions #1 and #2 are mapped to the same DRB.

The use of the existing DRB eliminates the need for setting a new DRB to the UE. In Steps ST6310 and ST6309, data communication is performed between the NG-UPF and the MgNB and between the MgNB and the UE, respectively. The MgNB maps the PDU sessions to the DRB. The MgNB maps the PDU sessions #1 and #2 to the same DRB.

In Step ST6311, the MgNB determines to set the DC (SCG bearer) to the UE. In Step ST6312, the MgNB notifies the SgNB of a SgNB addition request message. The information on the QoS of the PDU session is included in the SgNB addition request message. The MgNB may use the information on the QoS of the PDU session. The information has been notified from the NG-CPF in requesting the PDU session. Here, the information is the information on the QoS included in the PDU session context.

For setting the DC per bearer, the information on the QoSs of all the PDU sessions to be mapped to the DRB performing the DC is included in the SgNB addition request message. Here, information on the QoS of the PDU session #1 and information on the QoS of the PDU session #2 are included therein.

The MgNB may include PDU session identifiers in the SgNB addition request message and notify the SgNB of the message. The MgNB may notify the PDU session identifiers in association with the respective pieces of information on the QoSs. Consequently, the SgNB can recognize which PDU session is of which QoS.

In Step ST6313, the SgNB sets the DRB in consideration of the information on the QoS of the PDU session that has been received from the MgNB. Here, the SgNB sets the DRB in consideration of the information on the QoSs of both the PDU sessions #1 and #2. The SgNB may consider, for example, a load of its own node when setting the DRB. When the SgNB cannot set the DRB suitable for the QoSs of both the PDU sessions #1 and #2, it may notify the MgNB of a rejection message in response to the SgNB addition request. The rejection message may include a rejection reason. Examples of the rejection reason include an overload, etc.

In Step ST6314, the SgNB notifies the MgNB of the DRB settings for performing the DC. The DRB settings should be included in the SCG bearer setting information for setting the SCG to notify the settings. In Steps ST6315 and ST6316, the MgNB notifies the UE of information on the DRB settings for the SgNB. Accordingly, the UE sets the DRB with the SgNB. After providing the SCG settings including the DRB settings with the UE, the MgNB notifies the SgNB of completion of the SgNB reconfiguration in Step ST6317.

In Step ST6318, the UE performs the RA procedure on the SgNB. The UE can communicate with the SgNB also in the uplink.

In Step ST6319, the MgNB transfers a sequence number (SN) status. SNs are provided to correspond to data of the PDU sessions #1 and #2, and statuses of the SNs are transferred. As an alternative method, a SN may be provided for each PDU session, and the SN status for each of the PDU sessions may be transferred. For example, the SN is separately provided for each data of the PDU sessions #1 and #2, and the two SN statuses are transferred. Consequently, the SgNB can recognize a data processing state in the MgNB for each PDU session.

The NG-UPF still transmits the downlink data to the MgNB. Thus, the MgNB transfers the data from the NG-UPF to the SgNB in Step ST6320. The MgNB transfers data of all the PDU sessions to be mapped to the DRB to which the DC is set.

In Step ST6321, the MgNB notifies the NG-CPF of a PDU session switch indication. The MgNB requests the NG-CPF to switch the PDU sessions to the SgNB. The MgNB should notify, for example, identifiers of all the PDU sessions to be mapped to the DRB to which the DC is set, the MgNB identifier, the SgNB identifier and the address of the SgNB. Here, the MgNB notifies identifiers of the PDU sessions #1 and #2 as the PDU session identifiers.

In Step ST6322, the NG-CPF notifies the NG-UPF of the PDU session switch indication. The NG-CPF requests the NG-UPF to switch the PDU sessions to the SgNB. The information to be notified may be the same as that notified in Step ST6321.

Upon receipt of the PDU session switch indication in Step ST6322, the NG-UPF notifies the MgNB of a packet marked with an end marker in Step ST6323. The MgNB transfers the packet to the SgNB. Consequently, the SgNB recognizes that the data transferred from the MgNB is the last one. Each of the PDU sessions may be transmitted with an end marker. This is effective when data is transmitted in parallel with each of the PDU sessions.

Upon transmission of the packet marked with the end marker to the MgNB, the NG-UPF changes a transmitting/receiving target of the data of the PDU session notified in Step ST6322 from the MgNB to the SgNB. Here, the NG-UPF changes, from the MgNB to the SgNB, the transmitting/receiving target of the data of all the PDU sessions to be mapped to the DRB to which the DC is set.

In Step ST6324, the NG-CPF notifies the MgNB to verify that the PDU sessions have been switched. In Steps ST6326 and ST6325, data communication is performed between the NG-UPF and the SgNB and between the SgNB and the UE, respectively. The SgNB maps the PDU sessions to the DRB. The SgNB maps the PDU sessions #1 and #2 to the same DRB. With application to the QoS flows, the SgNB maps the DRB from the QoS flows.

Part of the sequence in FIGS. 23 and 24 should be changed, for example, as a sequence for setting the DC as the split bearer. In Step ST6311, the MgNB determines to set the DC (split bearer) to the UE. In Step ST6312, the MgNB notifies the SgNB of the SgNB addition request message including information on the QoS of the PDU session. It is previously described that the MgNB may use, as the information on the QoS of the PDU session, the information on the QoS of the PDU session that has been notified from the NG-CPF in requesting the PDU session.

With the split bearer, the information on the QoS of the PDU session that has been notified from the NG-CPF in requesting the PDU session may be changed and notified to the SgNB. In Steps ST6315, the MgNB notifies the UE of information on the DRB settings for the SgNB. Here, the MgNB may change the bearer settings with the UE from the bearer settings between the MgNB and the UE before the DC, and notify the changed bearer settings. The MgNB should notify the UE of the DRB settings between the MgNB and the UE, and the DRB settings between the SgNB and the UE that have been notified from the SgNB in Step ST6314. Consequently, the UE can set the split bearer.

With the split bearer, the bearer for the UE is split into a bearer between the MgNB and the UE and a bearer between the SgNB and the UE. Combination of the bearer between the MgNB and the UE and the bearer between the SgNB and the UE, where the bearers are obtained from the splitting, may satisfy the QoS of the PDU session. Thus, the previously described processes should be performed.

Information on the QoSs of all the PDU sessions to be mapped to the DRB to which the DC is set, or information on the QoS of a part of the PDU sessions may be changed. The whole or part of the information on the QoSs of the PDU sessions may be changed. The MgNB can issue a SgNB addition request to the SgNB by flexibly changing the settings according to, for example, the load of its own node.

With the split bearer, the processes of switching the bearer from the MCG bearer to the SCG bearer (see Steps ST6319 to ST6324) are unnecessary. This is because the PDU sessions between the NG-UPF and the MgNB need not be changed because the bearer is split in the MgNB with the split bearer.

The data communication after setting the split bearer does not conform to Steps ST6325 and ST6326. The data communication between the NG-UPF and the MgNB in Step ST6310 is maintained. The data communication between the MgNB and the UE is split into two, i.e., data communication between the MgNB and the UE, and data communication between the MgNB and the SgNB and between the SgNB and the UE.

Consequently, the control between the CN and the RAN is flow-based, the control over the RAN is bearer-based and the E-RAB is eliminated in the NG-CN. Moreover, the DC can be set to the UE even when the DRB is set between the gNB and the UE. The SgNB sets the DRB according to information on the QoS of the PDU session, so that the DRB settings in consideration of a state of the SgNB become possible. This can increase the use efficiency of the resources of the SgNB.

The seventh embodiment provides, for example, a communication system including: a communication terminal device; a plurality of base station devices to be radio communicatively connected to the communication terminal device; and a core network that manages communication between the communication terminal device and each of the plurality of base station devices, wherein when a first base station device connected to the communication terminal device requests a second base station device to set a bearer for the communication terminal device, the first base station device notifies the second base station device of information on Quality of Service (QoS), and the second base station device sets the bearer for the communication terminal device based on the notified information on the QoS, the information being obtained from the core network on a PDU session.

With this structure, the dual connectivity (DC) can be set in the fifth generation (5G) radio access system.

Here, the structure above can be variously modified as described above and as described in the first and second modifications.

To solve the problems described in the seventh embodiment, the method for the SgNB to set a bearer for the DC with information on the QoS of the PDU session is previously described.

When one DRB is configured for a plurality of PDU sessions, information on all the PDU sessions included in the one DRB needs to be notified between the MgNB and the SgNB to perform the DC for the one DRB, in the previous method. This is because the DC is set per DRB. Thus, the amount of information that needs to be notified is increased.

Here, another method for solving the problems described in the seventh embodiment is disclosed.

The MgNB sets a bearer for the DC with information on the QoS of the PDU session. The MgNB issues a SgNB addition request to the SgNB with information on the bearer settings for the DC. The SgNB sets the DRB for the DC with the information on the bearer settings for the DC that has been notified from the MgNB. In setting the split bearer, the MgNB may change a value of the information on the bearer settings for the DC, and notify the SgNB of the value after change. The DRB for the DC should be set with a bearer on the MgNB side and a bearer on the SgNB side to satisfy the QoS required for the PDU session.

The MgNB may notify the SgNB of a session identifier of the PDU session performing the DC. The MgNB may notify the SgNB of an identifier of the PDU session included in the DRB performing the DC. The MgNB should notify the PDU session identifier in association with the information on the QoS of the PDU session. The PDU session identifier may be notified together with the bearer setting request, or included in a bearer setting request message to be notified.

Thus, the SgNB can recognize for which PDU session in the NG-CN the DC is performed. The SgNB can map the PDU session to the DRB performing the DC.

Examples of information on the bearer settings for the DC include the following parameters:
(1) an RLC structure;
(2) a logical channel identifier;
(3) a logical channel structure;
(4) a logical channel bit rate; and
(5) a QCI.

The DRB setting information to be notified from the gNB to the UE may be used in the uplink as the information on the bearer settings for the DC. The DRB setting information to be notified from the eNB to the UE under the conventional LTE may be used. Examples of such information include the parameters disclosed in Non-Patent Document 12 under the conventional LTE. Information on the QoS of these may be used.

Even when a bearer for setting the DC includes a plurality of PDU sessions, the MgNB should notify the SgNB of only information on the bearer settings of one DC bearer. The information on the bearer settings of the one DC bearer should be notified. The bearer settings have been made by the MgNB. Thus, the MgNB need not notify the SgNB of information on the QoS for each PDU session and can reduce the amount of information required for the notification.

In setting the SCG bearer, the MgNB should notify the SgNB of information on the DRB settings provided by the MgNB for the DRB for setting the DC as previously described. With the split bearer, combination of the bearer between the MgNB and the UE and the bearer between the SgNB and the UE, where the bearers are obtained from the splitting, may satisfy the QoS of the PDU session. Thus, the MgNB may change information on the bearer settings provided by the MgNB and notify the SgNB of the information after change. Moreover, the MgNB may change the bearer settings with the UE from the bearer settings between the MgNB and the UE before the DC, and notify the changed bearer settings.

The whole or only part of the information on the bearer settings of the bearer for the DC may be changed. The MgNB can issue a SgNB addition request to the SgNB by flexibly changing the settings according to, for example, the load of its own node.

For example, part of the sequence illustrated in FIGS. 23 and 24 should be modified as a sequence for setting the DC (SCG bearer) so that the MgNB sets the bearer for the DC with the information on the QoS of the PDU session.

In Step ST6312 of FIG. 23, not the information on the QoS of the PDU session but the information on the DRB settings provided by the MgNB in Step ST6308 is included in the SgNB addition request message to be notified from the MgNB to the SgNB.

In Step ST6313, the SgNB sets the DRB in consideration of the information on the DRB settings notified from the MgNB. The SgNB may consider, for example, a load of its own node when setting the DRB. When the SgNB cannot set the DRB matching the information on the DRB settings notified from the MgNB, it may notify the MgNB of a rejection message in response to the SgNB addition request. The rejection message may include a rejection reason. Examples of the rejection reason include an overload, etc.

The sequence may be changed to the sequence for setting the DC (split bearer) disclosed in the method for the SgNB to map the DRB, as an example sequence for setting the DC (split bearer).

Consequently, the control between the CN and the RAN is flow-based, the control over the RAN is bearer-based, and the E-RAB is eliminated in the NG-CN. Moreover, the DC can be set to the UE even when the DRB is set between the gNB and the UE.

Thus, the MgNB need not notify the SgNB of information on the QoS for each PDU session, and can reduce the amount of information required for the notification. The MgNB sets the DRB according to information on the QoS of the PDU session, so that the DRB setting request in consideration of a state of the MgNB can be issued. This can increase the use efficiency of the resources of the MgNB.

Considering above, the seventh embodiment further provides the following communication system. Provided is, for example, a communication system including: a communication terminal device; a plurality of base station devices to be radio communicatively connected to the communication terminal device; and a core network that manages communication between the communication terminal device and each of the plurality of base station devices, wherein when a first base station device connected to the communication terminal device requests a second base station device to set a bearer for the communication terminal device, the first base station device sets the bearer for the communication terminal device based on Quality of Service (QoS) obtained from the core network on a PDU session, and notifies the second base station device of information on the set bearer.

With this structure, the dual connectivity (DC) can be set in the fifth generation (5G) radio access system.

Here, the structure above can be variously modified as described above and as described in the first and second modifications.

The First Modification of the Seventh Embodiment

Conventionally, the E-RAB is configured for each session, and the DRB is configured for each E-RAB. Since the DC can be set for each E-RAB, the DC can be set for each PDU session even when a plurality of sessions are configured per UE.

However, when one DRB can be configured for the plurality of PDU sessions, the DC cannot be set for each session.

Depending on a session, which bearer type should be used may differ in the DC. For example, the MCG bearer is suitable for the session requiring lower latency. This is because there is no transfer to the SgNB. For example, a SCG bearer or a split bearer may be suitable for the session requiring a larger capacity. This is because when the SgNB configures broadband carriers at a higher frequency, application of the SgNB brings a larger capacity.

However, the incapability of setting the DC for each session creates a problem with failing to produce such advantages.

The first modification discloses a method for solving such a problem.

The DC can be set for each PDU session. The MgNB sets the DC to the SgNB for each PDU session. A method for setting the DC (SCG bearer) in setting the DC is disclosed. The MgNB requests the SgNB to set a bearer with information, which has been notified from the NG-CN (CP), on the QoS of only the PDU session performing the DC. The methods disclosed in the seventh embodiment are applicable to this method.

The MgNB reconfigures a bearer with information on the QoSs of the other PDU sessions except for the PDU session performing the DC. The SgNB sets a bearer with information on the QoS of only the PDU session performing the DC. The information has been received from the MgNB. The MgNB notifies the UE of the bearer settings provided by the SgNB for the PDU session performing the DC, and the bearer settings reconfigured by the MgNB for the other PDU sessions except for the PDU session performing the DC.

The UE sets, according to the notified bearer settings, the bearer for the PDU session performing the DC and the bearer for the other PDU sessions except for the PDU session performing the DC. With such settings of the DC, the DC can be set for each PDU session.

Although it is disclosed that the MgNB reconfigures a bearer with the information on the QoSs of the PDU sessions except for the PDU session performing the DC, the MgNB need not reconfigure the bearer. The MgNB can satisfy the QoSs of the PDU sessions except for the PDU session performing the DC because the bearer is set before performing the DC to satisfy the QoSs including the PDU session performing the DC. Here, the MgNB need not notify the UE of the bearer information reconfigured by the MgNB. Consequently, the amount of information to be notified from the MgNB to the UE can be reduced.

Figure 25:
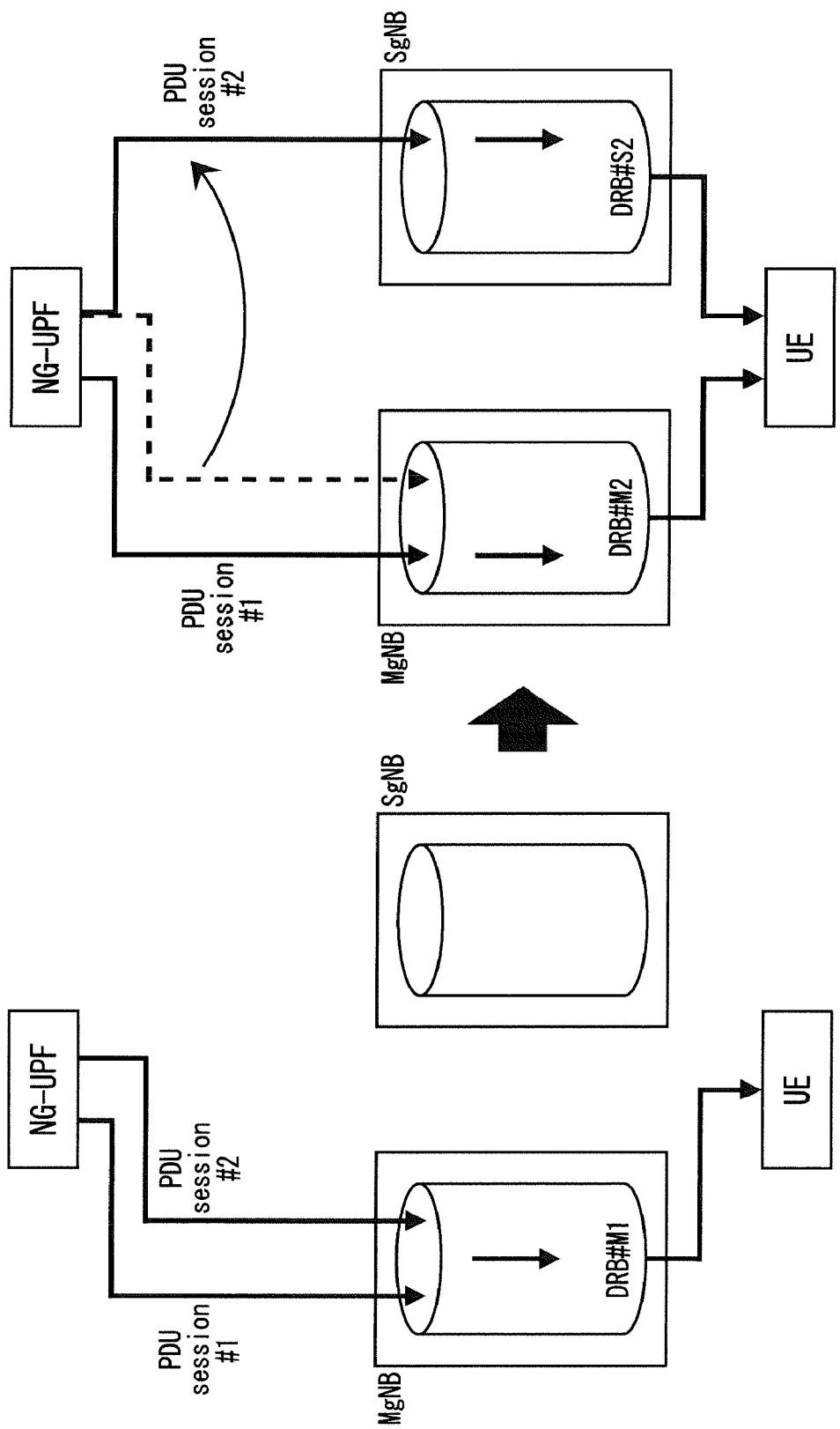
FIG. 25 illustrates a method for setting the DC (SCG bearer) for each PDU session according to the first modification of the seventh embodiment.

FIG. 25 illustrates a method for setting the DC (SCG bearer) for each PDU session according to the first modification. The state of (a) to the left of FIG. 25 may be a state in setting the MCG bearer using the MgNB or a state before the DC is set. Since the state of (a) is the same as the state of (a) in FIG. 21, the description thereof is omitted. The state of (b) to the right of FIG. 25 may be a state in setting an SCG bearer using the SgNB for each PDU session or a state in which the DC (SCG bearer) has been set to one PDU session.

As illustrated in the state of (b), setting of the DC (SCG bearer) to one PDU session #2 will switch the MCG bearer to the SCG bearer. A DRB #S2 for the PDU session #2 to which the DC is set is set in the SgNB. A DRB #M2 for a PDU session #1 excluding the PDU session #2 to which the DC is set is reconfigured in the MgNB. The MCG bearer is reconfigured for the PDU session #1. This PDU session #1 is not switched to the SgNB.

With setting of the DC (SCG bearer) to the PDU session #2, the NG-UPF path-switches the PDU session #2 mapped to the DRB #M1 from the MgNB to the SgNB. The DC is set for each PDU session among the NG-CN, the gNB, and the UE.

Figure 26:
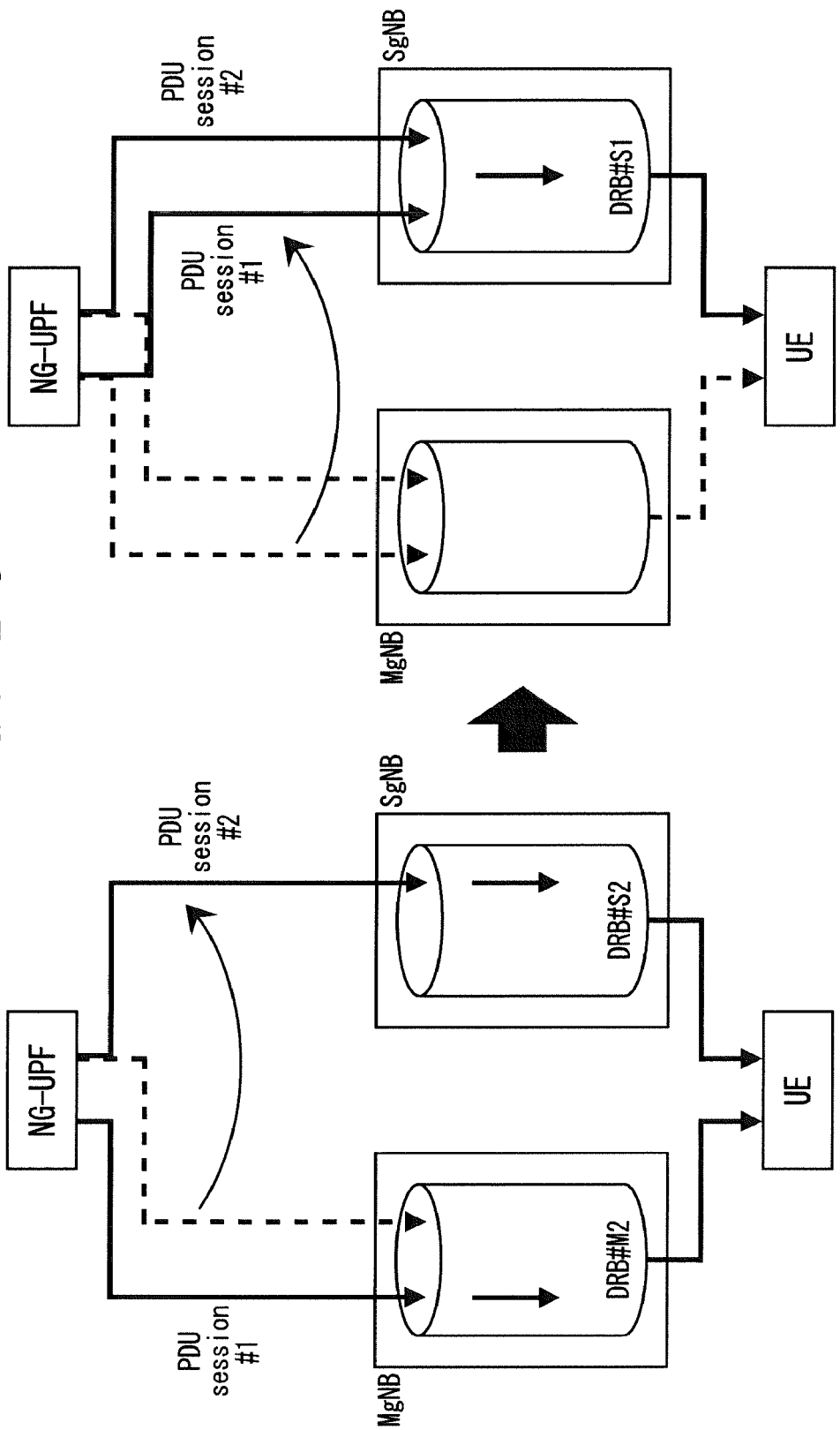
FIG. 26 illustrates a method for setting the DC (SCG bearer) for each PDU session according to the first modification of the seventh embodiment.

FIG. 26 illustrates a method for setting the DC (SCG bearer) for each PDU session according to the first modification. Since the state of (b) to the left of FIG. 26 is the same as the state of (b) in FIG. 25, the description thereof is omitted. The state of (c) to the right of FIG. 26 may be a state in setting the SCG bearer using the SgNB for each PDU session or a state in which the DC (SCG bearer) has been set to two PDU sessions.

As illustrated in the state of (c), setting of the DC (SCG bearer) to the PDU session #1 of the MgNB will switch the MCG bearer to the SCG bearer. The PDU session #2 to which the DC has already been set and a DRB #S1 for the PDU session #1 switched from the MgNB are reconfigured in the SgNB. One DRB is set to a plurality of PDU sessions in the SgNB.

With setting of the DC (SCG bearer) to the PDU session #1, the NG-UPF path-switches the PDU session #1 mapped to the DRB #M2 from the MgNB to the SgNB. Thus, the DC is set for each PDU session among the NG-CN, the gNB, and the UE.

A method for setting the DC (a split bearer) in setting the DC is disclosed.

The MgNB requests the SgNB to set a bearer with information on the QoS of only the PDU session performing the DC. With the split bearer, the bearer for the UE is split into a bearer between the MgNB and the UE and a bearer between the SgNB and the UE. Combination of the bearer between the MgNB and the UE and the bearer between the SgNB and the UE where those bearers are obtained from the splitting, may satisfy the QoS of the PDU session.

For this reason, the information on the QoS of the PDU session that has been notified from the NG-CPF in requesting the PDU session may be changed to be notified to the SgNB. Methods disclosed in the seventh embodiment are applicable to this method.

The MgNB may reconfigure a bearer in consideration of the information on the QoS of the PDU session performing the DC (split bearer) with the SgNB. The MgNB may reconfigure the bearer in consideration of the information on the QoSs of the other PDU sessions except for the PDU session performing the DC and information on the QoS of the PDU session for which the bearer is split with the SgNB according to the DC.

The SgNB sets a bearer with information on the QoS of only the PDU session performing the DC. The information has been received from the MgNB. The MgNB notifies the UE of the bearer settings provided by the SgNB for the PDU session performing the DC and the bearer settings reconfigured by the MgNB. The UE makes the bearer settings for the MgNB and the SgNB according to the notified bearer settings. Consequently, the UE makes the bearer settings for the PDU session performing the DC and the bearer settings for the other PDU sessions except for the PDU session performing the DC.

The MgNB assigns the SN to each PDU session so that data only for the PDU session performing the DC can be split into the MgNB and the SgNB. With such settings of the DC, the DC can be set for each PDU session.

Although it is disclosed that the MgNB may reconfigure the bearer in consideration of the information on the QoS of the PDU session performing the DC (split bearer) with the SgNB, the MgNB need not reconfigure the bearer. The MgNB can satisfy the QoSs of the PDU sessions except for the PDU session performing the DC because the bearer is set before performing the DC to satisfy the QoSs including the PDU session performing the DC (split bearer). Here, the MgNB need not notify the UE of the bearer information reconfigured by the MgNB. Consequently, the amount of information to be notified from the MgNB to the UE can be reduced.

Figure 27:
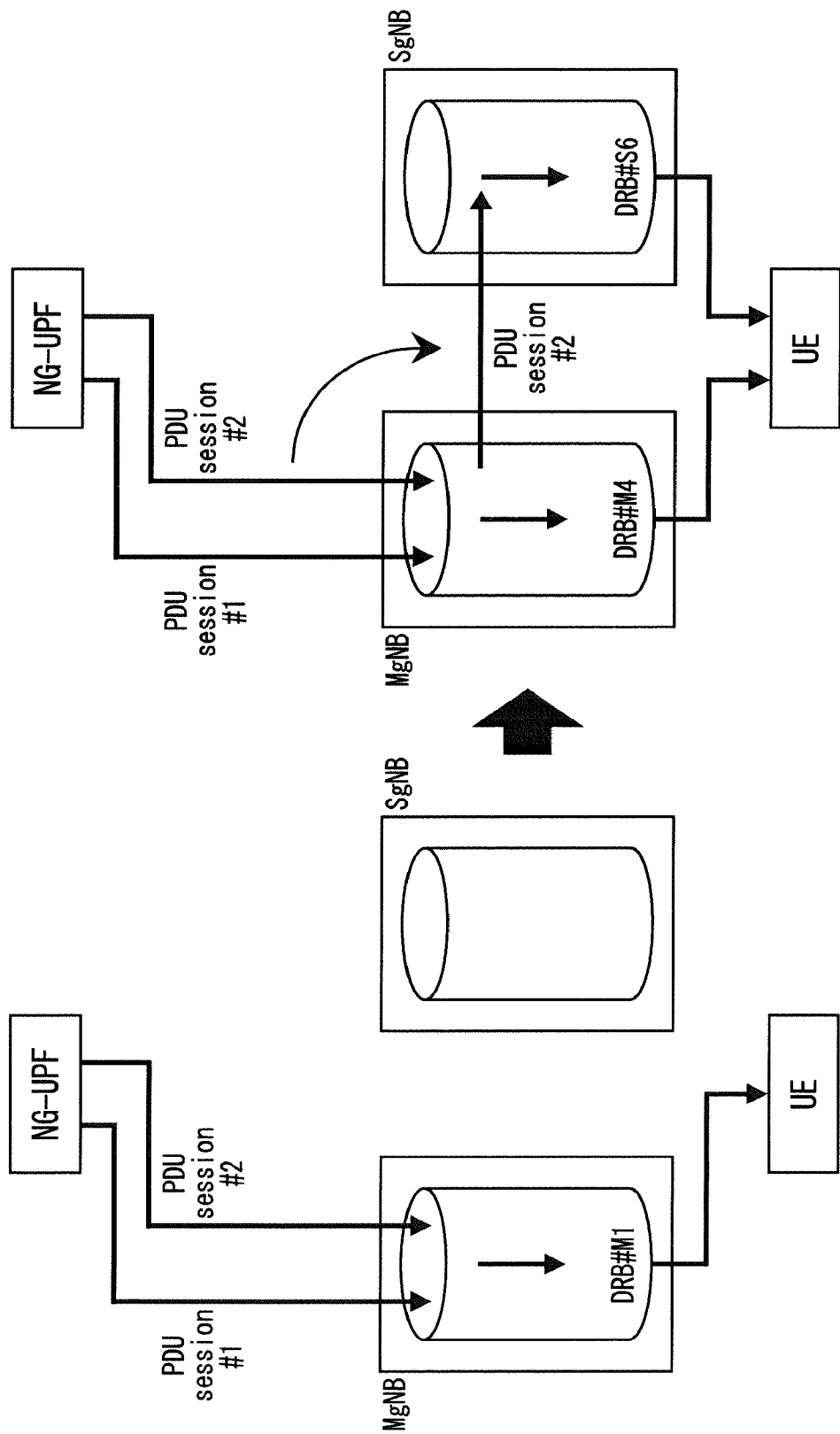
FIG. 27 illustrates a method for setting the DC (split bearer) according to the first modification of the seventh embodiment.

FIG. 27 illustrates a method for setting the DC (split bearer) according to the first modification. The state of (a) to the left of FIG. 27 may be a state in setting the MCG bearer using the MgNB or a state before the DC is set. Since the state of (a) is the same as the state of (a) in FIG. 22, the description thereof is omitted. The state of (b) to the right of FIG. 27 may be a state in setting the split bearer using the SgNB for each PDU session or a state to which the DC (split bearer) has been set to one PDU session.

As illustrated in the state of (b), setting of the DC (split bearer) to one PDU session #2 will switch the MCG bearer to the split bearer. A DRB #S6 for the PDU session #2 to which the DC (split bearer) is set is set in the SgNB. A DRB #M4 for the PDU session #2 to which the DC (split bearer) is set and the PDU session #1 is reconfigured in the MgNB. In view of the DRBs, the split bearer is set by the DRB #M4 and the DRB #S6. In view of the PDU sessions, the setting is made for each of the PDU sessions, i.e., the MCG bearer is reconfigured for the PDU session #1, and the split bearer is set for the PDU session #2.

When the DC (split bearer) is set, the NG-UPF need not path-switch all the PDU sessions mapped to the DRB #M1 from the MgNB to the SgNB but may maintain the PDU sessions in the MgNB. The DC is set for each PDU session between the gNB and the UE.

Another method for setting the DC (split bearer) in setting the DC is disclosed.

According to the aforementioned DC setting method, the MgNB to which the split bearer has been set sets one bearer. One DRB is set to a PDU session to which the DC (split bearer) is not set and a PDU session to which the DC (split bearer) is set.

According to the other DC setting method, a bearer is set to each of the PDU session to which the DC (split bearer) is not set and the PDU session to which the DC (split bearer) is set. This can facilitate changes in the bearer for the PDU session to which the DC (split bearer) is set. For example, processes of changing the MCG bearer to the split bearer and changing the split bearer to the MCG bearer again are performed independently from the bearer settings for the other PDU sessions and the PDU session to which the DC is not set.

The MgNB requests the SgNB to set a bearer with information on the QoS of only the PDU session performing the DC. The MgNB sets the bearer with information on the QoS of only the PDU session performing the DC. With the split bearer, the bearer for the UE is split into a bearer between the MgNB and the UE and a bearer between the SgNB and the UE. Combination of the bearer between the MgNB and the UE and the bearer between the SgNB and the UE may satisfy the QoS of the PDU session, where the bearers are obtained from the splitting.

Thus, the information on the QoS of the PDU session that has been notified from the NG-CPF in requesting the PDU session may be changed to be notified to the SgNB. The methods disclosed in the seventh embodiment are applicable to this method.

The MgNB reconfigures a bearer separately from the bearer for the PDU session performing the DC in consideration of the information on the QoSs of the other PDU sessions except for the PDU session performing the DC (split bearer) with the SgNB. When the DC is not performed for a plurality of PDU sessions or when the DC is performed for the plurality of PDU sessions, in each case, one bearer may be set to all the PDU sessions, a bearer may be set to each of the PDU sessions or a bearer may be set to each PDU session group.

The SgNB sets a bearer with information on the QoS of only the PDU session performing the DC. The information has been received from the MgNB. The MgNB notifies the UE of the bearer settings provided by the SgNB for the PDU session performing the DC, the bearer settings reconfigured by the MgNB for the PDU session not performing the DC and the bearer settings for the PDU session performing the DC.

The UE makes the bearer settings for the MgNB and the SgNB according to the notified bearer settings. Consequently, the UE makes the bearer settings for the PDU session performing the DC and the bearer settings for the other PDU sessions except for the PDU session performing the DC. The MgNB assigns the SN to each PDU session, so that data only for the PDU session performing the DC can be split into the MgNB and the SgNB.

It is disclosed that the bearer is set for each of the PDU session not performing the DC (split bearer) and the PDU session performing the DC (split bearer) in the MgNB. In contrast, one bearer may be set to the PDU session not performing the DC (split bearer) in the process of changing, for the PDU session performing the DC, from the split bearer to the MCG bearer again. Since a plurality of DRB settings need not be made in the MgNB, the control can be facilitated.

With such settings of the DC, the DC can be set for each PDU session.

Figure 28:
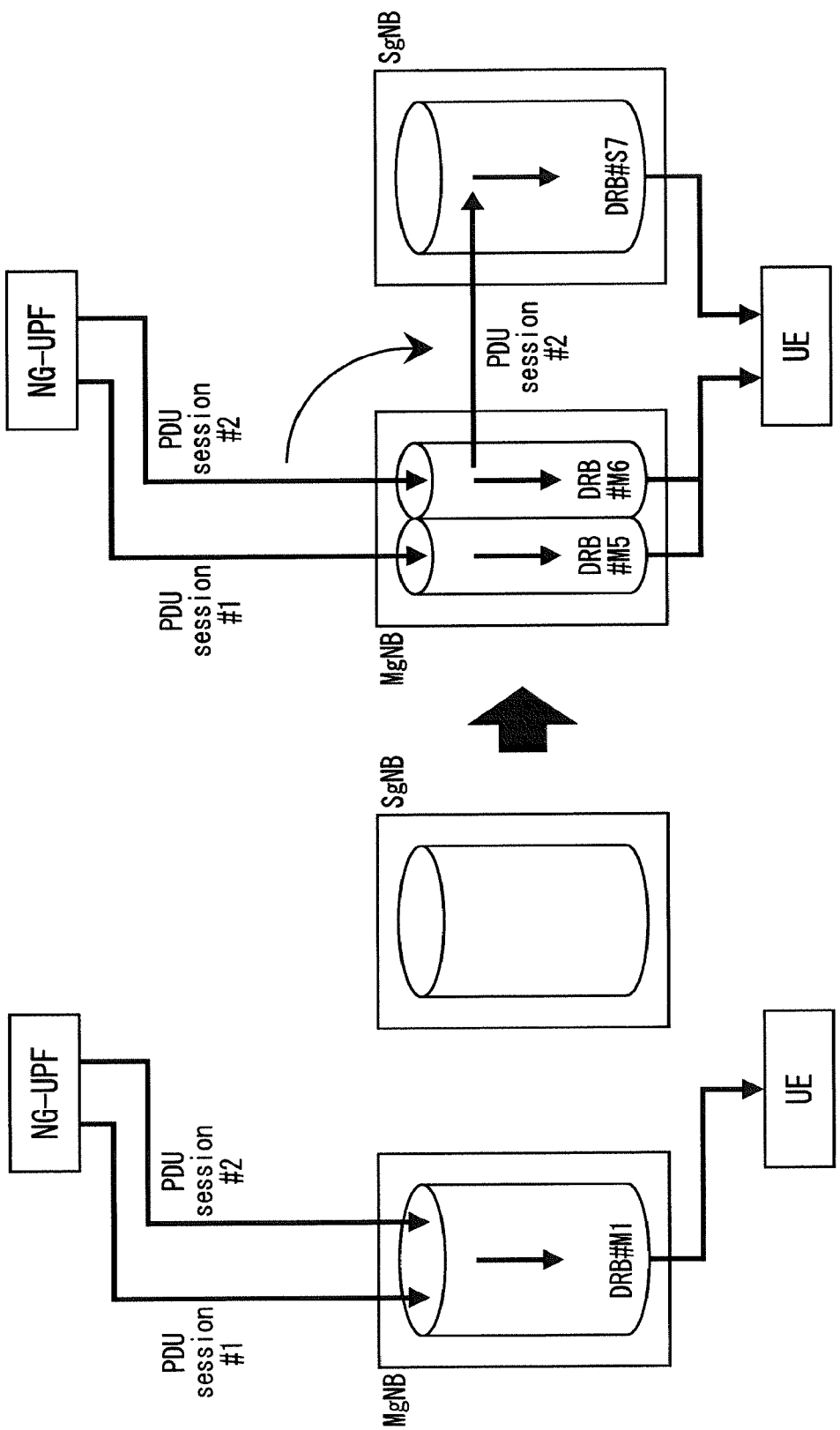
FIG. 28 illustrates another method for setting the DC (split bearer) according to the first modification of the seventh embodiment.

FIG. 28 illustrates another method for setting the DC (split bearer). The state of (a) to the left of FIG. 28 may be a state in setting the MCG bearer using the MgNB or a state before the DC is set. Since the state of (a) is the same as the state of (a) in FIG. 22, the description thereof is omitted. The state of (b) to the right of FIG. 28 may be a state in setting the split bearer using the SgNB for each PDU session or a state in which the DC (split bearer) has been set to one PDU session.

As illustrated in the state of (b), setting of the DC (split bearer) to one PDU session #2 will switch the MCG bearer to the split bearer. A DRB #S7 for the PDU session #2 to which the DC is set is set in the SgNB. A DRB #M6 for the PDU session #2 to which the DC (split bearer) is set and a DRB #M5 for the PDU session #1 to which the DC is not set are reconfigured in the MgNB. In view of the DRBs, the split bearer is set by the DRB #M6 and the DRB #S7. In view of the PDU sessions, the setting is made for each of the PDU sessions. Thus, the MCG bearer is reconfigured by the DRB #M5 for the PDU session #1, and the split bearer is set by the DRB #M6 and the DRB #S7 for the PDU session #2.

When the DC (split bearer) is set, the NG-UPF need not path-switch all the PDU sessions mapped to the DRB #M1 from the MgNB to the SgNB but may maintain the PDU sessions in the MgNB. Consequently, the DC is set for each PDU session between the gNB and the UE.

Figure 29:
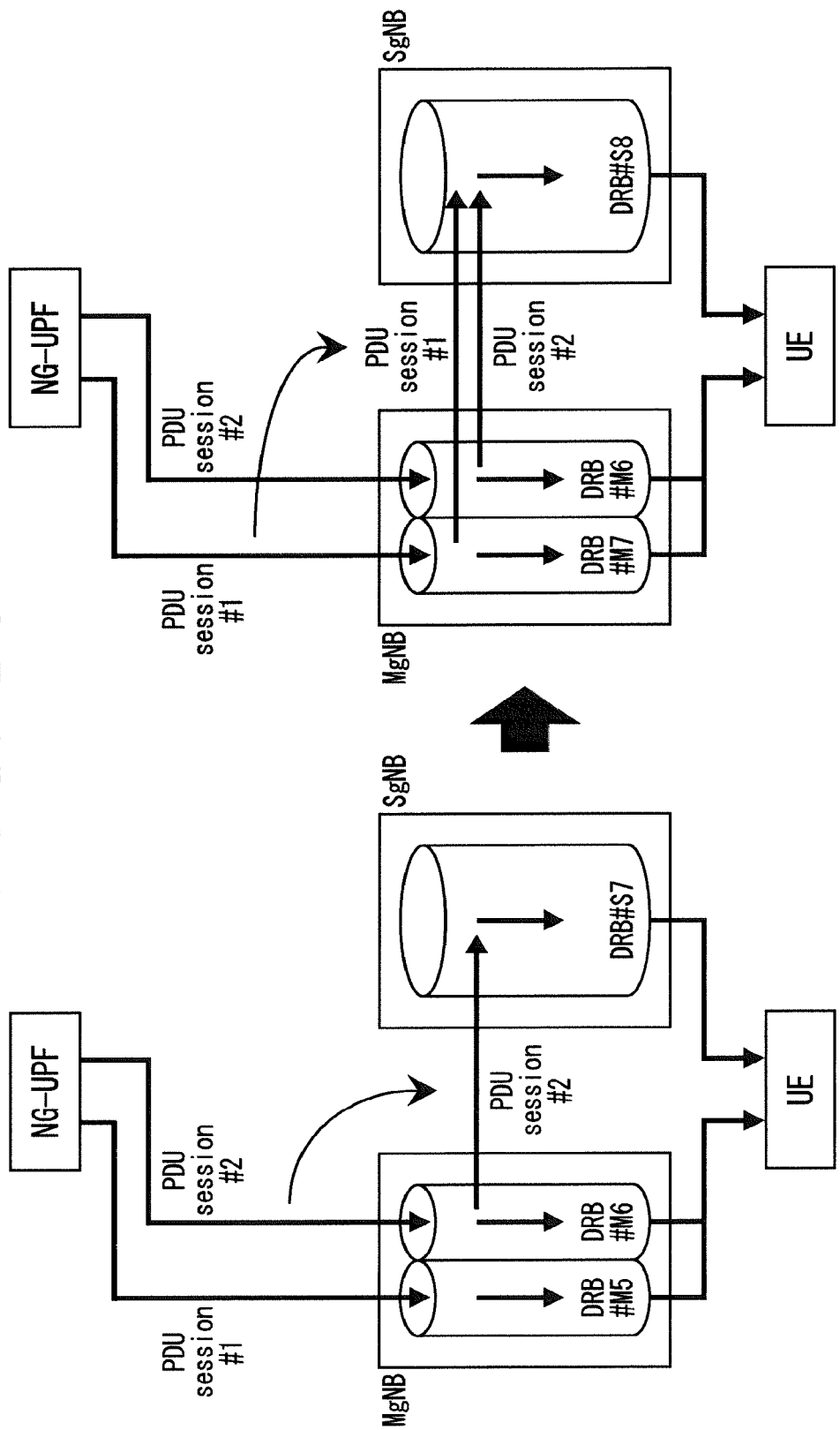
FIG. 29 illustrates another method for setting the DC (split bearer) according to the first modification of the seventh embodiment.

FIG. 29 illustrates another method for setting the DC (split bearer). Since the state of (b) to the left of FIG. 29 is the same as the state of (b) in FIG. 28, the description thereof is omitted. The state of (c) to the right of FIG. 29 may be a state in setting the split bearer for each PDU session, or a state in which the DC (split bearer) has been set to two PDU sessions.

As illustrated in the state of (c), setting of the DC (split bearer) to the PDU session #1 of the MgNB will switch the MCG bearer to the split bearer. A DRB #S8 for the PDU session #1 to which the DC (split bearer) is set is set in the SgNB. The one DRB #S8 for the PDU session #1 to which the DC (split bearer) is set and for the PDU session #2 to which the DC (split bearer) has already been set is reconfigured in the SgNB. One DRB is set to a plurality of PDU sessions in the SgNB. The DRB #M7 for the PDU session #1 to which the DC (split bearer) is set is reconfigured in the MgNB.

In view of the DRBs, the split bearer is set by the DRB #M7 and the DRB #S8. Similarly, another split bearer is set by the DRB #M6 and the DRB #S8. In view of the PDU sessions, the setting is made for each of the PDU sessions, i.e., the split bearer is reconfigured by the DRB #M7 and the DRB #S8 for the PDU session #1, and the split bearer is set by the DRB #M6 and the DRB #S8 for the PDU session #2.

When the DC (split bearer) is set, the NG-UPF need not path-switch all the PDU sessions mapped to the DRB #M5 from the MgNB to the SgNB but may maintain the PDU sessions in the MgNB. Consequently, the DC is set for each PDU session between the gNB and the UE.

Even when one DRB can be configured for a plurality of PDU sessions, the DC can be set for each of the sessions according to the method disclosed in the first modification. Thus, the DC of a bearer type suitable for each session can be set, and the performance required for each of the sessions can be efficiently satisfied.

Although the method for setting the DC for each PDU session is disclosed, the DC may be set for a plurality of PDU sessions. The MgNB may request the SgNB to set a bearer with information on the QoS per more than one PDU session performing the DC. The information on the QoS per more than one PDU session performing the DC may be included in one bearer setting request message to notify the information. The methods disclosed in the first modification should be appropriately applied to the setting method.

The DC may be set for each PDU session group obtained by grouping one or more PDU sessions as one group. The MgNB may request the SgNB to set a bearer with information on the QoS of one or more PDU sessions included in the PDU session group performing the DC. The information on the QoS of the PDU session group performing the DC may be included in one bearer setting request message to notify the information. The methods disclosed in the first modification should be appropriately applied to the setting method.

According to the disclosed method, the SgNB sets a bearer for the DC with information on the QoS of a PDU session. As an alternative method, the MgNB may set a bearer for the DC with information on the QoS of the PDU session, and may issue a SgNB addition request to the SgNB with information on the bearer settings for the DC. The methods disclosed in the seventh embodiment should be appropriately applied.

Similarly as the seventh embodiment, the amount of information required for the notification can be reduced. The DRB setting request in consideration of a state of the MgNB can also be issued. This can increase the use efficiency of the resources of the MgNB.

The Second Modification of the Seventh Embodiment

Even when the DC is supposed to be set for each PDU session, one bearer is set for a plurality of PDU sessions in the SgNB. FIGS. 26 and 29 illustrate such example cases. For example, when the SCG bearer is restored to the MCG bearer herein, that is to say, when the bearer type is changed, reconfiguration of the bearer is necessary in the SgNB. Thus, the process of setting the bearer is complicated. When the bearer type of the DC is changed with high frequency, the process of setting the DC is complicated.

The second modification discloses a method for solving such problems.

The SgNB sets, for each PDU session, a bearer performing the DC or a bearer for the PDU session performing the DC. A PDU session identifier may be set one-to-one with a DRB identifier. A method for setting the DC in setting the DC is disclosed.

The MgNB requests the SgNB to set a bearer with information on the QoS of only the PDU session performing the DC. The methods disclosed in the seventh embodiment are applicable to this method. The MgNB reconfigures a bearer with information on the QoSs of the other PDU sessions except for the PDU session performing the DC.

The SgNB sets a bearer with information on the QoS of only the PDU session performing the DC. The information has been received from the MgNB. When the bearer for the other PDU sessions has already been set to the UE, the SgNB sets a bearer different from one for the PDU session performing the DC. The MgNB notifies the UE of the bearer settings provided by the SgNB and the bearer settings reconfigured by the MgNB.

The UE sets, according to the notified bearer settings, the bearer for the PDU session performing the DC, and the bearer for the other PDU sessions except for the PDU session performing the DC. With such settings of the DC, the DC can be set so that the bearer is set for each PDU session.

Although it is disclosed that the MgNB reconfigures a bearer with the information on the QoSs of the PDU sessions except for the PDU session performing the DC, the MgNB need not reconfigure the bearer. The MgNB can satisfy the QoSs of the PDU sessions except for the PDU session performing the DC before performing the DC because the bearer is set to satisfy the QoSs including the PDU session performing the DC. Here, the MgNB need not notify the UE of the bearer information reconfigured by the MgNB. Consequently, the amount of information to be notified from the MgNB to the UE can be reduced.

FIG. 30 illustrates a method for setting the DC (SCG bearer) for each PDU session according to the second modification. Since the state of (b) to the left of FIG. 30 is the same as the state of (b) in FIG. 26, the description thereof is omitted. The state of (c) to the right of FIG. 30 may be a state in setting the SCG bearer using the different SgNB for each PDU session or a state in which the DC (SCG bearer) has been set to two PDU sessions.

As illustrated in the state of (c), setting of the DC (SCG bearer) to the PDU session #1 of the MgNB will switch the MCG bearer to the SCG bearer. A DRB #S3 for the PDU session #1 switched from the MgNB is set in the SgNB separately from a DRB #S4 for the PDU session #2 to which the DC has already been set. The DRBs are separately set to a plurality of PDU sessions in the SgNB.

With setting of the DC (SCG bearer) to the PDU session #1, the NG-UPF path-switches the PDU session #1 mapped to the DRB #M2 from the MgNB to the SgNB. The DC is set for each PDU session among the NG-CN, the gNB, and the UE.

FIG. 31 illustrates a method for setting the DC (split bearer) for each PDU session according to the second modification. Since the state of (b) to the left of FIG. 31 is the same as the state of (b) in FIG. 29, the description thereof is omitted. The state of (c) to the right of FIG. 31 may be a state in setting the split bearer for each PDU session, or a state in which the DC (split bearer) has been set to two PDU sessions.

As illustrated in the state of (c), setting of the DC (split bearer) to the PDU session #1 of the MgNB will switch the MCG bearer to the split bearer. A DRB #S10 for the PDU session #1 to which the DC (split bearer) is set is set in the SgNB separately from a DRB #S9 for the PDU session #2 to which the DC (split bearer) has already been set. The DRBs are separately set to a plurality of PDU sessions in the SgNB. A DRB #M7 for the PDU session #1 to which the DC (split bearer) is set is reconfigured in the MgNB.

As following this process, in view of the DRBs, the split bearer is set by the DRB #M7 and the DRB #S10. Similarly, another split bearer is set by the DRB #M6 and the DRB #S9. In view of the PDU sessions, the setting is made for each of the PDU sessions, i.e., the split bearer is reconfigured by the DRB #M7 and the DRB #S10 for the PDU session #1, and the split bearer is set by the DRB #M6 and the DRB #S9 for the PDU session #2.

When the DC (split bearer) is set, the NG-UPF need not path-switch all the PDU sessions mapped to the DRB #M5 from the MgNB to the SgNB but may maintain the PDU sessions in the MgNB. Consequently, the DC is set for each PDU session between the gNB and the UE.

As following this process, even when the DC is set for each PDU session, the SgNB can set separate bearers for a plurality of PDU sessions. Thus, for example, when the bearer type is changed, the SgNB need not reconfigure the bearer. When the bearer type of the DC is changed with high frequency, the processes of setting the bearer and the DC can be facilitated.

Although the method for setting, for each PDU session, the bearer performing the DC or the bearer for the PDU session performing the DC is disclosed, this method may be statically predetermined in a standard and others. This method does not require any signaling, and enables the UE, the MgNB, the SgNB, and the NG-CN to obtain the mutual recognition.

Alternatively, whether this method is performed may be set. Whether to set, for each PDU session, the bearer performing the DC or the bearer for the PDU session performing the DC can be set. The SgNB may set whether to set, for each PDU session, the bearer performing the DC or the bearer for the PDU session performing the DC. The setting can be made in consideration of, for example, a load state of the SgNB. Whether to set, for each PDU session, the bearer for the DC in the SgNB may be set according to an example: the maximum settable number of DRBs in the SgNB. When the number of DRBs outnumbers the maximum settable number of DRBs in the SgNB, the bearer need not be set for each PDU session.

Furthermore, the SgNB may set whether to set the bearer for each PDU session in consideration of a request from the MgNB.

Consequently, whether to set, for each PDU session, the bearer for the DC in the SgNB can be flexibly set.

A method for the SgNB to set the bearer in consideration of a request from the MgNB is disclosed.

Information indicating whether to set, for each PDU session, the bearer for the DC in the SgNB (referred to as bearer-specific setting information) is provided. For example, 1 bit is allocated to the bearer-specific setting information. The bearer may be set for each PDU session when a state of the bit is represented as "1", whereas the bearer need not be set for each PDU session when the state of the bit is represented as "0".

The MgNB notifies the SgNB of the bearer-specific setting information. The bearer-specific setting information should be included in the SgNB addition request message to be notified from the MgNB to the SgNB in setting the DC to notify the information. The SgNB determines whether to set, for each PDU session, the bearer for the DC according to the bearer-specific setting information received from the MgNB. When the bearer-specific setting information indicates setting the bearer for each PDU session, the SgNB sets the bearer for each PDU session. When the bearer-specific setting information does not indicate setting the bearer for each PDU session, the SgNB sets one DRB for a plurality of PDU sessions.

Consequently, the MgNB can set whether to set, for each PDU session, the bearer for the DC in the SgNB. This enables more flexible setting of the bearer in the SgNB. Thus, it is possible to set the bearer suitable for frequency of changing the bearer type according to a service. Moreover, the control over the DC settings can be facilitated, and the resources of the SgNB can be efficiently used.

As an alternative method, correspondence information between bearers and PDU sessions (bearer-session correspondence information) in the MgNB may be provided for a bearer performing the DC or a PDU session performing the DC. The bearer-session correspondence information should be included in the SgNB addition request message to be notified from the MgNB to the SgNB in setting the DC to notify the information. The SgNB may set the bearer for the DC in consideration of the bearer-session correspondence information received from the MgNB.

Consequently, the SgNB can set in consideration of the settings in the MgNB whether to set the bearer for the DC in the SgNB for each PDU session. This enables more flexible setting of the bearer in the SgNB. Thus, it is possible to set the bearer suitable for frequency of changing the bearer type according to a service. Thus, the control over the DC settings can be facilitated, and the resources of the SgNB can be efficiently used.

Examples of an indicator for determining whether the MgNB requests the SgNB to set the bearer for the DC for each PDU session include whether to frequently set, correct, or cancel the DC, etc. With frequent changes in the DC, such as change in the bearer, etc., the control can be facilitated by setting the bearer for each PDU session performing the DC rather than by setting the bearer together with the other PDU sessions. The same holds true when the DC is frequently set or canceled. Thus, when the DC is frequently set, corrected or canceled, it should be determined that the MgNB requests the SgNB to set the bearer for the DC for each PDU session.

The following three examples are disclosed as indicators for determining whether the DC is frequently set, corrected, or canceled:
(1) the speed of the UE to which the DC is set;
(2) the size of a coverage area of a gNB to be applied to the DC or a cell of the gNB; and
(3) whether the gNB to be applied to the DC operates beams.

When the speed of the UE to which the DC is set is faster in the (1), the UE frequently moves between the cells or between the gNBs. Along with the movement between the cells or between the gNBs, the DC is frequently set and canceled. Thus, when the speed of the UE to which the DC is set is faster, it may be determined that the MgNB requests the SgNB to set the bearer for the DC for each PDU session.

When the size of the coverage area of the gNB to be applied to the DC or the cell of the gNB is smaller in the (2), the UE frequently moves between the cells or between the gNBs. Along with the movement between the cells or between the gNBs, the DC is frequently set and canceled. Thus, when the size of the coverage area of the gNB to be applied to the DC or the cell of the gNB is smaller, it may be determined that the MgNB requests the SgNB to set the bearer for the DC for each PDU session.

When the gNB to be applied to the DC operates beams in the (3), the UE frequently moves between the beams. Along with the mobility between the beams, the DC settings are frequently corrected. Thus, when the gNB to be applied to the DC operates beams, it may be determined that the MgNB requests the SgNB to set the bearer for the DC for each PDU session.

A method for the SgNB to set, in consideration of a request from the MgNB, whether to set the bearer for the DC for each PDU session in the SgNB is disclosed. When being requested from the MgNB to set the bearer for the DC for each PDU session, the SgNB may reject the request. The SgNB should reject the request, for example, when the number of DRBs outnumbers the maximum settable number of DRBs in the SgNB itself. The SgNB notifies the MgNB of the rejection. The rejection message may include reason information. The reason information includes outnumbering the maximum settable number of DRBs.

Upon receipt of the rejection message, the MgNB may request again the SgNB to set the bearer for the DC, for example, without showing that the bearer-specific setting information is set for each PDU session. Alternatively, the SgNB that has notified the rejection message need not be used for the DC.

Consequently, the DC can be set reflecting the load state of the SgNB and others. The throughput can be improved as the whole system.

The methods disclosed in the second modification may be appropriately applied in a process to be performed with the gNB. The methods need not be limited for the DC. The methods should be applied to, for example, the handover (HO) process. Information indicating whether to set the bearer for each PDU session (referred to as bearer-specific setting information) is provided, and an S-gNB (HO Source-gNB) notifies a T-gNB (HO target-gNB) of the bearer-specific setting information. The bearer-specific setting information should be included in, for example, a HO request message to be notified from the S-gNB to the T-gNB to notify the information. The T-gNB determines whether to set the bearer for each PDU session according to the bearer-specific setting information received from the S-gNB.

Alternatively, correspondence information between bearers and PDU sessions (bearer-session correspondence information) in the S-gNB may be included in the HO request message to be notified from the S-gNB to the T-gNB to notify the information. The SgNB may set the bearer in consideration of the bearer-session correspondence information received from the MgNB. Consequently, the bearer suitable for each service can be set even when the gNB with which the UE communicates is changed by, the HO process and others.

The methods disclosed in the second modification may be appropriately applied in a process to be performed between the NG-CN and the gNB. The methods need not be limited for the DC. The methods should be applied, for example, in a process of establishing a session. The information indicating whether to set the bearer for each PDU session (referred to as bearer-specific setting information) is provided, and the NG-CN notifies the gNB of the bearer-specific setting information.

The bearer-specific setting information should be included in, for example, a session establishment response message notified from the NG-CN to the gNB to notify the information. The gNB determines whether to set the bearer for each PDU session according to the bearer-specific setting information received from the NG-CN. Consequently, the bearer suitable for each service can be set even when the NG-CN establishes a session with the gNB.

Interworking between LTE and 5G is being studied. Connection of an eNB of LTE to a gNB of 5G with the DC is being studied (see 3GPP RP-161266 (hereinafter referred to as "Reference 3")). When the CN is the NG-CN, a function of converting being flow-based into being bearer-based should be added to the eNB of LTE to be connected to the NG-CN. The methods disclosed from the seventh embodiment to the second modification of the seventh embodiment are applicable to the eNB. When the CN is an EPC, the CN is bearer-based. Thus, the application is unnecessary.

Although the seventh embodiment to the second modification of the seventh embodiment disclose the SgNB addition request message, a SgNB correction request message may be applied. Application of the message in changing the bearer settings for the DC in the SgNB can produce the same advantages.

The Eighth Embodiment

The first embodiment discloses application of the same RRC parameter in all beams in a cell. As an alternative method, the same RRC parameter may be applied in a plurality of TRPs/beams. One or more beams configured by one or more TRPs may be grouped into a beam group, and the same RRC parameter may be applied in all the beams in the beam group. A collection of one or more beams to which the same RRC parameter is set may be determined as a beam group.

A method for setting a beam group is disclosed. The beam group is statically set. The beam group may be predetermined as a system. For example, beams formed by one TRP are grouped into a beam group. For example, a plurality of beams with adjacent coverages are grouped into a beam group. For example, beams 1 to 3 with adjacent coverages in a cell are grouped into a beam group 1, and beams 4 to 7 with adjacent coverages in the cell are similarly grouped into a beam group 2. The same RRC parameter is used between the beams in the beam group statically set.

A method for setting the RRC parameter to a beam group is disclosed.

Setting the same RRC parameter to beams in a beam group may be predetermined in a standard and others. The cell notifies, via a beam for communication (may be referred to as a serving beam), the UE of TRP/beam identifiers of a plurality of beams to which the same RRC parameter is set. An identifier may be set as a beam group, and the identifier of the beam group and an identifier of a beam in the beam group may be notified.

Consequently, the UE can recognize to which beam the same RRC parameter as that of the serving beam should be set. Since the same RRC parameter is set within a beam group, setting the RRC parameter for each beam is unnecessary. The cell should notify the UE of only information for identifying beams to which the same RRC parameter is set. The amount of information required for the notification can be reduced.

Another method for setting the RRC parameter to a beam group is disclosed. The cell notifies the UE via a serving beam of the RRC parameter to be set to each beam together with TRP/beam identifiers of the plurality of beams. The cell notifies the same RRC parameter when the same RRC parameter is set. Consequently, the UE can recognize to which beams the same RRC parameter should be set. Although the amount of information required for the notification increases, change in the RRC parameter for each beam can be facilitated because the RRC parameter can be set to each beam.

Another method for setting the RRC parameter to a beam group is disclosed. The cell notifies, via a serving beam, the UE of TRP/beam identifiers of a plurality of beams and whether the RRC parameter to be set to each beam is the same as that of the serving beam. When the same RRC parameter is set, the cell notifies information indicating the sameness. Consequently, the UE can recognize to which beam the same RRC parameter as that of the serving beam should be set. Since the RRC parameter need not be notified for each beam, the amount of information required for the notification can be reduced.

The whole or part of the RRC parameter may be the same. The same RRC parameter should be the RRC parameter disclosed in the first embodiment.

When the UE has the inter-beam mobility within a beam group to which the same RRC parameter is set, setting a target RRC parameter is unnecessary. Setting an RRC parameter along with the mobility between beams is unnecessary, which enables the mobility between beams without involving the RRC signaling.

When the UE has the inter-beam mobility outside of the beam group to which the same RRC parameter is set, setting a target RRC parameter is necessary. The methods disclosed from the second embodiment to the third modification of the fifth embodiment should be appropriately applied to such a case. This enables the mobility between beams without involving the RRC signaling.

Another method for setting a beam group to which the same RRC parameter is set is disclosed. The beam group is set semi-statically or dynamically. The beam group can be semi-statically or dynamically set to each UE. The cell sets a beam group to each of the UEs. The cell notifies the UE of the set beam group via a serving beam.

The RRC signaling may be used as a method for notifying the beam group. Alternatively, the MAC signaling may be used. Alternatively, an L1/L2 control signaling may be used. Alternatively, these may be combined. The aforementioned methods should be applied to the method for setting the RRC parameter to a beam group.

The cell may change a beam group to be set to the UE. The beam group should be changed according to a radio propagation state.

Examples of the beam group to be set to each UE are described. A serving beam and a beam to be monitored by the UE may be set as a beam group to which the same RRC parameter is set. Alternatively, grouping the serving beam and the beam to be monitored by the UE into a beam group to which the same RRC parameter is set may be predetermined in a standard and others.

The cell sets the same RRC parameter to the UE with the serving beam of the UE and the beam to be monitored by the UE. The cell notifies the UE of the beam to be monitored by the UE. Consequently, the UE can recognize the beams to which the same RRC parameter should be set.

When the communication quality between the UE and the serving beam suddenly deteriorates, the cell may move the UE to the beam to be monitored by the UE. Since the UE has the inter-beam mobility within the beam group to which the same RRC parameter is set, setting a target RRC parameter is unnecessary. Setting the RRC parameter along with the mobility between beams is unnecessary. The mobility between beams without involving the RRC signaling is possible.

When the UE has the inter-beam mobility outside of the beam group to which the same RRC parameter is set, setting a target RRC parameter is necessary. The methods disclosed from the second embodiment to the third modification of the fifth embodiment should be appropriately applied to such a case, which enables the mobility between beams without involving the RRC signaling.

Another example of the beam group to be set to each UE is described. The UE may communicate via a plurality of beams. Here, a plurality of beams (a plurality of serving beams) via which the UE communicates may be set as a beam group to which the same RRC parameter is set. Alternatively, grouping the plurality of serving beams into the beam group to which the same RRC parameter is set may be predetermined in a standard and others.

The UE communicates with the cell via one serving beam. The cell notifies the UE via the serving beam of one or more other beams for communication. Consequently, the UE can recognize the beams to which the same RRC parameter should be set.

When the communication quality between the UE and the one serving beam suddenly deteriorates, the cell communicates with the UE via the other serving beams. The cell may move the UE to the other serving beams. Since the UE has the inter-beam mobility within the beam group to which the same RRC parameter is set, setting a target RRC parameter is unnecessary. Setting the RRC parameter along with the mobility between beams is unnecessary. The mobility between beams without involving the RRC signaling is possible.

Since the UE is communicating via the other beams, the cell need not notify the UE of an instruction for movement. The cell should communicate with the UE via the other beams without performing communication with the beam via which the communication quality has suddenly deteriorated. The UE can communicate not via the beam via which the communication quality has suddenly deteriorated but via the beam via which the other communications are being performed.

This case need not be referred to as the mobility between beams. Since the beam for communication in the beam group to which the same RRC parameter is set is changed, setting a target RRC parameter is unnecessary. Setting the RRC parameter according to change in the beam for communication is unnecessary. The beam for communication which does not involve the RRC signaling can be changed.

When the UE has the inter-beam mobility outside of the beam group to which the same RRC parameter is set, setting a target RRC parameter is necessary. The methods disclosed from the second embodiment to the third modification of the fifth embodiment should be appropriately applied to such a case. This enables the mobility between beams without involving the RRC signaling.

The First Modification of the Eighth Embodiment

When a beam group is set, not the same RRC parameter but a different RRC parameter may be set to each beam. When the different RRC parameter is set, the methods disclosed from the second embodiment to the third modification of the fifth embodiment should be appropriately applied to a method for setting the RRC parameter to each beam in the mobility between the beams. This enables the mobility between beams without involving the RRC signaling.

For example, when a serving beam and a beam to be monitored by the UE are set as a beam group, there are the mobility between the beams in the beam group and the mobility between the beams outside of the beam group, both of which correspond to the mobility of the serving beam. This allows mobility from the source beam to the target beam. Thus, application of the methods disclosed from the second embodiment to the third modification of the fifth embodiment enables the mobility between the beams without involving the RRC signaling.

For example, when a plurality of beams (a plurality of serving beams) via which the UE communicates are set as a beam group, the cell sets an RRC parameter to the UE for each of the beams in advance. The UE communicates with the cell via one serving beam. The cell notifies the UE of one or more other beams for communication, via the serving beam. The cell should notify the RRC parameter for each beam together with the other beams. The cell notifies the TRP/beam identifiers of the other beams and the RRC parameter to be set to each of the beams.

Consequently, the UE can set RRC parameters of a plurality of beams for communication. Even with the mobility between the beams or change in the beam for communication in the beam group, the UE may communicate by setting the RRC parameter for each beam that has been notified in advance.

The mobility between the beams outside of the beam group corresponds to the mobility of the serving beam. This allows mobility from the source beam to the target beam. Thus, application of the methods disclosed from the second embodiment to the third modification of the fifth embodiment enables the mobility between the beams without involving the RRC signaling.

When a plurality of beams (a plurality of serving beams) via which the UE communicates are set as a beam group, the beam group may include a primary beam and a secondary beam. The primary beam should be a beam for transmitting uplink control information (UCI). Alternatively, the primary beam may be a beam for communicating control information. Alternatively, the primary beam may be a beam for NAS communication.

Here, the primary beam may be changed. A former secondary beam is changed to the primary beam. Here, the second embodiment to the third modification of the fifth embodiment should be applied by associating the source beam with the primary beam and associating the target beam with the secondary beam to be changed to the primary beam. This enables the mobility between beams without involving the RRC signaling.

When a plurality of beams (a plurality of serving beams) via which the UE communicates are set as a beam group, the mobility between beam groups, that is, the mobility from a beam group set by the source beam to a beam group set by the target beam is possible. Alternatively, the beam group may be changed. The cell performs, for the UE, mobility between beam groups or change in the beam group.

When the mobility between beam groups or the change in the beam group is performed, an RRC parameter of a beam in a target beam group or an RRC parameter of a beam in a beam group after change may be notified in advance. This may be notified at or before the mobility between beam groups or the change in the beam group for the UE.

This may be notified, for example, when communication qualities of a predetermined number of serving beams in a beam group fall below a predetermined threshold. The communication qualities of the serving beams may be received powers or reception qualities of downlink communication. The UE should make the measurements. Alternatively, the communication qualities may be received powers or reception qualities of uplink communication. The cell should make the measurements.

Consequently, the cell can notify the UE of an RRC parameter of a beam in a beam group. The UE can start, with the received RRC parameter, communication via the notified beam in the beam group. Even when the communication qualities of the plurality of serving beams suddenly deteriorate, the beam group can be moved or changed, which enables earlier communication.

For example, when a serving beam and a beam to be monitored by the UE are set as a beam group, RRC parameters of a plurality (may be all) of beams in the beam group may be notified in advance. The method disclosed in the second embodiment for notifying an RRC parameter of a neighboring beam with the RRC signaling should be appropriately applied. With application of the second embodiment, RRC parameters of a plurality of beams in a beam group should be notified instead of notifying the RRC parameter of the neighboring beam.

The RRC parameters of the plurality of beams in the beam group may be notified before the UE moves between beams. The parameters may be notified, for example, when the communication quality of a serving beam falls below a predetermined threshold. Alternatively, when the RRC parameters in the beam group are changed, the RRC parameters may be notified. The communication quality of the serving beam may be received power or reception quality of downlink communication. The UE should make the measurement. Alternatively, the communication quality may be received power or reception quality of uplink communication. The cell should make the measurement.

This is effective when the UE is not notified of an instruction for mobility between beams due to sudden deterioration of the communication quality of the serving beam. Alternatively, the target beam need not be notified in the instruction for mobility between beams. There is no need to determine one of the target beams.

The UE may monitor any beam among the beams via which the RRC parameter has been notified in advance, in response to the sudden deterioration in the communication quality or the instruction for mobility between beams. The cell may start communication with any beam among the beams via which the RRC parameter has been notified in advance. With the advanced notification of the RRC parameter, the UE can communicate earlier.

The group-based beam management is discussed in 3GPP. Forming a beam group through measurements of physical layers is being proposed. The methods for setting the RRC parameter disclosed from the eighth embodiment to the first modification of the eighth embodiment may be appropriately applied to this beam group. The same advantages can be produced.

Since the beam group is formed through measurements of physical layers, the radio resources may be handled by the physical layers. Such examples include the radio resources to be set by the RRC parameter as disclosed in the first embodiment. Here, information on the beam group may be notified between an RRC layer and a physical layer. Alternatively, an RRC parameter may be notified between an RRC layer and a physical layer.

A MAC layer has a scheduling function. Accordingly, the information on the beam group or the RRC parameter may be notified between a MAC layer and an RRC layer or between the MAC layer and a PHY layer. The communication methods between the CU and the DUs disclosed from the second embodiment to the fifth embodiment should be appropriately applied to these notification methods. Consequently, information necessary between layers can be notified.

The embodiments and the modifications are merely illustrations of the present invention and can be freely combined within the scope of the present invention. Any constituent elements of the embodiments and the modifications can be appropriately modified or omitted.

For example, the subframe in the embodiments and the modifications is an example time unit of communication in the fifth generation base station communication system. The subframe may be set per scheduling. The processes described in the embodiments and the modifications as being performed per subframe may be performed per TTI, per slot, per sub-slot or per mini-slot.

While the invention has been described in detail, the foregoing description is in all aspects illustrative and not restrictive. It is therefore understood that numerous modifications and variations can be devised without departing from the scope of the invention.

DESCRIPTION OF REFERENCES 200 communication system, 202 communication terminal device, 203, 800 base station device, 802 distributed unit (DU), 803 central unit (CU), 804 to 810 beam (radio beam), 811 cell.

The invention claimed is:
1. A communication system, comprising:
a communication terminal device; and
a base station device that performs radio communication with the communication terminal device via a radio beam,
wherein a cell configured by the base station device is spatially separated by a plurality of radio beams being served by the base station device, and
the base station device changes a radio resource control (RRC) parameter to be applied to the communication terminal device from a first RRC parameter for a first radio beam to a second RRC parameter for a second radio beam, without requiring a random access procedure, when the communication terminal device moves from a range of the first radio beam to a range of the second radio beam,
wherein the base station device includes processing circuitry configured to implement:
at least one distributed unit (DU) that outputs the plurality of radio beams; and a central unit (CU) that controls the at least one DU,
the at least one DU has a medium access control (MAC) function, and
the CU makes:
a notification of the second RRC parameter in advance to the communication terminal device with RRC signaling,
a notification of a switching instruction from a first RRC parameter for a first radio beam to the second RRC parameter for a second radio beam to the communication terminal device with an L1/L2 signaling or a MAC signaling,
wherein the RRC parameter relates to at least one of a scheduling request (SR), acknowledgement (Ack)/negative acknowledgement (Nack) repetitions, a Sounding Reference Signal (SRS), and channel quality indicator (CQI)/channel state information (CSI).

2. The communication system according to claim 1, wherein the CU gives:
the notification of a switching instruction from the first radio beam to the second radio beam to the communication terminal device via the first radio beam.

3. The communication system according to claim 1, wherein
the CU makes:
the notification of the second RRC parameter to the communication terminal device via the second radio beam; and
the notification of a switching instruction from the first radio beam to the second radio beam to the communication terminal device via the first radio beam.

4. The communication system according to claim 1, wherein the CU makes:
the notification of the second RRC parameter to the communication terminal device via the first radio beam; and
the notification of a switching instruction from the first radio beam to the second radio beam to the communication terminal device via the first radio beam with the L1/L2 signaling or the MAC signaling.

5. The communication system according to claim 1, wherein the CU device makes:
the notification of the second RRC parameter to the communication terminal device via the second radio beam; and
the notification of a switching instruction from the first radio beam to the second radio beam to the communication terminal device via the first radio beam with the L1/L2 signaling or the MAC signaling.

6. A method implemented by a communication system that includes a communication terminal device and a base station, the method comprising:
performing, by the base station, radio communication with the communication terminal device via a radio beam, wherein a cell configured by the base station device is spatially separated by a plurality of radio beams being served by the base station device, and
changing, by the base station, a radio resource control (RRC) parameter to be applied to the communication terminal device from a first RRC parameter for a first radio beam to a second RRC parameter for a second radio beam, without requiring a random access procedure, when the communication terminal device moves from a range of the first radio beam to a range of the second radio beam,
wherein the base station device includes processing circuitry configured to implement:
at least one distributed unit (DU) that outputs the plurality of radio beams; and
a central unit (CU) that controls the at least one DU,
the at least one DU has a medium access control (MAC) function, and
the CU performs:
notifying of the second RRC parameter in advance to the communication terminal device with RRC signaling,
notifying a switching instruction from a first RRC parameter for a first radio beam to the second RRC parameter for a second radio beam to the communication terminal device with an L1/L2 signaling or a MAC signaling,
wherein the RRC parameter relates to at least one of a scheduling request (SR), acknowledgement (Ack)/negative acknowledgement (Nack) repetitions, a Sounding Reference Signal (SRS), and channel quality indicator (CQI)/channel state information (CSI).

* * * * *